United States Patent
Chou et al.

(10) Patent No.: US 6,370,541 B1
(45) Date of Patent: Apr. 9, 2002

(54) DESIGN AND IMPLEMENTATION OF A CLIENT/SERVER FRAMEWORK FOR FEDERATED MULTI-SEARCH AND UPDATE ACROSS HETEROGENEOUS DATASTORES

(75) Inventors: Kehsing J. Chou; Mei-Ing W. Huang, both of San Jose; Taejae Lee, Cupertino; Basuki N. Soetarman, Los Gatos; Robert Nelson Summers; Mimi Phuong-Thao Vo, both of San Jose; Jy-Jine James Lin, Cupertino, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/400,638

(22) Filed: Sep. 21, 1999

(51) Int. Cl.[7] .............................................. G06F 17/30
(52) U.S. Cl. ........................ 707/103; 707/100; 707/101
(58) Field of Search ................................ 707/103, 101, 707/100

(56) References Cited

U.S. PATENT DOCUMENTS

| | | | |
|---|---|---|---|
| 4,525,803 A | 7/1985 | Vidalin et al. | 364/900 |
| 5,202,981 A | 4/1993 | Shackelford | 707/1 |
| 5,303,342 A | 4/1994 | Edge | 358/1.1 |
| 5,317,736 A | 5/1994 | Bowen | 707/103 R |
| 5,355,493 A | 10/1994 | Silberbauer et al. | 717/1 |
| 5,596,744 A * | 1/1997 | Dao et al. | 707/10 |
| 5,634,053 A * | 5/1997 | Noble et al. | 707/4 |
| 5,708,828 A | 1/1998 | Coleman | 707/523 |
| 5,742,806 A | 4/1998 | Reiner et al. | 707/3 |
| 5,745,906 A | 4/1998 | Squibb | 707/203 |
| 5,752,252 A | 5/1998 | Zbikowski et al. | 707/205 |
| 5,774,888 A | 6/1998 | Light | 707/5 |
| 5,864,866 A | 1/1999 | Henckel et al. | 707/103 |
| 5,873,083 A * | 2/1999 | Jones et al. | 707/4 |
| 5,884,303 A | 3/1999 | Brown | 707/3 |
| 5,893,119 A | 4/1999 | Squibb | 707/203 |
| 5,903,894 A | 5/1999 | Reneris | 707/100 |

FOREIGN PATENT DOCUMENTS

| | | |
|---|---|---|
| EP | 169389 A | 1/1986 |
| EP | 228213 A | 7/1987 |
| EP | 532004 A | 3/1993 |
| EP | 632364 A | 1/1995 |
| EP | 632366 A | 1/1995 |
| EP | 678986 A | 10/1995 |
| EP | 711083 A | 5/1996 |
| EP | 712257 A | 5/1996 |
| EP | 0 838 771 A2 | 4/1998 |
| JP | 11122116 A | 4/1998 |
| JP | 11075160 A | 3/1999 |
| WO | WO 8802888 A | 4/1988 |
| WO | WO 9617306 A | 11/1995 |

OTHER PUBLICATIONS

Li et al., An Object–Oriented Approach to Federated Databases, IEEE electronic library online, p. 64–70, Apr. 1991.*
Radeke, Extending ODMG for Federated Database Systems, IEEE electronic library online, p. 304–312, Sep. 1996.*
Lerm et al., Cooperative Access to Relational and Object–Oriented Federated Databases, IEEE online, p. 222–227, Sep. 1993.*

(List continued on next page.)

*Primary Examiner*—Jack Choules
*Assistant Examiner*—Greta L. Robinson
(74) *Attorney, Agent, or Firm*—Sughrue Mion, PLLC

(57) ABSTRACT

A design and implementation of a client/server framework for federated multi-search and update across heterogeneous datastores. In particular, a technique for manipulating data in one or more heterogeneous datastores at a computer is provided. An object-oriented model is provided for integrating one or more heterogeneous datastores with a federated datastore. One or more heterogeneous datastores and a federated datastore are generated based on the object-oriented model. The generated datastores are organized into a federated composition.

39 Claims, 7 Drawing Sheets

OTHER PUBLICATIONS

"Information Intergration with IBM DB2 DataJoinder Version 2", White Paper, Data Management Solutions, International Business Corporation, First Edition Sep. 1997.

"Informix Datablade Technology", http://www.informix.com/informix/products/options/udo/datablade/dbtech/overview.

"Informix Datablade Technology—To get to the top and stay there, your business must work smarter; you must think ahead and continuously adapt to new market conditions and take advantage of new opportunities as they arise", http://www.informix.com/informix/products/options/udo/datablade/dbtech/ov . . . /db intro.ht.

"Informix Datablade Technology—Informix Dynamic Server—Universal Data Option fast, Intergrated–and Extensible", http://www.informix.com/informix/products/options/udo/datablade/dbtech/overview/body.htm.

"Informix Datablade Technology—Transforming Data into Smart Data", http://www.informix.com/informix/products/integration/datablade/datablade ds.htm.

"Jini—Technology Executive Overview", Sun Microsystems, Inc. Jan. 1999 http://ww.sun.com/jini/overview/overview.pdf.

Oracle8i Data Cartridge Developer's Guide Release 8.1.5 A68002–01, Oracle Corporation, 1999.

* cited by examiner

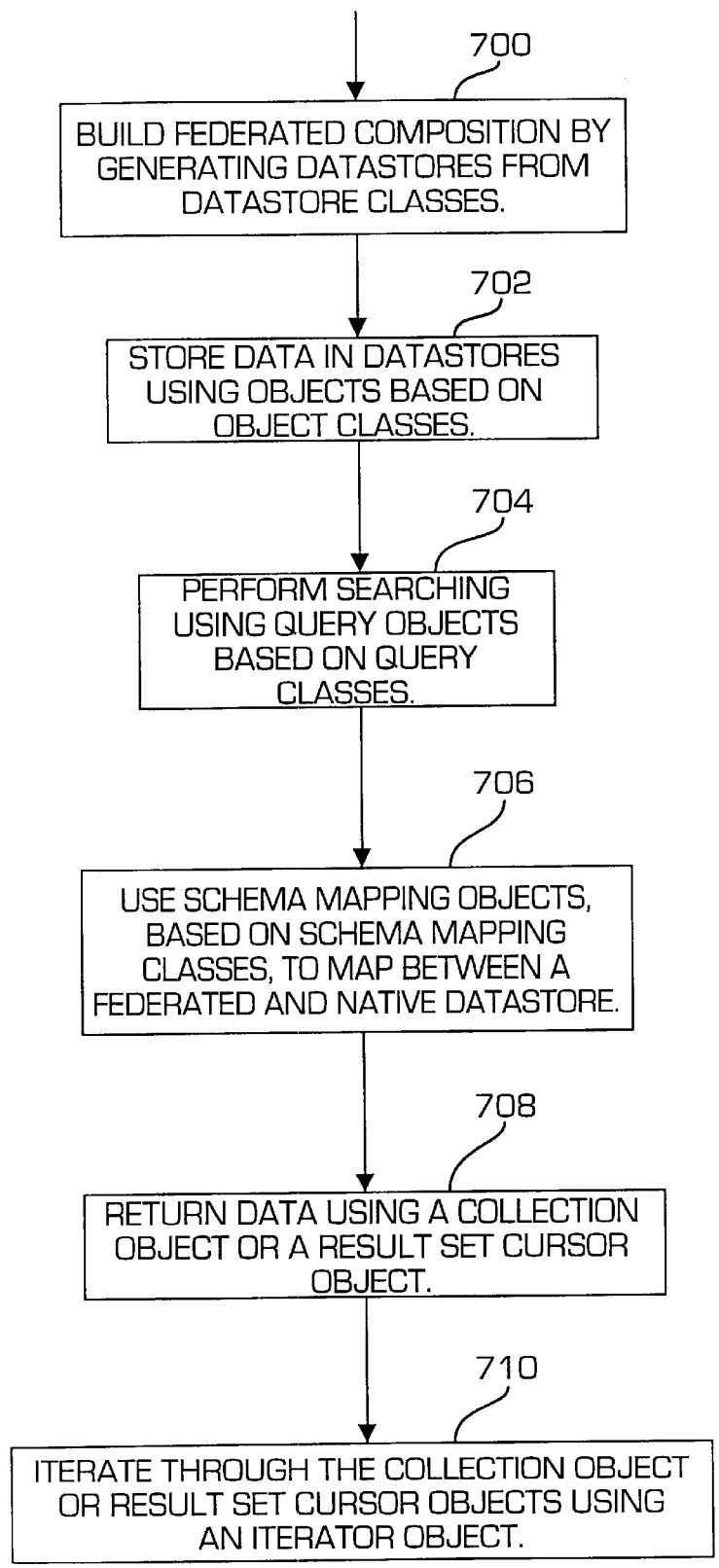

DESIGN AND IMPLEMENTATION OF A CLIENT/SERVER FRAMEWORK FOR FEDERATED MULTI-SEARCH AND UPDATE ACROSS HETEROGENEOUS DATASTORES

CROSS-REFERENCE TO RELATED APPLICATIONS

This application is related to the following co-pending and commonly-assigned patent applications:

Application Ser. No. 09/400,532, entitled "MANAGING RESULTS OF FEDERATED SEARCHES ACROSS HETEROGENEOUS DATASTORES WITH A FEDERATED RESULT SET CURSOR OBJECT," filed on same date herewith, by Basuki N. Soertarman et al.;

Application Ser. No. 09/399,690, entitled "THE ARCHITECTURE AND IMPLEMENTATION OF A DYNAMIC RMI SERVER CONFIGURATION HIERARCHY TO SUPPORT FEDERATED SEARCH AND UPDATE ACROSS HETEROGENEOUS DATASTORES," filed on same date herewith, by Kehsing J. Chou et al.;

Application Ser. No. 09/399,682, entitled "ARCHITECTURE TO ENABLE SEARCH GATEWAYS AS PART OF FEDERATED SEARCH," filed on same date herewith, by Kehsing J. Chou et al.;

Application Ser. No. 09/399,699, entitled "DELAYED DELIVERY OF QUERY RESULTS OR OTHER DATA FROM A FEDERATED SERVER TO A FEDERATED CLIENT UNTIL SUCH INFORMATION IS NEEDED," filed on same date herewith, by M. W. Huang et al.;

Application Ser. No. 09/399,695, entitled "IMPROVED EXTENDED DATA OBJECT ARCHITECTURE FOR HANDLING MULTI-STREAMING AND COMPLEX MULTI-DIMENSIONAL FILES," filed on same date herewith, by Kehsing J. Chou et al.;

Application Ser. No. 08/852,062, now U.S. Pat. No. 5,960,438 entitled "CLASS HIERARCHY FOR OBJECT AGGREGATION REPRESENTATION OF RELATIONAL DATABASE ROWS WITH CELLS HAVING NONTRADITIONAL DATATYPES," filed on May 6, 1997, by Daniel T. Chang et al.;

Application Ser. No. 08/852,055, now U.S. Pat. No. 5,924,100 entitled "FLEXIBLE OBJECT REPRESENTATION OF RELATIONAL DATABASE CELLS HAVING NONTRADITIONAL DATATYPES," filed on May 6, 1997, by Daniel T. Chang et al.;

Application Ser. No. 09/052,678, now U.S. Pat. No. 6,272,488 entitled "MANAGING RESULTS OF FEDERATED SEARCHES ACROSS HETEROGENEOUS DATASTORES WITH A FEDERATED COLLECTION OBJECT," filed on Apr. 1, 1998, by Daniel T. Chang et al.;

Application Ser. No. 09/052,680, now U.S. Pat. No. 6,263,342 entitled "FEDERATED SEARCHING OF HETEROGENEOUS DATASTORES USING A FEDERATED DATASTORE OBJECT," filed on Apr. 1, 1998, by Daniel T. Chang et al.;

Application Ser. No. 09/052,679, now U.S. Pat. No. 6,233,586 entitled "FEDERATED SEARCHING OF HETEROGENEOUS DATASTORES USING A FEDERATED QUERY OBJECT," filed on Apr. 1, 1998, by Daniel T. Chang et al.;

each of which is incorporated by reference herein.

BACKGROUND OF THE INVENTION

1. Field of the Invention

This invention relates in general to database management systems performed by computers, and in particular, to a design and implementation of a client/server framework for federated multi-search and update across heterogeneous datastores.

2. Description of Related Art

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc. . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc . . . are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result-management frameworks include IBM VisualAge C++, Microsoft Visual C++, Microsoft Visual J++, and Java.

There is a need in the art for an improved federated system. In particular, there is a need in the art for an improved client/server framework for federated multi-search and update across heterogeneous datastores.

SUMMARY OF THE INVENTION

To overcome the limitations in the prior art described above, and to overcome other limitations that will become apparent upon reading and understanding the present specification, the present invention discloses a method, apparatus, and article of manufacture for a design and implementation of a client/server framework for federated multi-search and update across heterogeneous datastores.

According to an embodiment of the invention, a technique for manipulating data in one or more heterogeneous datastores at a computer is provided. An object-oriented model is provided for integrating one or more heterogeneous datastores with a federated datastore. One or more heterogeneous datastores and a federated datastore are generated based on the object-oriented model. The generated datastores are organized into a federated composition.

BRIEF DESCRIPTION OF THE DRAWINGS

Referring now to the drawings in which like reference numbers represent corresponding parts throughout:

FIG. 7 is a flow diagram illustrating one use of the client/server framework for federated multi-search and update across heterogeneous datastores.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Federated Architecture

Figure 1:
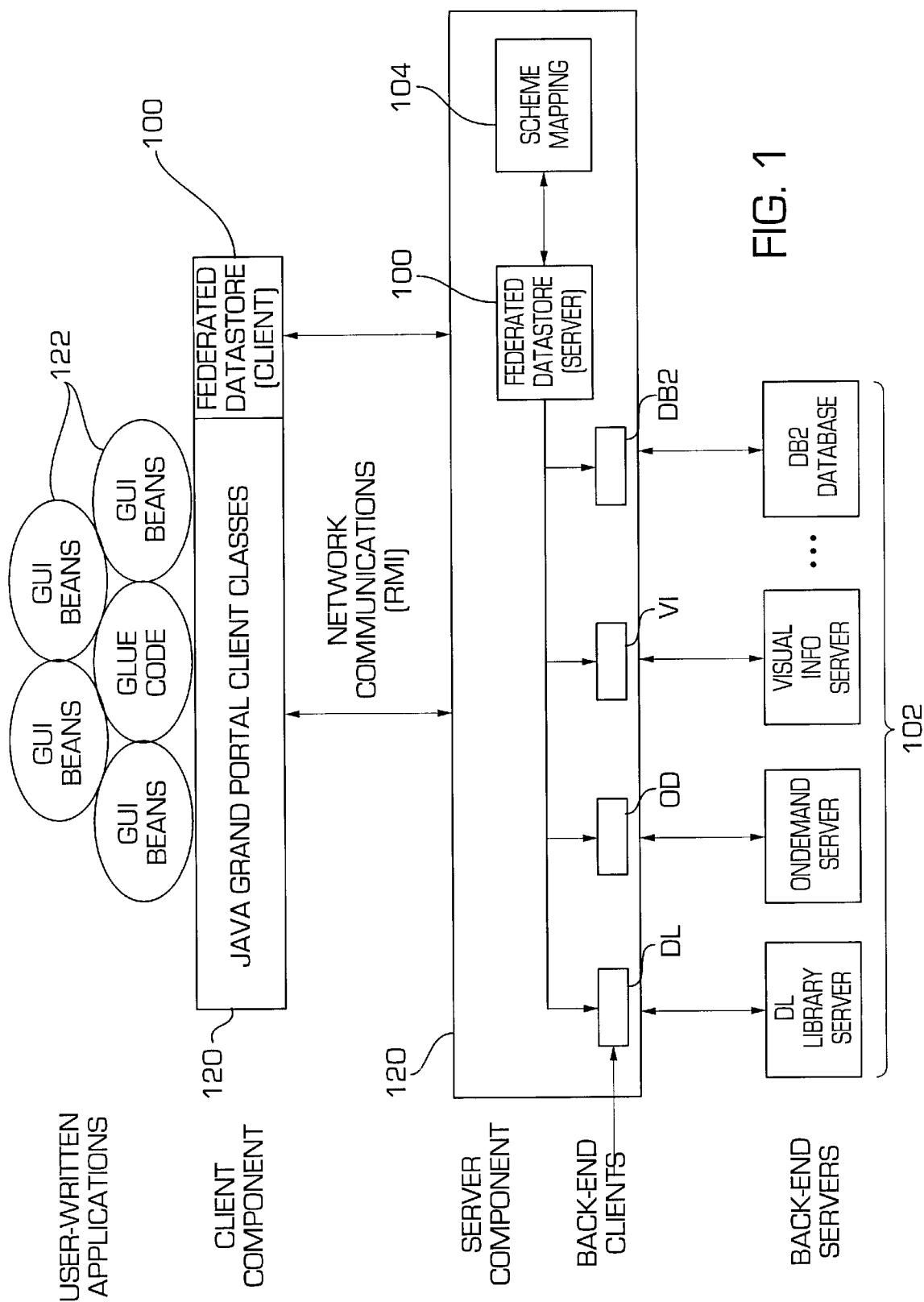
FIG. 1 is a diagram illustrating a computer architecture that could be used in accordance with the present invention.

FIG. 1 is a diagram illustrating a computer architecture that could be used in accordance with the present invention. The present invention is described herein by way of example and is not intended to be limited to the described embodiment. The description of the preferred embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses Java APIs based on OMG-Object Query Services (OQS) and a Dynamic Data Object protocol, which is a part of OMG/Persistence Object Services.

The Java APIs provide multi-search capabilities such as:
1. Searching within a given datastore using one or a combination of supported query types, i.e.
    Parametric query—Queries requiring an exact match on the condition specified in the query predicate and the data values stored in the datastore.
    Text query—Queries on the content of text fields for approximate match with the given text search expression, e.g. the existence (or non-existence) of certain phrases or word-stems.
    Image query—Queries on the content of image fields for approximate match with the given image search expression, e.g. image with certain degree of similarity based on color percentages, layout, or texture.
2. Each search type is supported by one or more search-engines.
3. Searching on the results of a previous search.
4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides a federated result set cursor object across heterogeneous datastores. In one embodiment of the invention, one or more classes implement the federated result set cursor object, and one or more methods are provided to manipulate the federated result set cursor object. In one embodiment, the class definitions and methods reside at the federated datastore client and server.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, DB2, etc. Digital Library, OnDemand, VisualInfo, and DB2 are all products from International Business Machines Corporation. As mentioned before, this association is established by a schema mapping component 104.

The communication between the federated datastore 100 client and server can be done by any appropriate protocol. On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition or superclass. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of a Data Object class. The Data Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
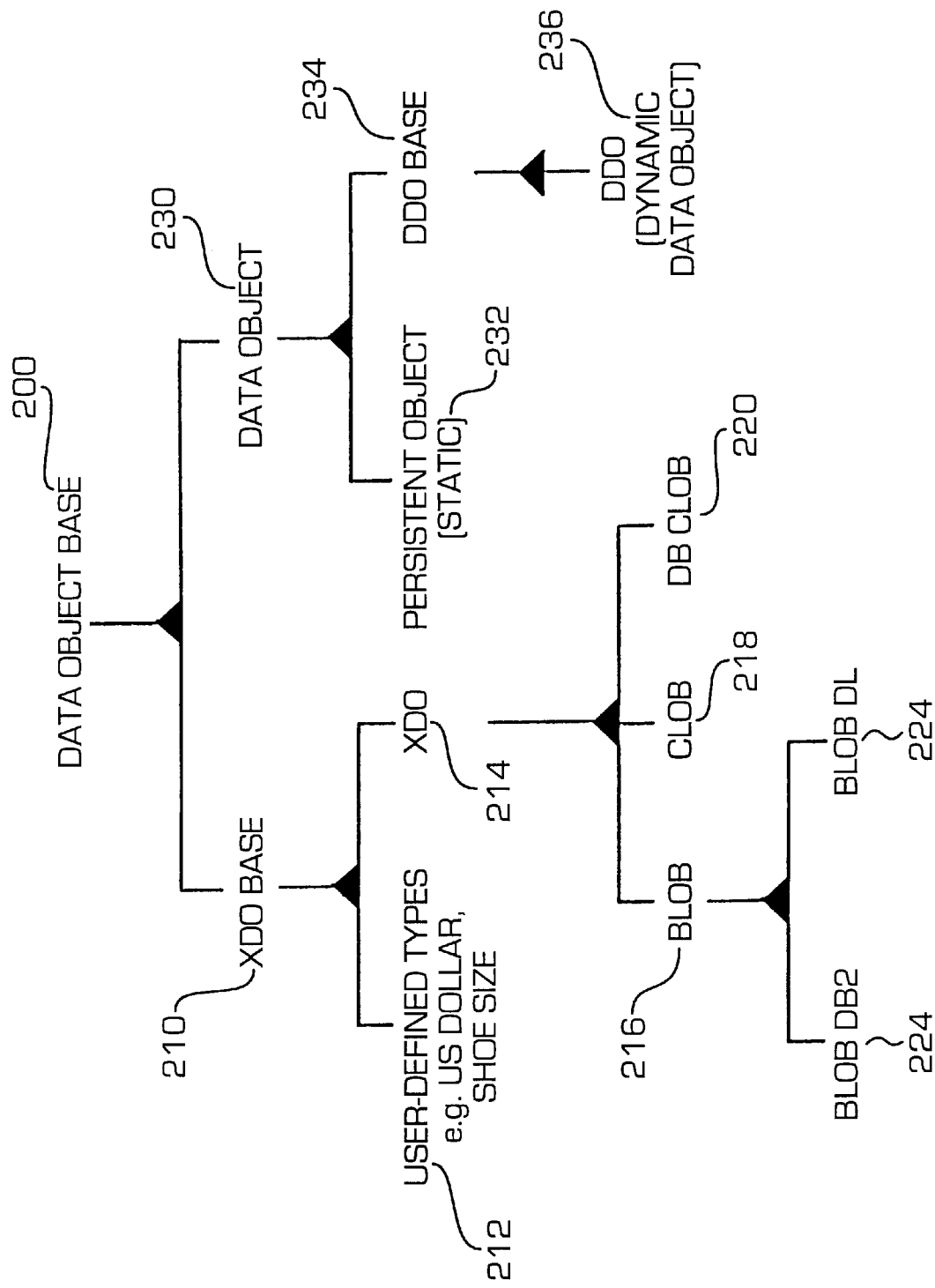
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes. These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A XDOBase 210 is the base class used to represent user-defined-types (UDT) or large objects. In particular, the XDOBase 210 is the base class for some user-defined types 212 and XDOs 214. A XDO 214 represents complexUDTs or large objects (LOB). This object can exist stand-alone or as a part of a DDO 236. Therefore, it has a persistent object identifier and CRUD operations capabilities.

Blob 216 is a base class for BLOBs as a place holder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2, and BlobDL 22 represents a BLOB specific to DL. Similarly, though not shown, there may be subclasses for ClobDB2, ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Grand Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 100 can combine the participating native datastores in two ways:

With mapping. As described above, mapping of concepts across participating datastores is established to provide a unified conceptual view. Based on this federated schema, federated queries with both join and union expressions can be formulated.

Without mapping. In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datatstore 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

A Design and Implementation of a Client/server Framework for Federated Multi-search and Update Across Heterogeneous Datastores An embodiment of the invention provides a design and implementation of a client/server framework for federated multi-search and update across heterogeneous datastores.

A consistent framework is provided for developing client/server application programs for multi-search and update on a single or multiple heterogeneous datastores participating in a federation. The datastores can be of the same or different types, and in a mixture of local or client/server configurations. Several different search-engines, such as, text search and image search engines, may be added to enrich the combined multi-search capability of the system.

In particular, an embodiment of the invention provides an environment and facilities for client/server application development with object-oriented class libraries. Example object-oriented class libraries are described in more detail below. The object-oriented class libraries support a consistent framework for representing a variety of data-storage facilities via the use of datstore objects, including the federation of several heterogeneous datastores. Additional datastore types can be defined and incorporated in the federation.

The object-oriented class libraries support a consistent framework for data-access across a single or heterogeneous datastore via the implementation of dynamic data objects and extender data objects.

The object-oriented class libraries support a consistent framework for performing multi-search using a variety of search engines and for performing federated search via the federated datastores.

The object-oriented class libraries support a consistent framework for handling a variety of multi-media data via the implementation of an extender data object and its extensions.

The object-oriented class libraries support a consistent framework for client/server implementation of the above.

The object-oriented class libraries support a consistent framework for defining a dynamic client/server configuration and load balancing.

Modern day application programs work in a complex environment. The present invention provides support for a number of features. Non-traditional data types, such as text, image, voice, and video are supported, along with capabilities for capturing, storing/archiving, searching, updating, and presenting these data types. The ability to perform a multi-search (i.e., a combination of parametric, text, and image search) with the help of proper search engines is supported. The ability to access and update data from a single or heterogeneous data source in a federated or non-federated environment is supported. The ability to work in a client/server environment with dynamic topology where new servers can be added or removed from the configuration is supported. The ability to support a choice of different implementation languages, such as Java, C++, and Visual Basic, in diverse customer shops and machine platforms is supported. The ability to support applications launched from the World Wide Web is available. The ability to support re-usable component based software development is available.

Figure 3:
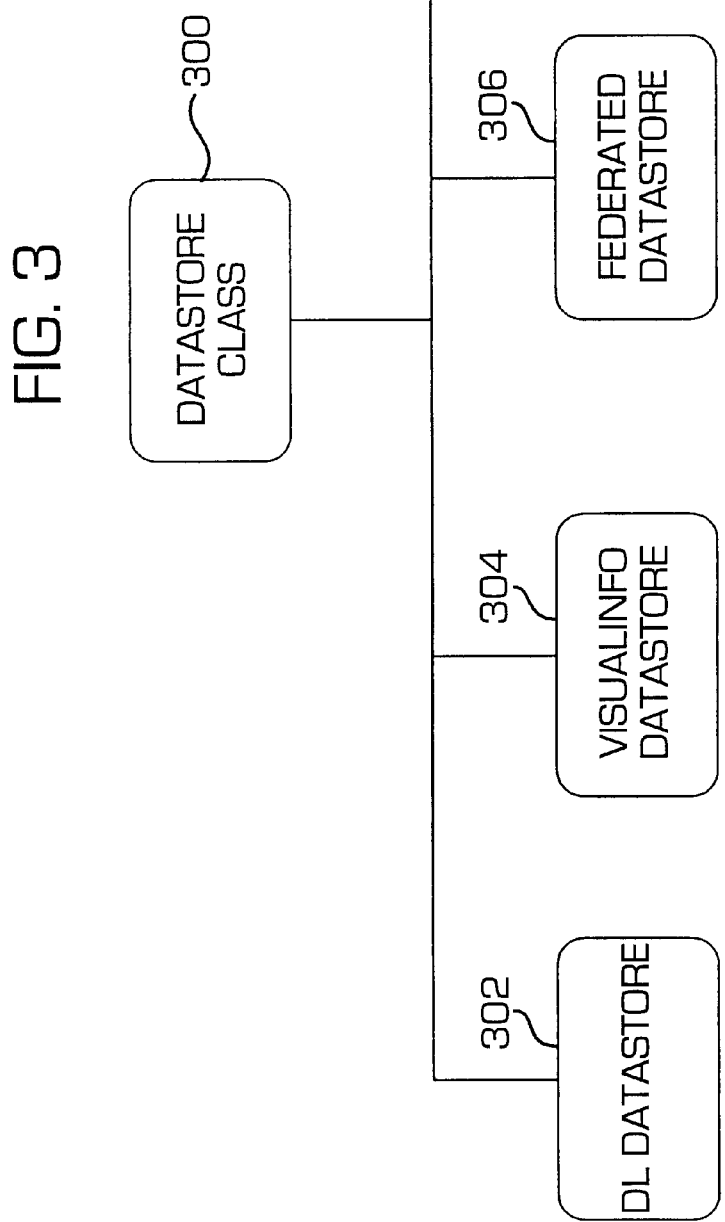
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308. It is to be understood that the techniques of the invention may be applied to any data source and is not limited to the mentioned datastores.

Figure 4:
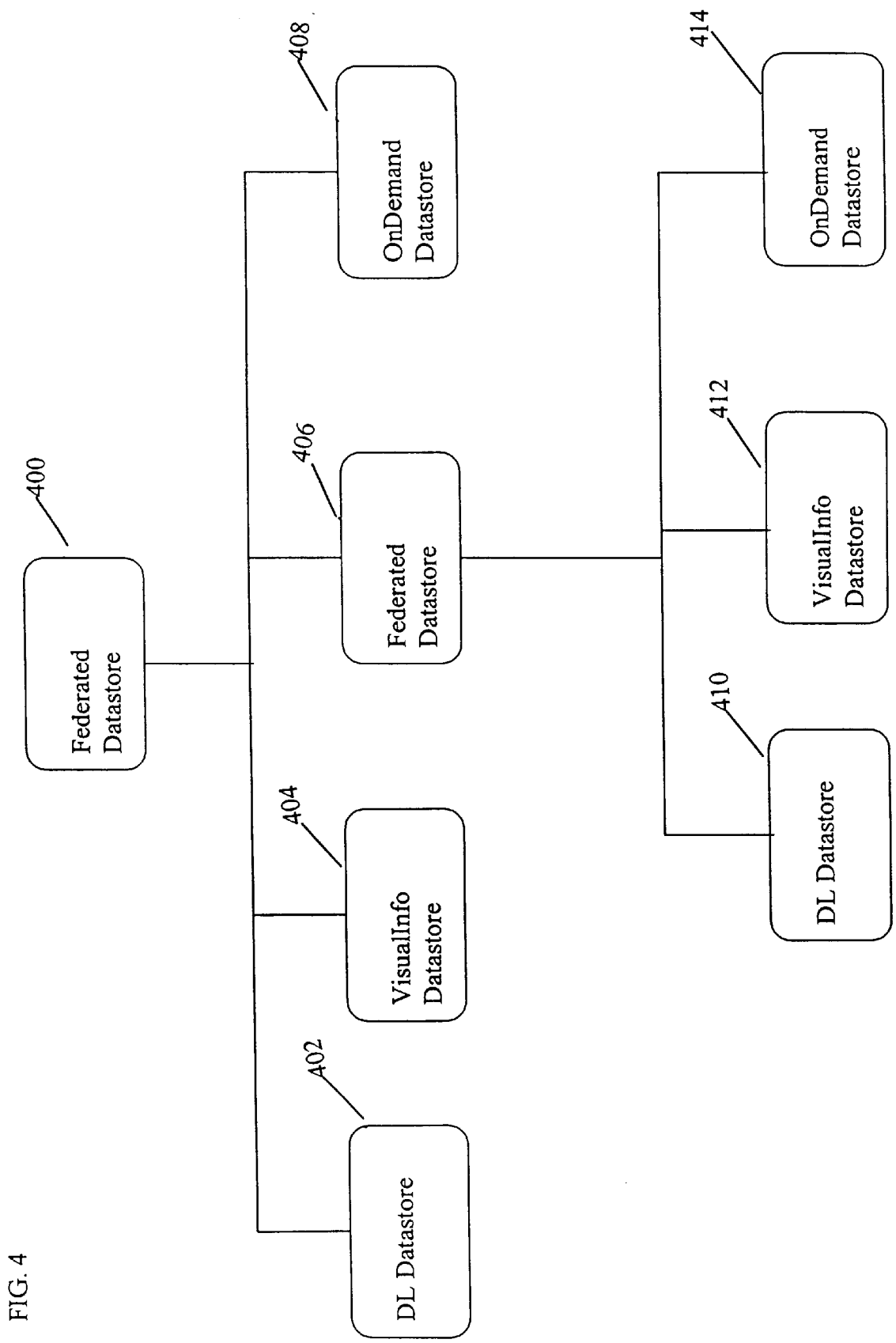
FIG. 4 is a diagram illustrating one composition of a federated datastore.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410,412, and 414. The depicted architecture is only a sample, and one skilled in the art would recognize that other examples fall within the scope of the invention.

Figure 5:
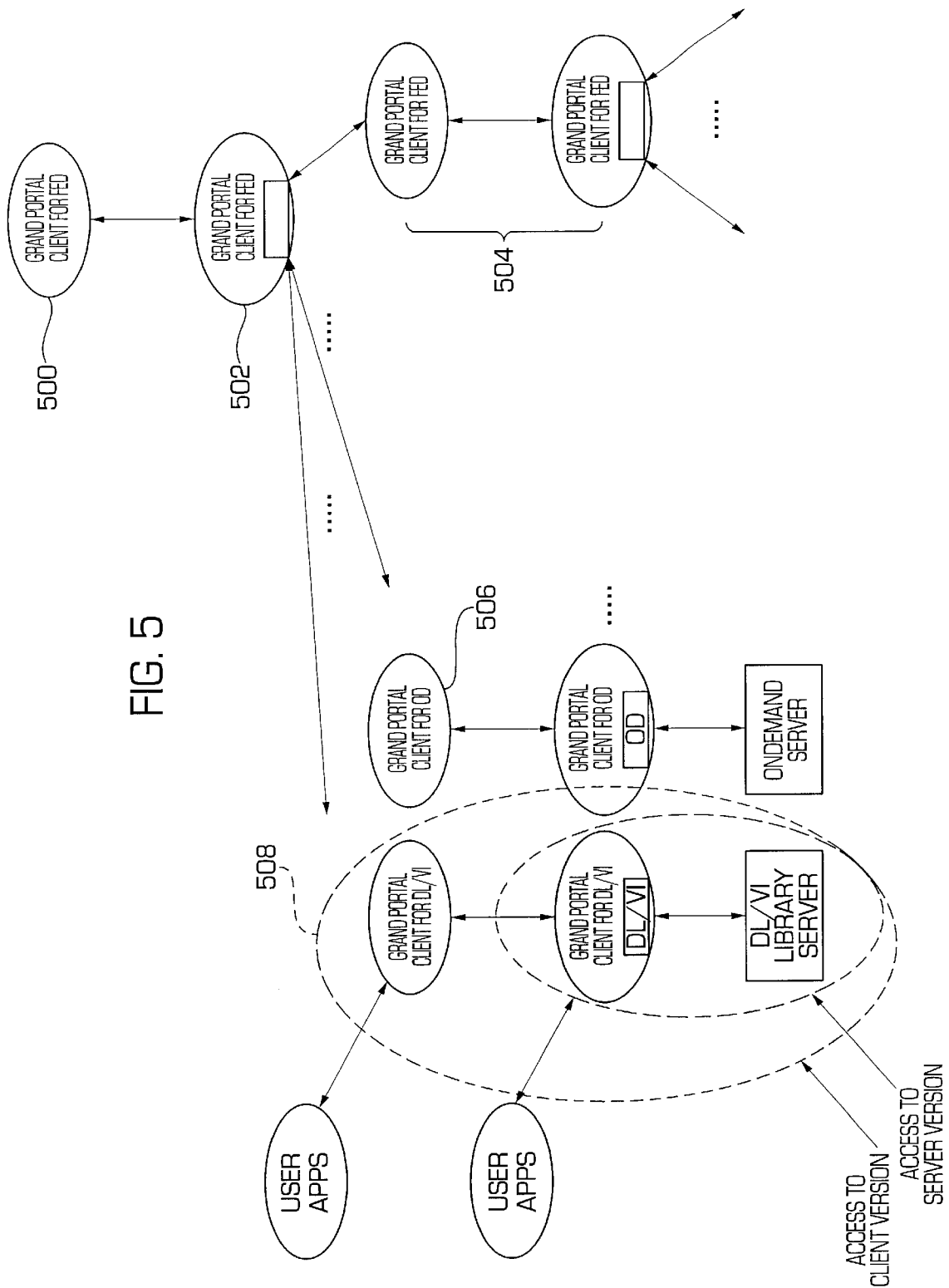
FIG. 5 is a diagram of an extended Grand Portal architecture.

FIG. 5 is a diagram of an extended Grand Portal architecture. A Grand Portal client for a federated client datastore 500 is connected to a Grand Portal server for a federated server datastore 502. Another federated client/server system 504 may be connected to the federated server 502. A Grand Portal client/server system for an OnDemand (OD) datastore 506 may be part of the federation. Additionally, a Grand Portal client/server system for a Digital LibraryNisualinfo (DL/VI) datastore 508 may be part of the federation. As with any of the datastores discussed herein, a user may access the client or the server directly. Therefore, user applications may reside either at the client or the server.

Figure 6:
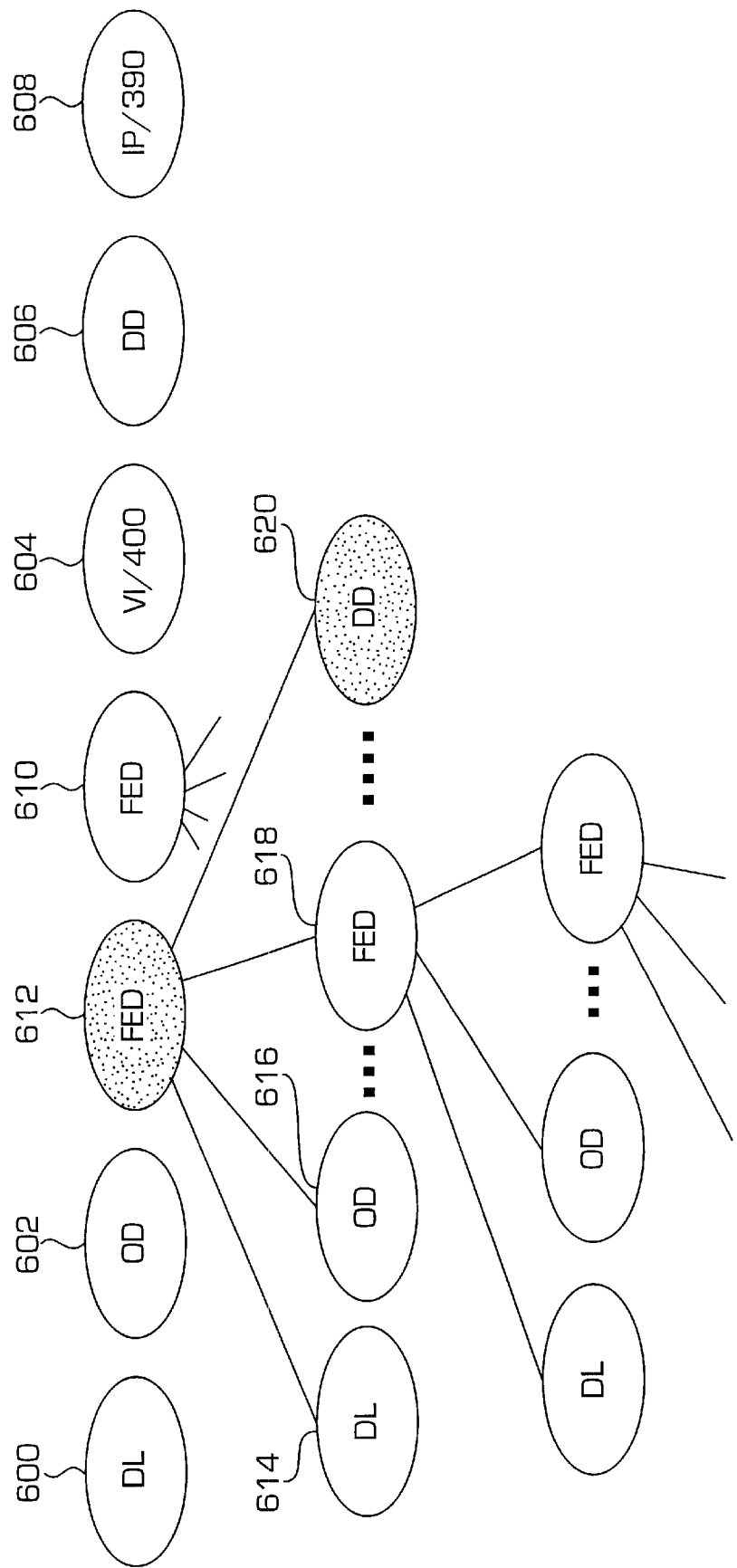
FIG. 6 is a diagram illustrating individual datastores and federated compositions.

FIG. 6 is a diagram illustrating individual datastores and federated compositions. In particular, a datastore can be configured as a stand-alone or as part of a federation. Additionally, a federated datastore can be composed of any number of datastores, including other federated datastores. Stand-alone datastores may be accessed directly by auser. The following are example stand-alone datastores in FIG. 6: a Digital Libt (DL) datastore 600, an OnDemand datastore 602, a Visualnfo/400 datastore 604, a Domino.Doc datastore 606, or a ImagePlus/390 datastore 608. Additionally, there may be multiple federated compositions 610 and 612. A federated composition 612 may include individual datastores 614, 616, and 620, along with another federated datastore 618.

Part of the novelty and uniqueness of the Grand Portal architecture is that it is rich and robust enough to allow a user to compose a search in the following configurations:

1. Search against a single datastore either from a client or a server configuration. Depending on the target datastore features, the architecture may support multi-search involving several different search engines (text and image search) or an update function.
2. Non-federated search against several datastores. Non-federated means that there is no mapping used. The user manages the search to each native datastore and processes the results according to a specific application to solve a specific problem. In this case, the datastore could be a gateway.
3. Federated search across several datastores, including other federated datastores
4. A mixture of 2 and 3.
5. Search in a combination of different platforms (e.g., AMx, NT/Win98) using a variety of languages (e.g., Java, C++, Visual Basic)

FIG. 7 is a flow diagram illustrating one use of the client/server framework for federated multi-search and update across heterogeneous datastores. Initially, in block 700 a federated composition is built by generated datastores from datastore classes. For example, a federated datastore is generated from a federated datastore class that is based on a base datastore class. Similarly, a Digital Library datastore, a QBIC datastore, and a Text datastore may be generated from their corresponding datastore classes, each of which is based on the base datastore class.

Then, in block 702, data is stored in the datastores using objects based on object classes. For example, the objects may be dynamic data objects or extended data objects. On type of extended data object is a binary large object. Next, searching may be performed across the heterogeneous (native) datastores, block 704. This is done using query objects. For example, the query can be a combined query object (for retrieving a combination of data, such as text, image or parametric), or the query can be a text query, an image query, a parametric query, or a SQL query.

In order for the federated datastore to communicate with the native datastores, shema mapping objects are used, block 706. Once the mapping is performed and the query is submitted to each native datastore, in block 708, data is returned from each native datastore in the form, for example, of a collection object or a result set cursor object. Then, in block 710, a user or application program may iterate thorugh the returned data using an iterator object.

Class Libraries

1. Datastore Base Class

The dkDatastore is the class on which each other datastore class is based. An example class definition for dkDatastore is set forth below.

---

```
dkDatastore

Interface com.ibm.mm.sdk.common.dkDatastore
    public interface dkDatastore
    extends dkQueryManager
{
public abstract void connect(String datastore_name,
        String user_name,
        String authentication,
        String connect_string) throws DKException, Exception
public abstract void disconnect( ) throws DKException, Exception
public abstract Object getOption(int option) throws DKException, Exception
public abstract void setOption(int option,
        Object value) throws DKException, Exception
public abstract Object evaluate(String command,
        short commandLangType,
        DKNVPair params[ ]) throws DKException, Exception
public abstract Object evaluate(dkQuery query) throws DKException, Exception
public abstract Object evaluate(DKCQExpr qe) throws DKException, Exception
public abstract dkResultSetCursor execute(String command,
        short commandLangType,
        DKNVPair params[ ]) throws DKException, Exception
public abstract dkResultSetCursor execute(dkQuery query) throws DKException, Exception
```

-continued

```
public abstract dkResultSetCursor execute(DKCQExpr qe) throws DKException, Exception
public abstract void executeWithCallback(dkQuery qo,
           dkCallback callbackObj) throws DKException, Exception
public abstract void executeWithCallback(String command,
           short commandLangType,
           DKNVPair params[ ],
           dkCallback callbackObj) throws DKException, Exception
public abstract void executeWithCallback(DKCQExpr qe,
           dkCallback callbackObj) throws DKException, Exception
public abstract dkQuery createQuery(String command,
           short commandLangType,
           DKNVPair params[ ]) throws DKException, Exception
public abstract dkQuery createQuery(DKCQExpr qe) throws DKException, Exception
public abstract void addObject(dkDataObject ddo) throws DKException, Exception
public abstract void deleteObject(dkDataObject ddo) throws DKException, Exception
public abstract void retrieveObject(dkDataObject ddo) throws DKException, Exception
public abstract void updateObject(dkDataObject ddo) throws DKException, Exception
public abstract void commit( ) throws DKException, Exception
public abstract void rollback( ) throws DKException, Exception
public abstract boolean isConnected( ) throws Exception
public abstract String datastoreName( ) throws Exception
public abstract String datastoreType( ) throws Exception
public abstract DKHandle connection( ) throws Exception
public abstract DKHandle handle(String type) throws Exception
public abstract String userName( ) throws Exception
public abstract dkCollection listDataSources( ) throws DKException, Exception
public abstract String[ ] listDataSourceNames( ) throws DKException, Exception
public abstract Object listServers( ) throws DKException, Exception
public abstract Object listSchema( ) throws DKException, Exception
public abstract Object listSchemaAttributes(String schemaEntry) throws DKException, public
abstract dkCollection listEntities( ) throws DKException, Exception
public abstract dkCollection listSearchableEntities( ) throws DKException, Exception
public abstract String[ ] listEntityNames( ) throws DKException, Exception
public abstract String[ ] listSearchableEntityNames( ) throws DKException, Exception
public abstract dkCollection listEntityAttrs(String entityName) throws DKException,
Exception
public abstract String[ ] listEntityAttrNames(String entityName) throws DKException,
Exception
public abstract dkDatastoreDef datastoreDef( ) throws DKException, Exception
public abstract String registerMapping(DKNVPair sourceMap) throws DKException,
Exception
public abstract void unRegisterMapping(String mappingName) throws DKException,
Exception
public abstract String[ ] listMappingNames( ) throws DKException, Exception
public abstract dkSchemaMapping getMapping(String mappingName) throws DKException,
public abstract dkExtension getExtension(String extensionName) throws DKException, public
abstract void addExtension(String extensionName,
       dkExtension extensionObj) throws DKException, Exception
public abstract void removeExtension(String extensionName) throws DKException, Exception
public abstract String[ ] listExtensionNames( ) throws DKException, Exception
public abstract DKDDO createDDO(String objectType,
       int Flags) throws DKException, Exception
public abstract void changePassword(String userId,
       String oldPwd,
       String newPwd) throws DKException, Exception
public abstract void destroy( ) throws DKException, Exception
}
```

The following methods are part of the dkDatastore class:

public abstract void connect(String datastore_name,

String user_name,

String authentication,

String connect string) throws DKException, Exception

Connects to a datastore.

Parameters:

datastore_name—the datastore name used for connection user_name—the user name used for connection authentication—the authentication used for connection connect_string—the connect string used for connection. This is used to provide additional connection options.

public abstract void disconnect( ) throws DKException, Exception

Disconnects to a datastore.

public abstract ObjectgetOption(int option) throws DKException, Exception

Gets a datastore option.

Parameters:

option—the option identifier

Returns:

an option value public abstract void setOption(int option,

Object value) throws DKException, Exception

Sets a datastore option.

Parameters:

option—the option identifier value—the option value public abstract Object evaluate(String command, short commandLangType, DNVPair params[ ]) throws DKException, Exception
  Evaluates a query.
  Parameters:
  command—a query string
  commandLang—a query type
  params—additional query option in name/value pair
  Returns:
  a collection of the results
public abstract Object evaluate(dkQuery query) throws DKException, Exception
  Evaluates a query.
  Parameters:
  qo—a query object
  Returns:
  a collection of the results
public abstract Object evaluate(DKCQExpr qe) throws DKException, Exception
  Evaluates a query.
  Parameters:
  qe—a common query expression object
  Returns:
  a collection of the results
public abstract dkResultSetCursor execute(String command, short commandLangType,
  DKNVPairparams[ ]) throws DKException, Exception
  Executes the query.
  Parameters:
  command—a query string
  commandLang—a query type
  params—additional query option in name/value pair
  Returns:
  resultSetCursor which represents a datastore cursor.
public abstract dkResultSetCursor execute(dkQuery query) throws DKException, Exception
  Executes the query.
  Parameters:
  qo—a query object
  Returns:
  resultSetCursor which represents a datastore cursor.
public abstract dkResultSetCursor execute(DKCQExpr qe) throws DKException, Exception
  Executes the query.
  Parameters:
  qe—a common query expression object
  Returns:
  resultSetCursor which represents a datastore cursor.
public abstract void executeWithCallback(dkQuery qo, dkcallback callbackObj) throws DKException, Exception
  Executes the query with callback function.
  Parameters:
  qo—a query object
  callbackObj—a dkCallback object
public abstract void executeWithCallback(String command, short commandLangType,
  DKNVPairparams[ ],
  dkcallback callbackObj) throws DKException, Exception
  Executes the query with callback function.
  Parameters:
  command—a query string
  commandLang—a query type
  params—additional query option in name/value pair
  callbackObj—a dkCallback object
public abstract void executeWithCallback(DKCQExpr qe, dkcallback callbackObj) throws DKException, Exception
  Executes the query with callback function.
  Parameters:
  qe—a common query expression object
  callbackObj—a dkCallback object
public abstract dkQuery createQuery(String command, short commandLangType,
  KNVPair params[ ]) throws DKException, Exception
  Creates a query object.
  Parameters:
  command—a query string
  commandLang—a query type
  params—additional query option in name/value pair
  Returns:
  a query object
public abstract dkQuery createQuery(DKCQExpr qe) throws DKException, Exception
  Creates a query object.
  Parameters:
  qe—a common query expression object
public abstract void addObject(dkDataObject ddo) throws DKException, Exception
  Adds this ddo to this datastore.
  Parameters:
  ddo—the ddo to be added to this datastore
public abstract void deleteObject(dkDataObject ddo) throws DKException, Exception
  Deletes this ddo from this datastore.
  Parameters:
  ddo—the ddo to be deleted from this datastore
public abstract void retrieveObject(dkDataObject ddo) throws DKException, Exception
  Retrieves this ddo from this datastore.
  Parameters:
  ddo—the ddo to be retrieved from this datastore
public abstract void updateObject(dkDataObject ddo) throws DKException, Exception
  Updates this ddo in this datastore.
  Parameters:
  ddo—the ddo to be updated in this datastore
public abstract void commit( ) throws DKException, Exception
  Commits a datastore transaction.
public abstract void rollback( ) throws DKException, Exception
  Rolls back a datastore transaction.
public abstract boolean isConnected( ) throws Exception
  checks to see if the datastore is connected.
  Returns:
  true if connected
public abstract String datastorename( ) throws Exception
  Gets the name of this datastore object. Usually it represents a datastore source's server name.
  Returns:
  datastore name public abstract String datastoretype( ) throws Exception
    Gets the datastore type for this datastore object.
    Returns:
    datastore type
public abstract DKHandle connection( ) throws Exception
    Gets the connection handle for a datastore.
    Returns:
    connection handle
public abstract DKHande handle(String type) throws Exception
    Gets a datastore handle.
    Parameters:
    type—type of datastore handle wanted
    Returns:
    a datastore handle
public abstract String userName( ) throws Exception
    Gets the user name for this datastore object.
    Returns:
    user name
public abstract dkcollection listDataSources( ) throws DKException, Exception
    List the available datastore sources that can be used to connect with.
    Returns:
    a collection of server defs
public abstract String[ ] listDataSourceNames( ) throws DKException, Exception
    Lists the available datastore source names that can be used to connect with.
    Returns:
    an array of server names
public abstract Object listServers( ) throws DKException, Exception
    Lists the available datastore sources that can be used to connect with. Note: listservers( ) is deprecated. Replace by listDataSources.
    Returns:
    a collection of server definitions
    See Also:
    listDataSources
public abstract Object listSchema( ) throws DKException, Exception
    List the entities that belong to this datastore. Note: listSchema( ) is deprecated. Replace by listEntities.
    Returns:
    an object that contains the schema
    See Also:
    listEntities
public abstract Object listSchemaAttributes(String schemaEntry) throws DKException, Exception
    List the attributes that belong to a schema Note: listSchemaAttributes( ) is deprecated. Replace by listEntityAttributes.
    Parameters:
    schemaEntry—the name of the schema.
    Returns:
    an object that contains the attributes that belong to this schema
    See Also:
    listEntityAttrs
public abstract dkcollection listEntities( ) throws DKException, Exception
    Gets a list of entities from persistent datastore.
    Returns:
    a collection of entity defs
    Throws: DKException
    if error occurs
public abstract dkcollection listSearchableEntities( ) throws DKException, Exception
public abstract String[ ] listEntityNames( ) throws DKException, Exception
    Gets a list of entity names from persistent datastore
    Returns:
    an array of entity names
    Throws: DKException
    if error occurs
public abstract String[ ] listSearchableEntityNames( ) throws DKException, Exception
public abstract dkcollection listEntityAttrs(String entityName) throws DKException, Exception
    Gets a list of attributes for a given entity name.
    Parameters:
    entityName—name of entity to retrieve attributes for
    Returns:
    a dkCollection of dkAttrDef objects
    Throws: DKException
    if the entity name does not exist
public abstract String[ ] listEntityAttrNames(String entityName) throws DKException, Exception
    Gets a list of attribute names for a given entity name.
    Parameters:
    entityName—name of entity to retrieve attribute names for
    Returns:
    an array of attribute names
    Throws: DKException
    if the entity name does not exist
public abstract dkDatastoreDef datastoreDef( ) throws DKException; Exception
    Gets datastore definition
    Returns:
    the meta-data (dkDatastoreDef) of this datastore
public abstract String registerMapping(DKNVPair sourceMap) throws DKException, Exception
    Registers mapping information to this datastore
    Parameters:
    sourceMap—source name and mapping
    Returns:
    the mapping name for the mapping information
public abstract void unRegisterMapping(String mappingName) throws DKException, Exception
    Unregisters mapping information for this datastore
    Parameters:
    mappingName—name of the mapping information
public abstract String[ ] listMappingNames( ) throws DKException, Exception
    Gets the list of the register mappings for this datastore
    Returns:
    an array of register mapping objects' names
public abstract dkSchemaMapping getMapping(String mappingName) throws DKException, Exception Gets mapping information for this datastore
Parameters:
mappingName—name of the mapping information
Returns:
the schema mapping object
public abstract dkextension getExtension(String extensionName) throws DKException, Exception
Gets the extension object from a given extenstion name.
Parameters:
extensionName—name of the extension object.
Returns:
extension object.
public abstract void addExtension(String extensionname, dkExtension extensionObj) throws DKException, Exception
Adds a new extension object.
Parameters:
extensionname—name of new extension object
extensionObj—the extension object to be set
public abstract void removeExtension(String extensionName) throws DKException, Exception
Removes an existing extension object
Parameters:
extensionname—name of extension object to be removed
public abstract String[ ] listExtensionNames( ) throws DKException, Exception
Gets the list of extension objects' names
Returns:
an array of extension objects' names
public abstract DKDDO createDDO(String objectType,
    int Flags) throws DKException, Exception
Creates a new DDO with object type, properties and attributes set for a given backend server.
Parameters:
objectType—the object type user wants to create Flags—
    to indicate various options to specify more detail characteristics of the DDO to create. For example, it may be a directive to create a document DDO, a folder, etc.
Returns:
a new DDO of the given object type with all the properties and attributes set, so that the user only need to set the attribute values
public abstract void changePassword(String userId,
    String oldPwd,
    String newPwd) throws DKException, Exception
public abstract void destroy( ) throws DKException, Exception
Destroys datastore and performs datastore cleanup if needed.

2. Federated Datastore

In the preferred embodiment, the federated datastore takes query strings expressed in a federated query language. An example class definition for DatastoreFederated is set forth below.

```
DKDatastoreFed.java package com.ibm.mm.sdk.server;
public class DKDatastoreFed extends dkAbstractDataStore
        implements DKConstantFed,
            DKConstant,
            DKMessageIdFed,
            DKMessageId,
            dkFederation,
            java.io.Serializable
{
public dkCollection listEntities( ) throws DKException, Exception
public String[ ] listEntityNames( ) throws DKException, Exception
public String[ ] listTextEntityNames( ) throws DKException, Exception
public String[ ] listParmEntityNames( ) throws DKException, Exception
public dkCollection listEntityAttrs(String entityName) throws DKException, Exception
public String[ ] listEntityAttrNames(String entityName) throws DKException, Exception
public String registerMapping(DKNVPair sourceMap) throws DKException, Exception
public void unRegisterMapping(String mappingName) throws DKException, Exception
public String[ ] listMappingNames( ) throws DKException, Exception
public dkSchemaMapping getMapping(String mappingName) throws DKException,
        Exception
public synchronized dkExtension getExtension(String extensionName) throws
        DKException, Exception
public synchronized void addExtension(String extensionName,
        dkExtension extensionObj) throws DKException, Exception
public synchronized void removeExtension(String extensionName) throws DKException,
        Exception
public synchronized String[ ] listExtensionNames( ) throws DKException, Exception
public DKDDO createDDO(String objectType,
            int Flags) throws DKException, Exception
public dkCollection listSearchTemplates( ) throws DKException, Exception
public String[ ] listSearchTemplateNames( ) throws DKException, Exception
public dkSearchTemplate getSearchTemplate(StringtemplateName) throws DKException,
        Exception
public void destroy( ) throws DKException, Exception
public synchronized string addRemoveCursor (dkResultSetCursor iCurt int action)
        throws DKException, Exception
public dkDatastore datastoreByServerName (String dsType, String dsName)
        throws DKException, Exception
public void changePassword (String serverName,
```

-continued

```
        String user Id,
        String oldPwd,
        String newPwd)
        throws DKException, Exception
    public void requestConnection (String serverName,
        String userId,
        String passwd,
        String connectString)
        throws DKException, Exception
    public void excludeServer (Sting serverName, String templateName)
        throws DKException, Exception
    public boolean isServerExcluded (String serverName, String templateName)
        throws DKException, Exception, java.rmi.RemoteException
    public String[ ] listExcludedServers(String templateName) throws DKException, Exception
    public void clearExcludedServers(String templateName) throws DKException, Exception
};
```

The following methods are part of the federated datastore class:

public DKDatastoreFed( ) throws DKException, Exception

Constructs default Federated Datastore.

public DKDatastoreFed(String configuration) throws DKException, Exception

Constructs default Federated Datastore.

public void connect(String datastore_name,

String user_name,

String authentication,

String connect_string) throws DKException, Exception

Establishes a connection to a federated datastore.

Parameters:

datastore_name—federated datastore name user_name—userid to logon to this federated datastore authentication—password for this user_name connect_string—additional information string Throws: DKException if either:

datastore_name, user_name, or authentication is null or if error occurs in the federated datastore Overrides:

connect in class dkAbstractDatastore public void disconnect( ) throws DKException, Exception Disconnects from the federated datastore.

Throws: DKException if unable to disconnect from server.

Overrides:

disconnect in class dkAbstractDatastore public Object getoption(int option) throws DKException Gets defined datastore option Parameters:

option—an option id

Returns:

the value for the given option

Throws: DKException if option is not set

Overrides:

getOption in class dkAbstractDatastore public void setOption(int option, Object value) throws DKException Sets the given "option" with a specific "value".

Parameters:

option—an option id value—the value for the "option"

Throws: DKException if option/value is invalid

Overrides:

setOption in class dkAbstractDatastore public Object evaluate(String command, short commandLangType, DKNVPairparams[ ]) throws DKException, Exception Evaluates a query and returns the result as a dkQueryableCollection object.

Parameters:

command—a query stirring that represent the query criteria commandLangType—a query language type, for Federated, it will be DK_FEDERATED_QL_TYPE params—a name/value pairs list Returns:

a query result collection

Throws: DKException if "command" argument is null

Overrides:

evaluate in class dkAbstractDatastore public Object evaluate(dkQuery query) throws DKException, Exception Evaluates a query and returns the result as a dkQueryableCollection.

Parameters:

query—a given query object

Returns:

a query result collection

Throws: DKException if the "query" input is null or not of federated query type.

Overrides:

evaluate in class dkAbstractDatastore public Object evaluate(DKCQExpr qe) throws DKException, Exception Evaluates a query.

Parameters:

qe—a common query expression object

Returns:

a collection of the results

Throws: DKException if common query expression object is invalid
Overrides:
evaluate in class dkAbstractDatastore
public dkResultSetCursor execute(String command,
short commandLangType,
DKNVPairparams[ ]) throws DKException, Exception
Executes a command query of the federated datastore and returns a result set cursor.
Parameters:
command—a query string that represents the query criteria.
commandLangType—a query language type, for Federated, it will be DK_FEDERATED_$_{QL}$_TYPE.
params[ ]—a name/value pairs list.
Returns:
a dkResultSetCursor object.
Throws: DKException
if "command" is null or invalid, or "commandLangType" is not Federated Query type.
Overrides:
execute in class dkAbstractDatastore
public dkResultSetCursor execute(dkQuery query) throws DKException, Exception
Executes a command query of the federated datastore and returns a result set cursor. This method takes a Federated query object as an argument.
Parameters:
query—a federated dkQuery object
Returns:
a dkResultSetCursor object
Throws: DKException
if "query" object is null or query.qlType( ) is not DK_FEDERATED_QL_TYPE
Overrides:
execute in class dkAbstractDatastore
public dkResultSetCursor execute(DKCQExpr cqe) throws DKException, Exception
Executes a query expression.
Parameters:
cqe—a common query expression object
Returns:
resultSetCursor which represents a federated datastore cursor.
Throws: DKException
if "cqe" object is invalid
Overrides:
execute in class dkAbstractDatastore
public void executeWithCallback(dkQuery query, dkcallback callbackObj) throws DKException, Exception
Executes a query with callback function.
Parameters:
query—a query object
callbackObj—a dkCallback object
Overrides:
executeWithCallback in class dkAbstractDatastore
public void executeWithCallback(String command,
short commandLangType,
DKNVPair params[ ],
dkcallback callbackObj) throws DKException, Exception Executes the query with callback function.
Parameters:
command—a query string
commandLang—a query type
params—additional query option in name/value pair
callbackObj—a dkCallback object
Overrides:
executeWithCallback in class dkAbstractDatastore
public void executeWithCallback(DKCQExpr cqe,
dkcallback callbackObj) throws DKException, Exception
Executes a query expression with callback function.
Parameters:
cqe—a common query expression object
callbackObj—a dkCallback object
Overrides:
executeWithCallback in class dkAbstractDatastore
public dkQuery createQuery(String command,
short commandLangType,
DKNVPair params[ ]) throws DKException
Creates a federated query object.
Parameters:
command—a query string that represents the query criteria
commandLangType—a query language type, it will be one of the
following:
DK_CM_TEMPLATE_QL_TYPE
DK_CM_TEXT_QL_TYPE
DK_CM_IMAGE_QL_TYPE
DK_CM_PARAMETRIC_QL_TYPE
DK_CM_COMBINED_QL_TYPE
params[ ]—a name/value pairs list
Returns:
a federated dkQuery object
Throws: DKException
if "command" is null
Overrides:
createQuery in class dkAbstractDatastore
public dkQuery createQuery(DKCQExpr qe) throws DKException
Creates a query object.
Parameters:
cqe—a common query expression object
Throws: DKException
if "cqe" object is invalid
Overrides:
createQuery in class dkAbstractDatastore
public dkcollection listDataSources( ) throws DKException
Lists the available datastore sources that a user can connect to.
Returns:
a collection of ServerDef objects describing the servers
Throws: DKException
if internal error occurs from server
Overrides:
listDataSources in class dkAbstractDatastore
public String[ ] listDataSource( )throws DKException
Gets a list of datasource names.
Returns:

an array of datasource names
Throws: DKException
if error occurs when retrieving datasource names
Overrides:
listDataSourceNames in class dkAbstractDatastore
public void addObject(dkDataObject dataobj) throws DKException, Exception
Adds a DDO object.
Parameters:
ddo—a Federated object to be added.
Throws: DKException
if error occurs during add
Overrides:
addObject in class dkAbstractDatastore
public void deleteObject(dkDataObject dataobj) throws DKException, Exception
Deletes a data object.
Parameters:
ddo—a federated DDO object to be deleted
Throws: DKException
if error occurs during delete.
Overrides:
deleteObject in class dkAbstractDatastore
public void retrieveObject(dkDataObject dataobj) throws DKException, Exception
Retrieves a data-object.
Parameters:
ddo—document object to be retrieved.
Throws: DKException
when retrieve failed.
Overrides:
retrieveObject in class dkAbstractDatastore
public void updateObject(dkDataObject dataobj) throws DKException, Exception
Updates a data-object.
Parameters:
ddo—the data-object to be updated.
Throws: DKException
if error occurs in the datastore
Overrides:
updateObject in class dkAbstractDatastore
public void commit( ) throws DKException
Commits all activities since the last commit.
Throws: DKException
is thrown since federated datastore does not support transaction scope for now.
Overrides:
commit in class dkAbstractDatastore
public void rollbacks throws DKException
Rolls back all activities since the last commit.
Throws: DKException
is thrown since Federated does not support transaction scope for now.
Overrides:
rollback in class dkAbstractDatastore
public boolean isconnected( )
Checks to see if the datastore is connected
Returns:
true if connected, false otherwise
Overrides:
isConnected in class dkAbstractDatastore
public DKHandle connections throws Exception Gets the connection handle for the datastore.
Returns:
the connection handle
Overrides:
connection in class dkAbstractDatastore
public DKHandle handle(String type) throws Exception
Gets a datastore handle.
Parameters:
type—type of datastore handle wanted
Returns:
a datastore handle
Overrides:
handle in class dkAbstractDatastore
public String userName( )
Gets the user name that user used to logon to the datastore.
Returns:
the userid that user used to logon
Overrides:
userName in class dkAbstractDatastore
public String datastoreName( ) throws Exception
Gets the name of this datastore object. Usually it represents a datastore source's server name.
Returns:
datastore name
Overrides:
datastoreName in class dkAbstractDatastore
public String datastoreType( ) throws Exception
Gets the datastore type for this datastore object.
Returns:
datastore type
Overrides:
datastoreType in class dkAbstractDatastore
public dkDatastoreDef datastoreDef( ) throws DKException, Exception
Gets datastore definition.
Returns:
the meta-data (dkDatastoreDef) of this datastore
Overrides:
datastoreDef in class dkAbstractDatastore
public dkcollection listEntities( ) throws DKException, Exception
Gets a list of federated entities from Federated server.
Returns:
a collection of dkEntityDef
Throws: DKException
if error occurs
Overrides:
listEntities in class dkAbstractDatastore
public String[ ] listEntityNames( ) throws DKException, Exception
Gets a list of federated entities names from Federated server.
Returns:
an array of names
Throws: DKException
if error occurs Overrides:

listEntityNames in class dkAbstractDatastore public String[ ] listTextEntityNames( ) throws DKException, Exception Gets a list of federated text search entities names from Federated server.

Returns:

an array of names

Throws: DKException if error occurs public String[ ] listParmEntityNames( ) throws DKException, Exception Gets a list of federated parametric search entities names from Federated server.

Returns:

an array of names

Throws: DKException if error occurs

Overrides:

listEntityAttrs public dkcollection listEntityAttrs(String entityName) throws DKException, Exception Gets a list of attributes for a given entity name.

Parameters:

entityName—name of entity to retrieve attributes for

Returns:

a dkCollection of dkAttrDef objects

Throws: DKException if the entity name does not exist

Overrides:

listEntityAttrs in class dkAbstractDatastore public String[ ] listEntityAttrNames(String entityName) throws DKException, Exception Gets a list of attribute names for a given entity name.

Parameters:

entityName—name of entity to retrieve attribute names for

Returns:

an array of attribute names

Throws: DKException if the entity name does not exist

Overrides:

listEntityAttrNames in class dkAbstractDatastore public String registerMapping(DKNVPair sourceMap) throws DKException, Exception Registers a mapping definition to this datastore. Mapping is done by entities.

Parameters:

sourceMap—source name and mapping, a DKNVPair class with the following possible values:

("BUFFER",): buffer_ref is a reference to a string in memory ("FILE",): file_name is the name of the file containing the mapping ("URL",): URL-address location of the mapping ("LDAP",): LDAP file-name ("SCHEMA",): a reference to a dkSchemaMapping object defining the mapping. Currently, only "SCHEMA" option is supported, others may be added later.

Returns:

the name of the mapping definition.

Overrides:

registerMapping in class dkbstractDatastore

See Also:

unRegisterMapping public void unRegisterMapping(String mappingName) throws DKException, Exception Unregisters mapping information from this datastore.

Parameters:

mappingname—name of the mapping information

Overrides:

unRegisterMapping in class dkAbstractDatastore

See Also:

registerMapping public String[ ] listMappingNames( ) throws DKException, Exception Gets the list of the registered mappings for this datastore.

Returns:

an array of registered mapping objects' names. The array length would be zero if there is no mapping registered.

Overrides:

listMappingNames in class dkAbstractDatastore

See Also:

registerMapping public dkSchemaMapping getMapping(String mappingName) throws DKException, Exception Gets mapping information from this datastore.

Parameters:

mappingName—name of the mapping information

Returns:

the schema mapping object

Overrides:

getMapping in class dkAbstractDatastore

See Also:

registerMapping public synchronized dkextension getExtension(String extensionName) throws DKException, Exception Gets the extension object from a given extension name.

Parameters:

extensionname—name of the extension object.

Returns:

extension object.

Overrides:

getextension in class dkAbstractDatastore public synchronized void addExtension(String extensionName, dkExtension extensionObj) throws DKException, Exception Adds a new extension object.

Parameters:

extensionName—name of new extension object extensionObj—the extension object to be set Overrides:

add Extension in class dkAbstractDatastore public synchronized void removeExtension(String extensionName) throws DKException, Exception Removes an existing extension object.

Parameters:

extensionName—name of extension object to be removed

Overrides:

removeExtension in class dkAbstractDatastore public synchronized String[ ] listExtensionNames( ) throws DKException, Exception Gets the list of extension objects' names.

Returns:

an array of extension objects' names

Overrides:

listExtensionNames in class dkAbstractDatastore public DKDDO createDDO(String objectType, int Flags) throws DKException, Exception Creates a new DDO with object type, properties and attributes set for a given backend server.

Parameters:

objectType—the object type

Flags—to indicate various options and to specify more detailed characteristics of the DDO to create. For example, it may be a directive to create a document DDO, a folder, etc.

Returns:

a new DDO of the given object type with all the properties and attributes set, so that the user only needs to set the attribute values Overrides:

createDDO in class dkAbstractDatastore public dkcollection listSearchTemplates( ) throws DKException, Exception Gets a list search templates from a federated server.

Returns:

a DKSequentialCollection of search templates

Throws: DKException if internal datastore error occurs public String[ ] listSearchTemplateNames( ) throws DKException, Exception Gets a list search templates' names from a federated server.

Returns:

an array of search template names

Throws: DKException if internal datastore error occurs public dkSearchTemplate getSearchTemplate(String templateName) throws DKException, Exception Gets a search template information from a given template name.

Returns:

dkSearchTemplate object.

Throws: DKException if internal datastore error occurs public void destroy( ) throws DKException, Exception Destroys datastore—datastore cleanup if needed Overrides:

destroy in class dkAbstractDatastore public synchronized string addRemoveCursor (dkResultSetCursor iCurt int action)

throws DKException, Exception public dkDatastore datastoreByServerName (String dsType, String dsName)

throws DKException, Exception

Gets a reference to the specified datastore. The datastore must be connected, otherwise it will return null even if one is found. First, it will look in the free connection pool. If none found, it will look under the connection pool held by active cursors.

public void changePassword (String serverName,

String user Id,

String oldPwd,

String newPwd)

throws DKException, Exception

Changes the password of a given user Id for a specified server. Administrator only function.

Parameters:

userid—the user—id oldPwd—the old password newPwd—the new password public void requestConnection (String serverName, String userId, Stringpasswd, String connectString)

throws DKException, Exception

Requests a connection to a particular server with the given userid, password & connectString.

Parameters:

userId—the user Id passwd—the password connectString—the connect string to logon public void excludeServer (Sting serverName, String templateName)

throws DKException, Exception

Requests the named server to be skipped for the named search template.

Parameters:

serverName—a back end server name templateName—a search template name public boolean isServerExcluded (String serverName, String templateName)

throws DKException, Exception, java.rmi. RemoteException

Checks if the given server is in the excluded list for the named search template.

Parameters:

serverName—a back end server name templateName—a search template name

Returns:

true or false public String[ ] listExcludedServers(String templateName) throws DKException, Exception Lists all the excluded servers for the named search template Parameters:

s—templateName—a search template name

Returns:

an array of server names that were excluded during search public void clearExcludedServers(String templateName) throws DKException, Exception Clears all the excluded servers for the named search template Parameters:

s—templateName—a search template name

The following is sample syntax of a federated query string. However, it is to be understood that other syntax, including other parameters, may be used for the federated query string without departing from the scope of the invention.

Each native query is submitted to the corresponding native datastore for execution. Initially, the results returned are cursors to the data in each datastore.

```
PARAMETRIC_SEARCH=([ENTITY=entity_name,]
        [MAX_RESULTS=maximum_results,]
        [COND=(conditional_expression)]
        [;...]
        );
    [OPTION=([CONTENT=yes_no]
        )]
[and_or
TEXT_SEARCH=(COND=(text_search_expression)
        );
    [OPTION=([SEARCH_INDEX={search_index_name | (index_list) };]
        [MAX_RESULTS=maximum_results;]
        [TIME_LIMIT=time_limit]
        )]
]
[and_or
IMAGE_SEARCH=(COND=(image_search_expression)
        );
    [OPTION=([SEARCH_INDEX={search_list) };]
        [MAX_RESULTS=maximum_results;]
        )]
]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query translation. Translates the query canonical form into several native queries that corresponds to each native datastore associated to this federated datastore. The translation information is obtained from the schema mapping.

Data conversion. Converts data in the query into a native data type for each of the associated native datastores. This process uses the mapping and conversion mechanisms described in the schema mapping.

Data filtering. Filters only the relevant data during the construction of native queries.

The end-result of an initial query is a federated result set cursor object, which is a virtal collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data conversion. Converts data from the native type into a federated type according to the mapping information.

Data filtering. Filters the results to include only the requested data Result merging. Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.

DKFederatedQuery.java

```
package com.ibm.mm.sdk.common.DKFederatedQuery
public class DKFederatedQuery
    extends Object
    implements dkQuery, DKConstant, DKMessageId, Serializable
{
public DKFederatedQuery(dkDatastore creator,
        String queryString)
public DKFederatedQuery(dkDatastore creator,
public DKFederatedQuery(DKFederatedQuery fromQuery)
```

```
    -continued
public void prepare(DKNVPair params[ ]) throws DKException, Exception
public void execute(DKNVPair params[ ]) throws DKException, Exception
public int status( )
public Object result( ) throws DKException, Exception
public dkResultSetCursor resultSetCursor( ) throws DKException, Exception
public short qlType( )
public String queryString( )
public dkDatastore getDatastore( )
public void setDatastore(dkDatastore ds) throws DKException, Exception
public String getName( )
public void setName(String name)
public int numberOfResults( )
};
```

The following methods are part of the federated query class:

public DKFederatedQuery(dkDatastore creator,
   String queryString)
   Constructs a Federated query.
   Parameters:
   creator—datastore
   queryString—a query string
public DKFederatedQuery(dkDatastore creator,
   DKCQExpr queryExpr)
   Constructs a Federated query
   Parameters:
   creator—datastore
   queryExpr—a query expression
public DKFederatedQuery(DKFederatedQueryfromQuery)
   Constructs a Federated query from a Federated query object.
   Parameters:
   fromQuery—Federated query
public voidprepare(DKNVPair params[ ]) throws DKException, Exception
   Prepares a query.
   Parameters:
   params—additional prepare query option in name/value pair
public void execute(DKNVPair params[ ]) throws DKException, Exception
   Executes a query.
   Parameters:
   params—additional query option in name/value pair
public int status( )
   Gets query status.
   Returns:
   query status
public Object result( ) throws DKException, Exception
   Gets query result.
   Returns:
   query result in a DKResults object
public dkResultSetCursor resultSetCursor( ) throws DKException, Exception
   Gets query result.
   Returns:
   query result in a dkResultSetCursor object
public short qlType( )
   Gets query type.
   Returns:
   query type
public String querystring( )
   Gets query string
   Returns:
   query string
public dkDatastore getDatastore( )
   Gets the reference to the owner datastore object.
   Returns:
   the dkDatastore object
public void setDatastore(dkDatastore ds) throws DKException, Exception
   Sets the reference to the owner datastore object.
   Parameters:
   ds—a datastore
public String getName( )
   Gets query name.
   Returns:
   name of this query
public void setName(String name)
   Sets query name.
   Parameters:
   name—new name to be set to this query object
public int numberOfResults( )
   Gets the number of query results.
   Returns:
   number of query results 3. Digital Library Datastore DKDatastoreDL is a specific version of dkDatastore used to implement the Digital Library/Visual Info datastore. It provides Documents, Parts and Folders storage and retrieval mechanisms, as well as search and other document processing capabilities supported by Digital Library. An example class definition for DKDatastoreDL is set forth below.

DKDatastoreDL

```
    package com.ibm.mm.sdk.server.DKDatastoreDL
public class DKDatastoreDL
    extends dkAbstractDatastore
    implements DKConstantDL, DKMessageIdDL
{
public DKDatastoreDL() throws DKException, Exception
public DKDatastoreDL(String configuration) throws DKException, Exception
public void connect(String datastore_name,
        String user_name,
        String authentication,
        String connect_string) throws DKException, Exception
public void disconnect() throws DKException, Exception
public Object getOption(int option) throws DKException, Exception
public void setOption(int option,
        Object value) throws DKException, Exception
public Object evaluate(String command,
        short commandLangType,
        DKNVPair params[]) throws DKException, Exception
public Object evaluate(dkQuery query) throws DKException, Exception
public Object evaluate(DKCQExpr qe) throws DKException, Exception
public dkResultSetCursor execute(String command,
            short commandLangType,
            DKNVPair params[]) throws DKException, Exception
public dkResultSetCursor execute(dkQuery query) throws DKException, Exception
public dkResultSetCursor execute(DKCQExpr cqe) throws DKException, Exception
public void executeWithCallback(dkQuery query,
            dkCallback callbackObj) throws DKException, Exception
public void executeWithCallback(String command,
            short commandLangType,
            DKNVPair params[],
            dkCallback callbackObj) throws DKException, Exception
public void executeWithCallback(DKCQExpr qe,
            dkCallback callbackObj) throws DKException, Exception
public dkQuery createQuery(String command,
        short commandLangType,
        DKNVPair params[]) throws DKException, Exception
public dkQuery createQuery(DKCQExpr qe) throws DKException, Exception
public void addObject(dkDataObject ddo) throws DKException, Exception
public void deleteObject(dkDataObject ddo) throws DKException, Exception
public void retrieveObject(dkDataObject ddo) throws DKException, Exception
public void updateObject(dkDataObject ddo) throws DKException, Exception
public void moveObject(dkDataObject ddo,
        String entityName) throws DKException, Exception
public void startTransaction() throws DKException, Exception
public void commit() throws DKException, Exception
public void rollback() throws DKException, Exception
public boolean isConnected() throws Exception
public String datastoreName() throws Exception
public String datastoreType() throws Exception
public DKHandle connection() throws Exception
public DKHandle handle(String type) throws Exception
public DKHandle transactionConnection() throws DKException, Exception
public String userName() throws Exception
public dkCollection listDataSources() throws DKException, Exception
public String[] listDataSourceNames() throws DKException, Exception
public Object listServers() throws DKException, Exception
public Object listSchema() throws DKUsageError
public Object listSchemaAttributes(String schemaEntry) throws DKusageError,
    DKDatastoreAccessError
public dkCollection listEntities() throws DKException, Exception
public String[] listEntityNames() throws DKException, Exception
public dkCollection listEntityAttrs(String entityName) throws DKException, Exception
public String[] listEntityAttrNames(String entityName) throws DKException, Exception
public void wakeUpService(String searchEngine) throws DKException, Exception
public void invokeSearchEngine(String searchEngine,
            String searchIndex) throws DKException, Exception
public dkDatastoreDef datastoreDef()
public DKWorkFlowServiceDL createWorkFlowService() throws DKException,
Exception
public String registerMapping(DKNVPair sourceMap) throws DKException, Exception
public void unRegisterMapping(String mappingName) throws DKException, Exception
public String[] listMappingNames() throws DKException, Exception
public dkschemaMapping getMapping(String mappingName) throws DKException,
Exception
public synchronized dkExtension getExtension(String extensionName) throws
    DKException, Exception
public synchronized void addExtension(String extensionName,
```

-continued

```
            dkExtension extensionObj) throws DKException, Exception
    public synchronized void removeExtension(String extensionName) throws DKException,
        Exception
    public synchronized String[] listExtensionNames() throws DKException, Exception
    public DKDDO createDDO(String objectType,
            int Flags) throws DKException, Exception
    public void destroy() throws DKException, Exception
    public boolean isCheckedOut(dkDataObject dobj) throws DKUsageError,
        DKDatastoreAccessError
    public String checkedOutUserid(dkDataObject dobj) throws DKUsageError,
        DKDatastoreAccessError
    public void unlockCheckedOut(dkDataObject dobj) throws DKUsageError,
        DKDatastoreAccessError
    public void checkOut(dkDataObject dobj) throws DKUsageError,
    DKDatastoreAccessError
    public void checkIn(dkDataObject dobj) throws DKUsageError, DKDatastoreAccessError
    public void changePassword(String userId,
            String oldPwd,
            String newPwd) throws DKException, Exception
    public synchronized dkXDO retrieveFormOverlay(String objid) throws DKException,
    Exception
    public DKCQExpr translate(DKCQExpr cqe) throws DKException, Exception
    }
```

The following methods are part of the DKDatastoreDL class:

public DKDatastoreDL( ) throws DKException, Exception

Constructs the datastore and initializes the datastore.

public DKDatastoreDL(String configuration) throws DKException, Exception

Constructs the datastore and initializes the datastore.

public void connect(String datastore_name,

String user_name,

String authentication,

String connect_string) throws DKException, Exception

Connects to a datastore.

Parameters:

datastore_name—the datastore name used for connection user_name—the user name used for connection authentication—the authentication used for connection connect_string—the connect sting used for connection. This is used to provide additional connection options.

Overrides:

connect in class dkAbstracDatastore public void disconnect( ) throws DKException, Exception Disconnects from a datastore.

Overrides:

disconnect in class dkAbstractDatastore public Object getOption(int option) throws DKException, Exception Gets a datastore option.

Parameters:

option—the option identifier

Returns:

an option value

Overrides:

getOption in class dkAbstractDatastore public void setOption(int option,

Object value) throws DKException, Exception

Sets a datastore option.

Parameters:

option—the option identifier value—the option value

Overrides:

setOption in class dkAbstractDatastore public Object evaluate(String command, short commandLangType, DKNVPair params[ ]) throws DKException, Exception Evaluates the query.

Parameters:

command—a query string commandlang—a query type params—additional query option in name/value pair Returns:

a collection of the results

Overrides:

evaluate in class dkAbstractDatastore public Object evaluate(dkquery query) throws DKException, Exception Evaluates the query.

Parameters:

query—a query object

Returns:

a collection of the results

Overrides:

evaluate in class dAbstractDatastore public Object evaluate(DKCQExpr qe) throws DKException, Exception Evaluates the query.

Parameters:

qe—a common query expression object

Returns:

a collection of the results

Overrides:

evaluate in class dkAbstractDatastore public dkResultSetCursor execute(String command, short commandLangType, DKNVPairparams[ ]) throws DKException, Exception Executes the query.
Parameters:
command—a query sting
commandlang—a query type
params—additional query option in name/value pair
Returns:
resultSetCursor which represents a datastore cursor.
Overrides:
execute in class dkAbstractDatastore
public dkResultSetCursor execute(dkQuery query) throws DKException, Exception
Executes the query.
Parameters:
query—a query object
Returns:
resultSetCursor which represents a datastore cursor.
Overrides:
execute in class dkAbstractDatastore
public dkResultSetCursor execute(DKCQExpr cqe) throws DKException, Exception
Executes a query expression and returns a result set cursor
Parameters:
cqe—a common query expression object
Returns:
resultSetCursor which represents a datastore cursor.
Overrides:
execute in class dkAbstractDatastore
public void executeWithCallback(dkQuery query,
   dkcallback callbackObj) throws DKException, Exception
Executes the query with callback function.
Parameters:
qo—a query object
callbackObj—a dkCallback object
Overrides:
executeWithCallback in class dkAbstractDatastore
public void executeWithCallback(String command,
   short commandLangType,
   DKNVAPair params[ ],
   dkcallback callbackObj) throws DKException, Exception
Executes the query with callback function.
Parameters:
command—a query string
commandLang—a query type
params—additional query option in name/value pair
callbackObj—a dkCallback object
Overrides:
executeWithCallback in class dkAbstractDatastore
public void executeWithCallback(DKCQExpr qe,
   dkcallback callbackObj) throws DKException, Exception
Executes the query with callback function.
Parameters:
qe—a common query expression object
callbackObj—a dkCallback object
Overrides:
executeWithCallback in class dkAbstractDatastore
public dkQuery createQuery(String command,
   short commandLangType,
   DKNVPair params[ ]) throws DKException, Exception Creates a query object.
Parameters:
command—a query string
commandlang—a query type
params—additional query option in name/value pair
Returns:
a query object
Overrides:
createQuery in class dkAbstractDatastore
public dkQuery createQuery(DKCQExpr qe) throws DKException, Exception
Creates a query object.
Parameters:
qe—a common query expression object
Overrides:
createQuery in class dkAbstractDatastore
public void addObject(dkDataObject ado) throws DKException, Exception
Adds this data-object to the DL datastore.
Parameters:
ddo—the data-object to be added to this datastore
Overrides:
addObject in class dkAbstractDatastore
See Also:
add
public void deleteObject(dkDataObject ddo) throws DKException, Exception
Deletes this data-object from this datastore.
Parameters:
ddo—the data-object to be deleted from this datastore
Overrides:
deleteObject in class dkAbstractDatastore
See Also:
del
public void retrieveObject(dkDataObject ddo) throws DKException, Exception
Retrieves the data-object from this datastore.
Parameters:
ddo—the data-object to be retrieved from this datastore
Overrides:
retrieveObject in class dkAbstractDatastore
See Also:
retrieve
public void updateObject(dkDataObject ddo) throws DKException, Exception
Updates the data-object in this datastore.
Parameters:
ddo—the data-object to be updated in this datastore
Overrides:
updateObject in class dkAbstractDatastore
See Also:
update
public void moveObject(dkDataObject ddo,
   String entityName) throws DKException, Exception
Moves the data-object from one index class to another in this datastore.
Parameters:
ddo—the data-object to be move in this datastore
   entityName—new entity name to move this data-object to public void startTransaction( ) throws DKException, Exception
   Starts a transaction
public void commit( ) throws DKException, Exception
   Commits a datastore transaction
   Overrides:
   commit in class dkAbstractDatastore
public void rollback( ) throws DKException, Exception
   Rolls back a datastore transaction
   Overrides:
   rollback in class dkAbstractDatastore
public boolean isconnected( ) throws Exception
   Checks to see if the datastore is connected.
   Returns:
   true if connected
   Overrides:
   isConnected in class dkAbstractDatastore
public String datastoreName( ) throws Exception
   Gets the name of this datastore object. Usually it represents a datastore source's server name.
   Returns:
   datastore name
   Overrides:
   datastoreName in class dkAbstracDatastore
public String datastoreType( ) throws Exception
   Gets the datastore type for this datastore object
   Returns:
   datastore type
   Overrides:
   datastoreType in class dkAbstractDatastore
public DKHandle connection( ) throws Exception
   Gets the connection handle for a datastore
   Returns:
   connection handle
   Overrides:
   connection in class dkAbstractDatastore
public DKHandle handle(String type) throws Exception
   Gets a datastore handle
   Parameters:
   type—type of datastore handle wanted
   Returns:
   a datastore handle
   Overrides:
   handle in class dkAbstractDatastore
public DKHandle transactionConnection( ) throws DKException, Exception
   Gets the transaction handle for a datastore
   Returns:
   transaction handle
public String userName( ) throws Exception
   Gets the user name for this datastore object
   Returns:
   user name
   Overrides:
   userName in class dkAbstractDatastore
public dkCollection listDataSources( ) throws DKException, Exception
   List the available datastore sources that can be used to connect with.
   Returns:
   a collection of server definitions
   Overrides:
   listDataSources in class dkAbstractDatastore
public String[ ] listDataSourceNames( ) throws DKException, Exception
   Lists the available datastore source names that can be used to connect with.
   Returns:
   an array of server names
   Overrides:
   listDataSourceNames in class dkAbstractDatastore
public Object listServers( ) throws DKException, Exception
   Lists the available datastore sources that can be used to connect with. Note: listservers( ) is deprecated. Replace by listDataSources.
   Returns:
   a collection of server definitions
   Overrides:
   listServers in class dkAbstractDatastore
   See Also:
   listDataSources
public Object listschema( ) throws DKUsageError
   Lists the entities that belong to this datastore. Note: listschema( ) is deprecated. Replace by listentities.
   Returns:
   an object that contains the schema
   Overrides:
   listSchema in class dkAbstractDatastore
   See Also:
   listEntities
public Object listSchemaAttributes(String schemaEntry) throwsDKUsageError, DKDatastoreAccessError
   Lists the attributes that belong to a schema Note: listSchemaAttributes( ) is deprecated. Replace by listEntityAttributes.
   Parameters:
   schemaEntry—the name of the schema
   Returns:
   an object that contains the attributes that belong to this schema
   Overrides:
   listSchemaAttributes in class dkAbstractDatastore
   See Also:
   listEntityAttrs
public dkCollection listEntities( ) throws DKException, Exception
   Gets a list of entities from persistent datastore
   Returns:
   a collection of entity defs
   Throws: DKException
   if error occurs
   Overrides:
   listEntities in class dkAbstractDatastore
public String[ ] listEntityNames( ) throws DKException, Exception
   Gets a list of entity names from persistent datastore Returns:

an array of entity names

Throws: DKException if error occurs

Overrides:

listEntityNames in class dkAbstractDatastore public dkcollection listEntityAttrs(String entityName) throws DKException, Exception Gets a list of attributes for a given entity name.

Parameters:

entityName—name of entity to retrieve attributes for

Returns:

a dkCollection of dkAttrDef objects

Throws: DKException if the entity name does not exist

Overrides:

listEntityAttrs in class dkAbstractDatastore public String[ ] listEntityAttrNames(String entityName) throws DKException, Exception Gets a list of attribute names for a given entity name.

Parameters:

entityName—name of entity to retrieve attribute names for

Returns:

an array of attribute names

Throws: DKException if the entity name does not exist

Overrides:

listEntityAttrNames in class dkAbstractDatastore public void wake UpService(String searchEngine) throws DKException, Exception Wakes up a user exit to process search index request. Note: wakeUpService( ) is deprecated. Replace by invokeSearchEngine.

Parameters:

searchengine—search engine name (SM)

See Also:

invokeSearchEngine public void invokeSearchEngine(String searchEngine, String searchIndex) throws DKException, Exception Invokes a user exit to process search index request.

Parameters:

searchEngine—search engine name (ie SM or QBIC)

searchIndex—search index (ie TM-TMINDEX or QBICDB-QBICCAT-QBICSRV)

public dkDatastoreDef datastoreDef( )

Gets datastore definition

Returns:

the meta-data (dkDatastoreDef) of this datastore

Overrides:

datastoreDef in class dkAbstractDatastore public DKWorkFlowServiceDL createWorkFlowService( ) throws DKException, Exception Gets work flow service Returns:

the a work flow service for this datastore public String registerMapping(DKNVPair sourceMap) throws DKException, Exception Registers a mapping definition to this datastore. Mapping is done by entities.

Parameters:

sourceMap—source name and mapping, a DKNVPair class with the following possible values:

("BUFFER",): buffer_ref is a reference to a string in memory ("FILE",): file_name is the name of the file containing the mapping ("URL",): URL-address location of the mapping ("LDAP",): LDAP file-name "SCHEMA",): a reference to a dkSchemaMapping object defining the mapping. Currently, only "SCHEMA" option is supported, others may be added later.

Returns:

the name of the mapping definition.

Overrides:

registerMapping in class dkAbstractDatastore

See Also:

unRegisterMapping public void unRegisterMapping(String mappingName) throws DKException, Exception Unregisters mapping information from this datastore.

Parameters:

mappingName—name of the mapping information

Overrides:

unRegisterMapping in class dkAbstractDatastore

See Also:

registerMapping public String[ ] listMappingNames( ) throws DKException, Exception Gets the list of the registered mappings from this datastore.

Returns:

an array of registered mapping objects' names

Overrides:

listMappingNames in class dkAbstractDatastore

See Also:

registerMapping public dkSchemaMapping getMapping(String mappingName) throws DKException, Exception Gets a mapping information from this datastore.

Parameters:

mappingName—name of the mapping information

Returns:

the schema mapping object

Overrides:

getMapping in class dkAbstractDatastore

See Also:

registerMapping public synchronized dkExtension getExtension(String extensionName) throws DKException, Exception Gets the extension object from a given extenstion name.

Parameters:

extensionname—name of the extension object.

Returns:

extension object.

Overrides:

getextension in class dkAbstractDatastore public synchronized void addExtension(String extensionName, dkExtension extensionObj) throws DKException, Exception Adds a new extension object.

Parameters:

extensionname—name of new extension object extensionObj—the extension object to be set Overrides:

addextension in class dkAbstractDatastore public synchronized void removeExtension(String extensionName) throws DKException, Exception Removes an existing extension object Parameters:

extensionName—name of extension object to be removed

Overrides:

removeExtension in class dkAbstractDatastore public synchronized String[ ] listExtensionNames( ) throws DKException, Exception Gets the list of extension objects' names Returns:

an array of extension objects' names

Overrides:

listExtensionNames in class dkAbstractDatastore public DKDDO createDDO(String objectType, int Flags) throws DKException, Exception Creates a new DDO with object type, properties and attributes set for a given backend server.

Parameters:

objectType—the object type user wants to create

Flags—to indicate various options to specify more detailed characteristics of the DDO to create. For example, it may be a directive to create a document DDO, a folder, etc.

Returns:

a new DDO of the given object type with all the properties and attributes set, so that the user only need to set the attribute values Overrides:

createDDO in class dkAbstractDatastore public void destroy( ) throws DKException, Exception Destroys datastore—datastore cleanup if needed Overrides:

destroy in class dkAbstractDatastore public boolean isCheckedOut(dkDataObject dobj) throws DKUsageError, DKDatastoreAccessError Checks whether a document or folder item is checked out from datastore Parameters:

dobj—data object (document or folder item)

Returns:

a boolean indicating if it is checked out or not public String checkedOutUserid(dkDataObject dobj) throws DKUsageError, DKDatastoreAccessError Lists the userid who checked out the document or folder Parameters:

dobj—data object (document or folder item)

Returns:

a userid or empty string (i.e., not checked out)

public void unlockCheckedOut(dkDataObject dobj) throws DKUsageError,

DKDatastoreAccessError

Unlocks the checked-out document or folder item

Parameters:

dobj—data object (document or folder item)

public void checkOut(dkDataObject dobj) throws DKUsageError, DKDatastoreAccessError Checks out document or folder item from datastore Parameters:

dobj—data object (document or folder item)

public void checkIn(dkDataObject dobj) throws DKUsageError, DKDatastoreAccessError Checks in document or folder item from datastore Parameters:

dobj—data object (document or folder item)

public void changePassword(String userId,

String oldPwd,

String newPwd) throws DKException, Exception

Changes LS user password

Overrides:

changepassword in class dkAbstractDatastore public synchronized dkXDO retrieveFormOverlay(String objid) throws DKException, Exception Retrieves the form overlay object Parameters:

id—the id string to retrieve the object

Returns:

the form overlay xdo object public void moveObject (dkDataObject ddo, String entityName) throws DKException, Exception Moves the data object from one index class to another.

Parameters:

ddo—data object to be moved entityName—target index class for this data object public DKCQExpr translate(DKCQExpr cqe) throws DKException, Exception Translates a query expression into a native query expression processable by this datastore.

Parameters:

cqe—the input compound query expression

Returns:

a translated query expression or null if the expression is invalid

4. OBIC Datastore

DKDatastoreQBIC is a specific version of dkDatastore used to implement the QBIC datastore. An example class definition for DKDatastoreQBIC is set forth below.

DKDatastoreQBIC

```
package com.ibm.mm.sdk.server.DKDatastOreQBIC
public class DKDatastoreQBIC
    extends dkAbstractDatastore
    implements DKCorstantDL, DKMessageIdDL
{
public DKDatastOreQBIC() throws DKException, Exception
public DKDatastoreQBIC(String configuration) throws DKException, Exception
public void connect(String datastore_name,
        String user_name,
        String authentication,
        String connect_string) throws DKException, Exception
public void disconnect() throws DKException, Exception
public Object getOption(int option) throws DKException, Exception
public void setOption(int option,
        Object value) throws DKException, Exception
public Object evaluate(String command,
        short commandLangType,
        DKNVPair params[]) throws DKException, Exception
public Object evaluate(dkQuery query) throws DKException, Exception
public Object evaluate(DKCQExpr qe) throws DKException, Exception
public dkResultSetCursor execute(String command,
        short commandLangType,
        DKNVPair params[]) throws DKException, Exception
public dkResultSetCursor execute(dkQuery query) throws DKException, Exception
public dkResultSetCursor execute(DKCQExpr qe) throws DKException, Exception
public void executeWithCallback(dkQuery query,
        dkCallback callbackObj) throws DKException, Exception
public void executewithCallback(String command,
        short commandLangType,
        DKNVPair params[],
        dkCallback callbackObj) throws DKException, Exception
public void executeWithCallback(DKCQExpr qe,
        dkCallback callbackObj) throws DKException, Exception
public dkQuery createQuery(String command,
        short commandLangType,
        DKNVPair params[]) throws DKException, Exception
public dkQuery createQuery(DKCQExpr qe) throws DKException, Exception
public void addObject(dkDataObject ddo) throws DKException, Exception
public void deleteObject(dkDataObject ddo) throws DKException, Exception
public void retrieveObject(dkDataObject ddo) throws DKException, Exception
public void updateObject(dkDataObject ddo) throws DKException, Exception
public void commit() throws DKException, Exception
public void rollback() throws DKException, Exception
public boolean isConnected() throws Exception
public String datastoreName() throws Exception
public String datastoreType() throws Exception
public DKHandle connection() throws Exception
public DKHandle handle(String type) throws Exception
public String userName() throws Exception
public dkCollection listDataSources() throws DKException, Exception
public String[] listDataSourceNames() throws DKException, Exception
public Object listServers() throws DKException, Exception
public Object listSchema() throws DKException, Exception
public Object listSchemaAttributes(String schemaEntry) throws DKException, Exception
public dkCollection listEntities() throws DKException, Exception
public String[] listEntityNames() throws DKException, Exception
public dkCollection listEntityAttrs(String entityName) throws DKException, Exception
public String[] listEntityAttrNames(String entityName) throws DKException, Exception
public void destroy() throws DKException, Exception
public void createDatabase(String database_name) throws DKException, Exception
public void deleteDatabase(Suing database_name) throws DKException, Exception
public void createCatalog(String database_name,
            String catalog_name) throws DKException, Exception
public void deleteCatalog(String database_name,
            String catalog_name) throws DKException, Exception
public void openCatalog(String database_name,
        String catalog_name) throws DKException, Exception
public void closeCatalog() throws DKException, Exception
public void addColorFeature() throws DKException, Exception
public void addDrawFeature() throws DKException, Exception
public void addColorHistogramFeature() throws DKException, Exception
public void addTextureFeature() throws DKException, Exception
public void addFeature(int featureSelection,
        boolean bReCatalog) throws DKException, Exception
public void removeColorFeature() throws DKException, Exception
public void removeDrawFeature() throws DKException, Exception
public void removeColorHistogramFeature() throws DKException, Exception
```

-continued

```
    public void removeTextureFeature() throws DKException, Exception
    public void processImages(DKImageRecordQBIC imageList[],
            int count) throws DKException, Exception
    public synchronized void queueImages(DKImageRecordQBIC imageList[],
                int count) throws DKException, Exception
    public void processImageQueue() throws DKException, Exception
    public void reCatalogImages(int featureSelectionList) throws DKException, Exception
    public Object listDatabases() throws DKException, Exception
    public Object listCatalogs() throws DKException, Exception
    public Object listCatalogs(String database_name) throws DKException, Exception
    public Object listFeatures() throws DKException, Exception
    public Object listColorImages() throws DKException, Exception
    public Object listHistogramImages() throws DKException, Exception
    public Object listDrawImages() throws DKException, Exception
    public Object listTextureImages() throws DKException, Exception
    public String databaseName() throws DKException, Exception
    public String catalogName() throws DKException, Exception
    public String getLibServerName() throws DKException, Exception
    public dkDatastoreDef datastoreDef() throws DKException, Exception
    public String registerMapping(DKNVPair sourceMap) throws DKException, Exception
    public void unRegisterMapping(String mappingName) throws DKException, Exception
    public String[] listMappingNames() throws DKException, Exception
    public dkSchemaMapping getMapping(String mappingName) throws DKException,
    Exception
    public synchronized dkExtension getExtension(String extensionName) throws
        DKException, Exception
    public synchronized void addExtension(String extensionName,
                    dkExtension extensionObj) throws DKException, Exception
    public synchronized void removeExtension(String extensionName) throws DKException,
        Exception
    public synchronized String[] listExtensionNames() throws DKException, Exception
    public DKDDO createDDO(String objectType,
                int Flags) throws DKException, Exception
}
```

The following methods are part of the DKDatastoreQBIC class:

public DKDatastoreQBICO throws DKException, Exception

Constructs the datastore and initializes the datastore.

public DKDatastoreQBIC(String configuration) throws DKException, Exception

Constructs the datastore and initializes the datastore.

public void connect(String datastore_name, String user_name, String authentication, String connect_string) throws DKException, Exception Connects to a datastore.

Parameters:

datastore_nane—the datastore name used for connection user_name—the user name used for connection authentication—the authentication used for connection connect_string—the connect string used for connection. This is used to provide additional connection options.

Overrides:

connect in class dkAbstractDatastore public void disconnect( ) throws DKException, Exception Disconnects to a datastore.

Overrides:

disconnect in class dkAbstractDatastore public Object getOption(int option) throws DKException, Exception Gets a datastore option.

Parameters:

option—the option identifier

Returns:

an option value

Overrides:

getOption in class dkAbstractDatastore public void setOption(int option,

Object value) throws DKException, Exception

Sets a datastore option.

Parameters:

option—the option identifier value—the option value

Overrides:

setOption in class dkAbstractDatastore public Object evaluate(String command, short commandLangType, DKNVPair params[ ]) throws DKException, Exception Evaluates the query.

Parameters:

command—a query string commandLang—a query type params—additional query option in name/value pair Returns:

a collection of the results

Overrides:

evaluate in class dkAbstractDatastore public Object evaluate(dkQuery query) throws DKException, Exception Evaluates the query.

Parameters:

query—a query object

Returns:

a collection of the results

Overrides:
evaluate in class dkAbstractDatastore
public Object evaluate(DKCQExpr qe) throws DKException, Exception
Evaluates the query.
Parameters:
qe—a common query expression object
Returns:
a collection of the results
Overrides:
evaluate in class ckAbstractDatastore
public dkResultSetCursor execute(String command,
short commandLangType,
DKNVPairparams[ ]) throws DKException, Exception
Executes the query.
Parameters:
command—a query string
commandLang—a query type
params—additional query option in name/value pair
Returns:
resultSetCursor which represents a datastore cursor.
Overrides:
execute in class dkAbstractDatastore
public dkResultSetCursor execute(dkQuery query) throws DKException, Exception
Executes the query.
Parameters:
query—a query object
Returns:
resultSetCursor which represents a datastore cursor.
Overrides:
execute in class dkAbstractDatastore
public dkResultSetCursor execute(DKCQExpr qe) throws DKException, Exception
Executes the query.
Parameters:
qe—a common query expression object
Returns:
resultSetCursor which represents a datastore cursor.
Overrides:
execute in class dkAbstractDatastore
public void executeWithCallback(dkQuery query,
dkcallback callbackObj) throws DKException, Exception
Executes the query with callback function.
Parameters:
qo—a query object
callbackObj—a dkCallback object
Overrides:
executeWithCallback in class dkAbstractDatastore
public void executeWithCallback(String command,
short commandLangType,
DKNVPair params[ ],
dkCallback callbackObj) throws DKException, Exception
Executes the query with callback function.
Parameters:
command—a query string
commandLang—a query type
params—additional query option in name/value pair
callbackObj—a dkCallback object
Overrides:
executeWithCallback in class dkAbstractDatastore
public void executeWithCallback(DKCQExpr qe,
dkcallback callbackObj) throws DKException, Exception
Executes the query with callback function.
Parameters:
qe—a common query expression object
callbackObj—a dkCallback object
Overrides:
executeWithCallback in class dkAbstractDatastore
public dkQuery createQuery(String command,
short commandLangType,
DKNVPairparams[ ]) throws DKException, Exception
Creates a query object.
Parameters:
command—a query string
commandLang—a query type
params—additional query option in name/value pair
Returns:
a query object
Overrides:
createQuery in class dkAbstractDatastore
public dkQuery createQuery(DKCQExpr qe) throws DKException, Exception
Creates a query object.
Parameters:
qe—a common query expression object
Overrides:
createQuery in class dkAbstractDatastore
public void addObject(dkDataObject ddo) throws DKException, Exception
Adds this ddo to this datastore.
Parameters:
ddo—the ddo to be added to this Datastore
Overrides:
addObject in class dkAbstractDatastore
public void deleteObject(dkDataObject ddo) throws DKException, Exception
Deletes this ddo from this datastore.
Parameters:
ddo—the ddo to be deleted from this Datastore
Overrides:
deleteObject in class dkAbstractDatastore
public void retrieveObject(dkDataObject ddo) throws DKException, Exception
Retrieves this ddo from this datastore.
Parameters:
ddo—the ddo to be retrieved from this Datastore
Overrides:
retrieveObject in class dkAbstractDatastore
public void updateObject(dkDataObject ddo) throws DKException, Exception
Updates this ddo in this datastore.
Parameters:
ddo—the ddo to be updated in this Datastore
Overrides:
updateObject in class dkAbstractDatastore public void commit( ) throws DKException, Exception
  Commits a datastore transaction
  Overrides:
  commit in class dkAbstractDatastore
public void rollback( ) throws DKException, Exception
  Rolls back a datastore transaction
  Overrides:
  rollback in class dkAbstractDatastore
public boolean isconnected( ) throws Exception
  Checks to see if the datastore is connected.
  Returns:
  true if connected
  Overrides:
  is Connected in class dkAbstractDatastore
public String datastoreName( ) throws Exception
  Gets the name of his datastore object. Usually it represents a datastore source's server name.
  Returns:
  datastorename
  Overrides:
  datastorename in class dkAbstractDatastore
public String datastoreType() throws Exception
  Gets the datastore type for this datastore object
  Returns:
  datastore type
  Overrides:
  datastoreType in class dkAbstractDatastore
public DKHandle connection( ) throws Exception
  Gets the connection handle for a Datastore
  Returns:
  connection handle
  Overrides:
  connection in class dkAbstractDatastore
public DKHandle handle(String type) throws Exception
  Gets a datastore handle
  Parameters:
  type—type of datastore handle wanted
  Returns:
  a datastore handle
  Overrides:
  handle in class dkAbstractDatastore
public String userName( ) throws Exception
  Gets the user name for this datastore object
  Returns:
  user name
  Overrides:
  userName in class dkAbstracIDatastore
public dkcollection listDataSources( ) throws DKException, Exception
  Lists the available datastore sources that can be used to connect with.
  Returns:
  a collection of server definitions
  Overrides:
  listDataSources in class dkAbstractDatastore
public String[ ] listDataSourceNames( ) throws DKException, Exception
  Lists the available datastore source names that can be used to connect with.
  Returns:
  an array of server names
  Overrides:
  listDataSourceNames in class dkAbstractDatastore
public Object listServers( ) throws DKException, Exception
  Lists the available datastore sources that can be used to connect with. Note: listservers( ) is deprecated. Replace by listDatasources.
  Returns:
  a collection of server definitions
  Overrides:
  listservers in class dkAbstractDatastore
  See Also:
  listDataSources
public Object listschema( ) throws DKException, Exception
  Lists the entities that belong to this datastore. Note: listschema( ) is deprecated. Replace by listEntities.
  Returns:
  an object that contains the schema
  Overrides:
  listSchema in class dkAbstractDatastore
  See Also:
  listEntities
public Object listSchemaAttributes(String schemaEntry) throws DKException, Exception
  Lists the attributes that belong to a schema. Note: listSchemaAttributes( ) is deprecated. Replace by listEntityAttributes.
  Parameters:
  schemaentry—the name of the schema.
  Returns:
  an object that contains the attributes that belong to this schema
  Overrides:
  listSchemaAttributes in class dkAbstractDatastore
  See Also:
  listEntityAttrs
public dkcollection listEntities( ) throws DKException, Exception
  Gets a list of entities from persistent Datastore
  Returns:
  a collection of entity defs
  Throws: DKException
  if error occurs
  Overrides:
  listentities in class dkAbstractDatastore
public String[ ] listEntityNames( ) throws DKException, Exception
  Gets a list of entity names from persistent Datastore
  Returns:
  an array of entity names
  Throws: DKException
  if error occurs
  Overrides:
  listEntityNames in class dkAbstractDatastore
public dkcollection listEntityAttrs(String entityName) throws DKException, Exception
  Gets a list of attributes for a given entity name.

Parameters:

entityName—name of entity to retrieve attributes for

Returns:

a dkCollection of dkAttrDef objects

Throws: DKException if the entity name does not exist

Overrides:

listEntityAttrs in class dkAbstractDatastore public String[ ] listEntityAttrNames(String entityName) throws DKException, Exception Gets a list of attribute names for a given entity name.

Parameters:

entityName—name of entity to retrieve attribute names for

Returns:

an array of attribute names

Throws: DKException if the entity name does not exist

Overrides:

listEntityAttrNames in class dkAbstractDatastore public void destroy( ) throws DKException, Exception datastore destroy—datastore cleanup if needed Overrides:

destroy in class dkAbstractDatastore public void createDatabase(String database_name) throws DKException, Exception Create image search database Parameters:

database_name—database name public void deleteDatabase(String database_name) throws DKException, Exception Deletes image search database Parameters:

database_name—database name public void createCatalog(String database_name, String catalog_name) throws DKException, Exception Creates image search catalog Parameters:

database_name—database name catalog_name—catalog name public void deleteCatalog(String database_name, String catalog_name) throws DKException, Exception Deletes image search catalog Parameters:

database_name—database name catalog_name—catalog name public void openCatalog(String database_name, String catalog_name) throws DKException, Exception Opens QBIC catalog for a specified database Parameters:

database_name—database name catalog_name—catalog name public void closecatalog( ) throws DKException, Exception Closes current catalog public void addColorFeature( ) throws DKException, Exception Adds color feature to the current catalog public void addDrawFeature( ) throws DKException, Exception Adds draw feature to the current catalog public void addColorHistogramFeature( ) throws DKException, Exception Adds color histogram feature to the current catalog public void addTextureFeature( ) throws DKException, Exception Adds texture feature to the current catalog public void addFeature(intfeatureSelection, boolean bReCatalog) throws DKException, Exception Adds feature to the current catalog Parameters:

featureSelection—specific feature bReCatalog—when true image search server reanalyze the new feature for existing images.

public void removeColorFeature( ) throws DKException, Exception

Removes color feature from the current catalog public voidremoveDrawFeature( )throwsDKException, Exception Removes draw feature from the current catalog public void removeColorHistogramFeature( ) throws DKException, Exception Removes color histogram feature from the current catalog public void removeTextureFeature( ) throws DKException, Exception Removes texture feature from the current catalog public voidprocessImages(DKImageRecordQBIC imageList[ ], int count) throws DKException, Exception Processes a list of images for the current catalog Parameters:

imageList—Image Record list count—number of objects in the array public synchronized void queueImages (DKImageRecordQBIC imageList[ ], int count) throws DKException, Exception Puts a list of images into the image queue for later processing Parameters:

imageList—Image Record list count—number of objects in the array public voidprocessImageQueue( ) throws DKException, Exception Processes the image queue.

public void reCatalogImages(intfeatureSelectionList) throws DKException, Exception Recatalogs the images Parameters:

featureSelectionList—feature list. features are ored together.

public Object listDatabases( ) throws DKException, Exception

Lists all databases in the image search server

Returns:

a collection of DKIndexQBIC objects public Object listCatalogs( ) throws DKException, Exception Lists all catalogs in the current database Returns:

a collection of DKIndexQBIC objects public Object listCatalogs(String database_name) throws DKException, Exception Lists all catalogs in the specified database Parameters:

database_name—database name

Returns:

a collection of DKIndexQBIC objects public Object listFeatures( ) throws DKException, Exception Lists all features in the current catalog Returns:

a collection of DKIndexQBIC objects public Object listColorImages( ) throws DKException, Exception Lists all images cataloged in the color feature in the current catalog.

Returns:

a collection of DKImageInfoQBIC objects public Object listHistogramImages( ) throws DKException, Exception Lists all images cataloged in the histogram feature in the current catalog.

Returns:

a collection of DKImageInfoQBIC objects public Object listDrawImages( ) throws DKException, Exception Lists all images cataloged in the draw feature in the current catalog.

Returns:

a collection of DKImageInfoQBIC objects public Object listTextureImages( ) throws DKException, Exception Lists all images cataloged in the texture feature in the current catalog.

Returns:

a collection of DKImageInfoQBIC objects public String databaseName( ) throws DKException, Exception Gets the current database name Returns:

the database name public String catalogName( ) throws DKException, Exception

Gets the current catalog name

Returns:

the catalog name public String getLibServerName( ) throws DKException, Exception Gets the library server name Returns:

the library server name public dkDatastoreDef datastoreDef( ) throws DKException, Exception Gets datastore definition Returns:

the meta-data (dkDatastoreDef) of this Datastore

Overrides:

datastoreDef in class dkAbstractDatastore public String registerMapping(DKNVPair sourceMap) throws DKException, Exception Registers mapping information to this Datastore Parameters:

sourceMap—source name and mapping

Returns:

the mapping name for the mapping information

Overrides:

registerMapping in class dkAbstractDatastore public void unRegisterMapping(String mappingName) throws DKException, Exception Unregisters mapping information for this Datastore Parameters:

mappingName—name of the mapping information

Returns:

an array of register mapping objects' names

Overrides:

unRegisterMapping in class dkAbstractDatastore public String[ ] listMappingNames( ) throws DKException, Exception Gets the list of the register mappings for this Datastore Returns:

an array of register mapping objects' names

Overrides:

listMappingNames in class dkAbstractDatastore public dkSchemaMapping getMapping(String mappingName) throws DKException, Exception Gets mapping information for this Datastore Parameters:

A mappingName—name of the mapping information

Returns:

the schema mapping object

Overrides:

getMapping in class dkAbstractDatastore public synchronized dkExtension getExtension(String extensionName) throws DKException, Exception Gets the extension object from a given extenstion name.

Parameters:

extensionName—name of the extension object.

Returns:

extension object.

Overrides:

getExtension in class dkAbstractDatastore public synchronized void addExtension(String extensionName, dkExtension extensionObj) throws DKException, Exception Adds a new extension object.

Parameters:

extensionname—name of new extension object extensionObj—the extension object to be set Overrides:

addExtension in class dkAbstractDatastore public synchronized void removeExtension(String extensionName) throws DKException, Exception Removes an existing extension object Parameters:

extensionName—name of extension object to be removed

Overrides:

removeExtension in class dkAbstractDatastore public synchronized String[ ] listExtensionNames( ) throws DKException, Exception Gets the list of extension objects' names Returns:

an array of extension objects' names

Overrides:

listExtensionNames in class dkAbstracDatastore public DKDDO createDDO(String objectType,
  int Flags) throws DKException, Exception Creates a new DDO with object type, properties and attributes set for a given backend server.

Parameters:

objectType—the object type user wants to create

Flags—to indicate various options to specific more detail characteristics of the DDO to create. For example, it may be a directive to create a document DDO, a folder, etc.

Returns:

a new DDO of the given object type with all the properties and attributes set so that the user only need to set the attribute values Overrides:

createDDO in class dkAbstractDatastore

5. Text Search Datastore

DKDatastoreTS is a specific version of dkDatastore and is used to query and access text search data. An example class definition for DKDatastoreTS is set forth below.

DKDatastoreTS

```
package com.ibm.mm.sdk.server.DKDatastoreTS
public class DKDatastoreTS
    extends dkAbstractDatastore
    implements DKConstantDL, DKMessageIdDL
{
public DKDatastoreTS() throws DKException, Exception
public DKDatastoreTS(String configuration) throws DKException, Exception
public void connect(String datastore_name,
public void connect(String server_name,
        String port,
        char communication_type) throws DKException, Exception
public void disconnect() throws DKException, Exception
public Object getOption(int option) throws DKException, Exception
public void setOption(int option,
        Object value) throws DKException, Exception
public Object evaluate(String command,
        short commandLangType,
        DKNVPair params[]) throws DKException, Exception
public Object evaluate(dkQuery query) throws DKException, Exception
public Object evaluate(DKCQExpr qe) throws DKException, Exception
public dkResultSetCursor execute(String command,
            short commandLangType,
            DKNVPair params[]) throws DKException, Exception
public dkResultSetCursor execute(dkQuery query) throws DKException, Exception
public dkResultSetCursor execute(DKCQExpr cqe) throws DKException, Exception
public void executeWithCallback(dkQuery query,
            dkCallback callbackObj) throws DKException, Exception
public void executeWithCallback(String command,
            short commandLangType,
            DKNVPair params[],
            dkCallback callbackObj) throws DKException, Exception
public void executeWithCallback(DKCQExpr qe,
            dkCallback callbackObj) throws DKException, Exception
public dkQuery createQuery(String command,
        short commandLangType,
        DKNVPair params[]) throws DKException, Exception
public dkQuery createQuery(DKCQExpr qe) throws DKException, Exception
public void addObject(dkDataObject ddo) throws DKException, Exception
public void deleteObject(dkDataObject ddo) throws DKException, Exception
public void retrieveObject(dkDataObject ddo) throws DKException, Exception
public void updateObject(dkDataObject ddo) throws DKException, Exception
public void commit() throws DKException, Exception
public void rollback() throws DKException, Exception
public boolean isConnected() throws Exception
public String datastoreName() throws Exception
public String datastoreType() throws Exception
public DKHandle connection() throws Exception
public DKHandle handle(String type) throws Exception
public String userName() throws Exception
public dkCollection listDataSources() throws DKException, Exception
public String[] listDataSourceNames() throws DKException, Exception
public Object listServers() throws DKException, Exception
public Object listSchema() throws DKException, Exception
public Object listSchemaAttributes(String schemaEntry) throws DKException, Exception
public dkCollection listEntities() throws DKException, Exception
public String[] listEntityNames() throws DKException, Exception
public dkCollection listEntityAttrs(String entityName) throws DKException, Exception
public String[] listEntityAttrNames(String entityName) throws DKException, Exception
public void startUpdateIndex(String indexName) throws DKException, Exception
```

-continued

```
public void clearIndex(String indexName) throws DKException, Exception
public void createIndex(DKIndexInfoTS newIndex) throws DKException, Exception
public void deleteIndex(String indexName) throws DKException, Exception
public DKIndexInfoTS getindexInformation(String indexName) throws DKException,
    Exception
public DKIndexFuncStatusTS getIndexFunctionStatus(String indexName) throws
    DKException, Exception
public void setIndexFunctionStatus(String indexName,
            int actionId) throws DKException, Exception
public dkDatastoreDef datastoreDef() throws DKException, Exception
public DKMatchesInfoTS getMatches(dkResultSetCursor cursor,
            String documentId,
            String textIndexName,
            boolean useDictionary) throws DKException, Exception
public String registerMapping(DKNVPair sourceMap) throws DKException, Exception
public void unRegisterMapping(String mappingName) throws DKException, Exception
public String[] listMappingNames() throws DKException, Exception
public dkSchemaMapping getMapping(String mappingName) throws DKException,
Exception
public synchronized dkExtension getExtension(String extensionName) throws
    DKException, Exception
public synchronized void addExtension(String extensionName,
            dkExtension extensionObj) throws DKException, Exception
public synchronized void removeExtension(String extensionName) throws DKException,
    Exception
public synchronized String[] listExtensionNames() throws DKException, Exception
public DKDDO createDDO(String objectType,
            int Flags) throws DKException, Exception
public void destroy() throws DKException, Exception
}
```

The following methods are part of the DKDatastoreTS class:

public DKDatastoreTS( ) throws DKException, Exception

Constructs the datastore and initializes the datastore.

public DKDatastoreTS(String configuration) throws DKException, Exception

Constructs the datastore and initializes the datastore.

public void connect(String datastore_name,

String user_name,

String authentication,

String connect_string) throws DKException, Exception

Connects to a datastore.

Parameters:

datastore_name—the datastore name used for connection user_name—the user name used for connection authentication—the authentication used for connection connect_string—the connect string used for connection. This is used to provide additional connection options.

Overrides:

connect in class dkAbstractDatastore public void connect(String server_name,

String port, char communication_type) throws DKException, Exception

Connects to a datastore.

Parameters:

server_name—the hostname where the text server is located port—the port where the text server is located communication_type—the communication type T for TCPIP or P for PIPES public void disconnect( ) throws DKException, Exception Disconnects to a datastore.

Overrides:

disconnect in class dkAbstractDatastore public Object getOption(int option) throws DKException, Exception Gets a datastore option.

Parameters:

option—the option identifier

Returns:

an option value

Overrides:

getOption in class dkAbstractDatastore public void setOption(int option,

Object value) throws DKException, Exception

Sets a datastore option.

Parameters:

option—the option identifier value—the option value

Overrides:

setOption in class dkAbstractDatastore public Object evaluate(String command, short commandLangType, DKNVPair params[ ]) throws DKException, Exception Evaluates the query.

Parameters:

command—a query string commandLang—a query type params—additional query option in name/value pair Returns:

a collection of the results

Overrides:

evaluate in class dkAbstractDatastore public Object evaluate (dkQuery query) throws DKException Exception Evaluates the query.
Parameters:
query—a query object
Returns:
a collection of the results
Overrides:
evaluate in class dkAbstractDatastore
public Object evaluate(DKCQExpr qe) throws DKException, Exception
Evaluates the query.
Parameters:
qe—a common query expression object
Returns:
a collection of the results
Overrides:
evaluate in class dkAbstractDatastore
public dkResultSetCursor execute(String command,
    short commandLangType,
    DKNVPair params[ ]) throws DKException, Exception
Executes the query.
Parameters:
command—a query string
commmdLang—a query type
params—additional query option in name/value pair
Returns:
resultSetCursor which represents a datastore cursor.
Overrides:
execute in class dkAbstracDatastore
public dkResultSetCursor execute(dkQuery query) throws DKException, Exception
Executes the query.
Parameters:
query—a query object
Returns:
resultSetCursor which represents a datastore cursor.
Overrides:
execute in class dkAbstractDatastore
public dkResultSetCursor execute(DKCQExpr cqe) throws DKException, Exception
Executes the query.
Parameters:
qe—a common query expression object
Returns:
resultSetCursor which represents a datastore cursor.
Overrides:
execute in class dkAbstractDatastore
public void executeWithCallback(dkQuery query,
    dkCallback callbackObj) throws DKException, Exception
Executes the query with callback function.
Parameters:
qo—a query object
callbackObj—a dkCallback object
Overrides:
executeWithCallback in class dkAbstractDatastore
public void executeWithCallback(String command,
    short commandLangType,
    DKVPairparams[ ],
    dkCallback callbackObj) throws DKException, Exception
Executes the query with callback function.
Parameters:
command—a query string
commandLang—a query type
params—additional query option in name/value pair
callbackObj—a dkCallback object
Overrides:
executeWithCallback in class dkAbstractDatastore
public void executeWithCallback(DKCQExpr qe,
    dkCallback callbackObj) throws DKException, Exception
Executes the query with callback function.
Parameters:
qe—a common query expression object
callbackObj—a dkCallback object
Overrides:
executeWithCallback in class dkAbstractDatastore
public ckQuery createQuery(String command,
    short commandLangType,
    DKNVPair params[ ]) throws DKException, Exception
Creates a query object.
Parameters:
command—a query string
commandLang—a query type
params—additional query option in name/value pair
Returns:
a query object
Overrides:
createQuery in class dkAbstractDatastore
public dkQuery createQuery(DKCQExpr qe) throws DKException, Exception
Creates a query object.
Parameters:
qe—a common query expression object
Overrides:
createQuery in class dkAbstractDatastore
public void addObject(dkDataObject ddo) throws DKException, Exception
Adds this ddo to this datastore.
Parameters:
ddo—the ddo to be added to this Datastore
Overrides:
addObject in class dkAbstractDatastore
public void deleteObject(dkDataObject ddo) throws DKException, Exception
Deletes this ddo from this datastore.
Parameters:
ddo—the ddo to be deleted from this Datastore
Overrides:
deleteObject in class dkAbstractDatastore
public void retrieveObject(dkDataObject ddo) throws DKException, Exception
Retrieves this ddo from this datastore.
Parameters:
ddo—the ddo to be retrieved from this Datastore
Overrides:
retrieveObject in class dkAbstractDatastore public void updateObject(dkDataObject ddo) throws DKException, Exception
   Updates this ddo in this datastore.
   Parameters:
   ddo—the ddo to be updated in this Datastore
   Overrides:
   updateObject in class dkAbstractDatastore
public void commit( ) throws DKException, Exception
   Commits a datastore transaction
   Overrides:
   commit in class dkAbstractDatastore
public void rollback( ) throws DKException, Exception
   Rolls back a datastore transaction
   Overrides:
   rollback in class dkAbstractDatastore
public boolean isconnected( ) throws Exception
   Checks to see if the datastore is connected.
   Returns:
   rue if connected
   Overrides:
   isConnected in class dkAbstractDatastore
public String datastoreName( ) throws Exception
   Gets the name of this datastore object. Usually it represents a datastore source's server name.
   Returns:
   datastore name
   Overrrides:
   datastoreName in class dkAbstractDatastore
public String datastoreType( ) throws Exception
   Gets the datastore type for this datastore object
   Returns:
   datastore type
   Overrides:
   datastoreType in class dkAbstractDatastore
public DKHandle connection( ) throws Exception
   Gets the connection handle for a Datastore
   Returns:
   connection handle
   Overrides:
   connection in class dkAbstractDatastore
public DKHandle handle(String type) throws Exception
   Gets a datastore handle
   Parameters:
   type—type of datastore handle wanted
   Returns:
   a datastore handle
   Overrides:
   handle in class dkAbstractDatastore
public String userName( ) throws Exception
   Gets the user name for this datastore object
   Returns:
   user name
   Overrides:
   userName in class dkAbstractDatastore
public dkcollection listDataSources( ) throws DKException, Exception
   Lists the available datastore sources that can be used to connect with.
   Returns:
   a collection of server definitions
   Overrides:
   listDataSources in class dkAbstractDatastore
public String[ ] listDataSourceNames( ) throws DKException, Exception
   Lists the available datastore source names that can be used to connect with.
   Returns:
   an array of server names
   Overrides:
   listDataSourceNames in class dkAbstractDatastore
public Object listservers( ) throws DKException, Exception
   List the available datastore sources that can be used to connect with. Note: listServers( ) is deprecated. Replace by listDatasources.
   Returns:
   a collection of server definitions
   Overrides:
   listServers in class dkAbstractDatastore
   See Also:
   listDataSources
public Object listschema( ) throws DKException, Exception
   Lists the entities that belong to this datastore. Note: listSchema( ) is deprecated. Replace by listEntities.
   Returns:
   an object that contains the schema
   Overrides:
   listSchema in class dkAbstractDatastore
   See Also:
   listEntities
public Object listSchemaAttributes(String schemaEntry) throws DKException, Exception
   Lists the attributes that belong to a schema. Note: listSchemaAttributes( ) is deprecated. Replace by listEntityAttributes.
   Parameters:
   schemaentry—the name of the schema.
   Returns:
   an object that contains the attributes that belong to this schema
   Overrides:
   listSchemaAttributes in class dkAbstractDatastore
   See Also:
   listEntityAttrs
public dkCollection listEntities( ) throws DKException, Exception
   Gets a list of entities from persistent Datastore
   Returns:
   a collection of entity defs
   Throws: DKException
   if error occurs
   Overrides:
   listEntities in class dkAbstractDatastore
public String[ ] listEntityNames( ) throws DKException, Exception
   Gets a list of entity names from persistent Datastore
   Returns:
   an array of entity names Throws: DKException
if error occurs
Overrides:
listEntityNames in class dkAbstractDatastore
public dkCollection listEntityAttrs(String entityName) throws DKException, Exception
Gets a list of attributes for a given entity name.
Parameters:
entityName—name of entity to retrieve attributes for
Returns:
a dkCollection of dkAttrDef objects
Throws: DKException
if the entity name does not exist
Overrides:
listEntityAttrs in class dkAbstractDatastore
public String[ ] listEntityAttrNames(String entityName) throws DKException, Exception
Gets a list of attribute names for a given entity name.
Parameters:
entityName—name of entity to retrieve attribute names for
Returns:
an array of attribute names
Throws: DKException
if the entity name does not exist
Overrides:
listEntityAttrNames in class dkAbstractDatastore
public void startUpdateIndex(String indexName) throws DKException, Exception
Starts the indexing process.
Parameters:
indexName—the name of the search index.
public void clearIndex(String indexName) throws DKException, Exception
Clears all indexed terms from a search index.
Parameters:
indexName—the name of the search index.
public void createIndex(DKIndexInfoTS newIndex) throws DKException, Exception
Creates a search index.
Parameters:
newIndex—the search index to be created.
public void deleteIndex(String indexName) throws DKException, Exception
Deletes a search index.
Parameters:
indexName—the name of a search index.
public DKIndexInfoTS getIndexInformation(String indexName) throws DKException, Exception
Gets index information about a search index.
Parameters:
indexName—the name of a search index.
Returns:
a search index object which contains search index information.
public DKIndexFuncStatusTS getIndexFunctionStatus (String indexName ) throws DKException, Exception
Gets indexing function status, document and document message queue count for search index.
Parameters:
indexName—the name of a search index.
Returns:
a search index function status object which contains the indexing
function status.
public void setIndexFunctionStatus(String indexName, int actionid) throws DKException, Exception
Set indexing function status for a search index.
Parameters:
indexName—the name of a search index.
actionaId—the indicator applied to a text search function. It can be
enabled, disabled or reset.
public dkDatastoreDef datastoreDef( ) throws DKException, Exception
Get datastore definition
Returns:
the meta-data (dkDatastoreDef) of this datastore
Overrides:
datastoreDef in class dkAbstractDatastore
public DKMatchesInfoTS getMatches(dkResultSetCursor cursor,
String documentId,
String textIndexName,
boolean useDictionary) throws DKException, Exception
Get Match Information given indexName and document id
Returns:
A DKMatchesInfoTS object that contains match information public String registerMapping(DKNVpair sourceMap) throws DKException, Exception
Registers a mapping definition to this datastore. Mapping is done by Entities.
Parameters:
sourceMap—source name and mapping, a DKNVPair class with the following possible values:
("BUFFER",): buffer_ref is a reference to a string in memory
("FILE",): file_name is the name of the file containing the mapping
("URL",): URL-address location of the mapping
("LDAP",): LDAP file-name
("SCHEMA",): a reference to a dkSchemaMapping object defining the mapping. Currently, only "SCHEMA" option is supported, others may be added later.
Returns:
the name of the mapping definition.
Overrides:
registerMapping in class dkAbstractDatastore
See Also:
unRegisterMapping
public void unRegisterMapping(String mappingName) throws DKException, Exception
Unregisters mapping information for this Datastore
Parameters:
mappingName—name of the mapping information
Returns:
an array of register mapping objects' names Overrides:

unRegisterMapping in class dkAbstractDatastore public String[ ] listMappingNames( ) throws DKException, Exception Gets the list of the register mappings for this Datastore Returns:

an array of register mapping objects' names

Overrides:

listMappingNames in class dkAbstractDatastore public dkSchemaMapping getMapping(String mappingName) throws DKException, Exception Gets mapping information for this Datastore Parameters:

mappingName—name of the mapping information

Returns:

the schema mapping object

Overrides:

getMapping in class dkAbstractDatastore

See Also:

registerMapping public synchronized dkExtension getExtension(String extensionName) throws DKException, Exception Gets the extension object from a given extenstion name.

Parameters:

extensionName—name of the extension object.

Returns:

extension object.

Overrides:

getextension in class dkAbstractDatastore public synchronized void addExtension(String extensionName, dkExtension extensionObj) throws DKException, Exception Adds a new extension object.

Parameters:

extensionName—name of new extension object extensionObj—the extension object to be set Overrides:

addExtension in class dkAbstractDatastore public synchronized void removeExtension(String extensionName) throws DKException, Exception Removes an existing extension object Parameters:

extensionName—name of extension object to be removed

Overrides:

removeExtension in class dkAbstractDatastore public synchronized String[ ] listExtensionNames( ) throws DKException, Exception Gets the list of extension objects' names Returns:

an array of extension objects' names

Overrides:

listExtensionNames in class dkAbstractDatastore public DKDDO createDDO(String objectType, int Flags) throws DKException, Exception Creates a new DDO with object type, properties and attributes set for a given backend server.

Parameters:

objectType—the object type user wants to create

Flags—to indicate various options to specify more detail characteristics of the DDO to create. For example, it may be a directive to create a document DDO, a folder, etc.

Returns:

a new DDO of the given object type with all the properties and attributes set, so that the user only need to set the attribute values Overrides:

createDDO in class dkAbstractDatastore public void destroy( ) throws DKException, Exception datastore destroy—datastore cleanup if needed Overrides:

destroy in class dkAbstractDatastore

6. Dynamic Data Objects

DKDDOBase is the base class to represent a Dynamic Data Object (DDO). An example class definition for DKDDOBase is set forth below.

DKDDOBase

```
package com.ibm.mmm.sdk.common.DKDDOBase
public class DKDDOBase
    extends dkDataObject
    implements DKConstant, DKMessageId, Serializable
{
public DKDDOBase( )
public DKDDOBase(short initialSize)
public DKDDOBase(DKDDOBase ddo)
public DKDDOBase(String objectType)
public DKDDOBase(String objectType,
        short initialSize)
public DKDDOBase(DKPid pid)
public DKDDOBase(DKPid pid,
        short initialSize)
public short protocol( )
public String getObjectType( )
public void setObjectType(String toObjectType)
public boolean updatable( )
public short addData( ) throws DKUsageError
public short addData(String data_name) throws DKUsageError
```

-continued

```
public short addDataProperty(short data_id) throws DKUsageError
public short addDataProperty(short data_id,
            String property_name) throws DKUsageError
public short addDataProperty(short data_id,
            String property_name,
            Object property_value) throws DKUsageError
public short dataCount( )
public short dataPropertyCount(short data_id) throws DKUsageError
public void setDataProperty(short data_id,
            short property_id,
            Object property_value) throws DKUsageError
public Object getDataProperty(short data_id,
            short property_id) throws DKUsageError
public void setDataPropertyName(short data_id,
            short property_id,
            String property_name) throws DKUsage Error
public String getDataPropertyName(short data_id,
            short property_id) throws DKUsageError
public void setData(short data_id,
         Object data_value) throws DKUsageError
public Object getData(sort data_id) throws DKUsageError
public void setDataName(short data_id,
         String data_name) throws DKUsageError
public String getDataName(short data_id) throws DKUsageError
public short dataId(String data_name) throws DKUsageError
public short dataPropertyId(short data_id,
         String data_property_name) throws DKUsageError
public Object getDataByName(String data_name) throws DKUsageError
public Object getDataPropertyByName(short data_id,
            String data_property_name) throws DKUsageError
public Object getDataPropertyByName(String data_name,
            String data_property_name) throws DKUsageError
            public void setNull(short data_id) throws DKUsageError
            public boolean isNull(short data_id) throws DKUsageError
            public boolean isDataSet(short data_id) throws DKUsageError
            public boolean isDataPropertySet(short data_id,
            short property_id) throws DKUsageError
public short addProperty( ) throws DKUsageError
public short addProperty(String property_name) throws DKUsageError
public short addProperty(String property_name,
         Object property_value) throws DKUsageError
public short propertyCount( ) throws DKUsageError
public void setProperty(short property_id,
         Object property_value) throws DKUsageError
public Object getProperty(short property_id) throws DKUsageError
public void setPropertyName(short property_id,
         String property_name) throws DKUsageError
public String getPropertyName(short property_id) throws DKUsageError
pubic short propertyId(String property_name) throws DKUsageError
public Object getPropertyByName(String property_name) throws DKUsageError
public boolean isPropertySet(short property_id) throws DKUsageError
}
```

The following methods are part of the DKDDOBase class:

public DKDDOBase( )
   Constructs a DDO Base object.
public DKDDOBase(short initialSize)
   Constructs a DDO Base object which has enough space for the given initial number of data-items.
   Parameters:
   initialSize—initial number of data items.
public DKDDOBase(DKDDOBase ddo)
   Constructs a DDO Base object from an existing DDO Base (copy contructor).
   Parameters:
   ddo—a DDO Base object.
public DKDDOBase(String objectType)
   Constructs a DDO Base object for a given object type.
   Parameters:
   objectType—the object type.

public DKDDOBase(String objectType,
   short initialSize)
   Constructs a DDO Base object for a given object type, with an initial number of data-items.
   Parameters:
   objectType—the object type.
   initialSize—initial number of data items.
public DKDDOBase(DKPid pid)
   Constructs a DDO Base object with a given Pid.
   Parameters:
   pid—the Pid object
public DKDDOBase(DKPid pid,
   short initialSize)
   Constructs a DDO Base object with a given Pid and an initial number of data-items.
   Parameters:
   pid—the Pid object.
   initialSize—initial number of data items.
   public shortprotocol( )

Returns the protocol type supported by this data-object. In this case, it is DK_DDO, which essentially means that this data-object can be made persistent with the help of an associated datastore object. The DK_DDO protocol consists of get/setData, get/setDataProperty, and other methods in this object, which support the representation of a self describing data-object.

Returns:

the protocol.

Overrides:

protocol in class dkDataobject public String getObjectType( )

Gets the type of this data-object.

Returns:

the object type.

Overrides:

getObjectType in class dkDataobject public void setObjectType(String toObjectType)

Sets the type of this data-object and synchronizes it with the object type of its Pid.

Parameters:

toObjectType—the object type.

public boolean updatable( )

Returns true if this data object is updatable.

Returns:

true if updatable.

public short addData( ) throws DKUsageError

Adds a new data-item to this databject and returns the new data-item number (data-d).

Returns:

the data-item number (data-id).

public short addData(String data_name) throws DKUsageError

Adds a new data-item wit the given name to this data-object and returns the new data-item number (data-id).

Parameters:

data_name—data-item name.

Returns:

data-item number (data-id).

public short addDataProperty(short data_id ) throws DKUsageError

Adds a new property to a given data-item and returns the new property number property-id).

Parameters:

data_id—data-id .

Returns:

data-property number (property-id).

public short addDataProperty(short data_id,

String property_name) throws DKusageError

Adds a new property with the given name to the data-item and returns the new property number (property-id).

Parameters:

data_id—data id.

property_name—property name.

Returns:

data property number (property-id).

public short addDataProperty(short data_id,

String property_name,

Object property_value) throws DKUsageError

Adds a new property with the given name and value to the data-item and returns the new property number (property-id).

Parameters:

data_id—the data-id.

property_name—property name.

property_value—property value.

Returns:

data property number (property-id).

public short datacount( )

Gets the number of data-items in this data-object.

Returns:

number of data-items.

public short dataPropertyCount(short data_id) throws DKUsageError

Gets the number of properties associated with this data-item.

Parameters:

data_id—the data-id.

Returns:

the number of properties.

public void setDataProperty(short data_id, short property_id,

Object property_value) throws DKUsageError

Sets the value of a given property in a data-item.

Parameters:

data_id—data-id.

property_id—property-id.

property_value—the property value.

public Object getDataProperty(short data_id, short property_id) throws DKUsageError Gets the value of a given property in a data-item.

Parameters:

data_id—data-id.

property_id—property-id.

Returns:

property value.

public void setDataPropertyName(short data_id, short property_id,

String property_name) throws DKUsageError

Sets the name of a given property in a data-item.

Parameters:

data_id—data-id.

property_id—property-id.

propertyk_name—property name.

public String getDataPropertyName(short data_id), short property_id) throw DKUsageError Gets the name of a given data-item.

Parameters:

data_id—data-id.

property_id—property-id.

Returns:

property name.

public void setData(short data_id,

Object data_value) throws DKUsageError

Sets the value of a given data-item.

Parameters:

data_value—data-id.

data_value—data value.

public Object getData(short data_id) throws DKUsageError

Gets the value of a given data-item.

Parameters:
data_id—data-id.
Returns:
data value.
public void setDataName(short data_id,
String data_name) throw DKUsageError
Sets the name of a given data-item.
Parameters:
data_id—data-id.
data_name—data name.
public String gatDataName(short data_id) throws DKUsageError
Gets the name of a given data-item.
Parameters:
data_id—data-item.
Returns:
data name.
public short dataId(String data_name) throws DKUsageError
Gets the data-id of a given data-item name.
Parameters:
data_name—data name.
Returns:
the data-id.
public short dataPropertyId(short data_id,
String data_property_name) throws DKUsageError
Gets the property-id of a given property-name in a data-item.
Parameters:
data_id—data-id.
data_property_name—data-property name.
Returns:
the property-id.
public Object getDataByName(String data_name) throws DKUsageError
Gets the value of a data-item given its name.
Parameters:
data_name—data-item name.
Returns:
data value.
public Object getDataPropertyByName(short data_id,
String data_property_name) throws DKUsageError
Gets the value of a given property-name of a data-item id.
Parameters:
data_id—data-id.
data_property_name—data-property name.
Returns:
property value.
public Object getDataPropertyByName(String data_name,
String data_property_name) throws DKUsageError
Gets the value of a given property-name of a data-item name.
Parameters:
data_name—data-item name.
data_property_name—data-property name.
Returns:
property value.
public void setNull(short data_id) throws DKUsageError
Sets the value of a data-item to a null value. The data-item must be nullable, and the data-object must be updatable.
Parameters:
data_id—data-id.
public boolean isNull(short data_id) throws DKUsageError
Returns true if the value of this data-item is null.
Returns:
true if data-item value is null.
public boolean isDataSet(short data_id) throws DKUsageError
Returns true if this data-item has been set to a value.
Returns:
true if data item value is set.
public boolean isDataPropertySet(short data_id,
short property_id) throws DKUsageError
Returns true if a given properly of a data-item is set.
Returns:
true if data item property value is set.
public short addProperty( ) throws DKUsageError
Adds a new property to this DDO and returns the new property number (property-id).
Returns:
the new property number (property id).
public short addProperty(String property_name) throws DKUsageError
Adds a new property with a given name to this DDO and returns the new property number (property-id).
Parameters:
property_name—property name.
Returns:
property number (property-id).
public short addProperty(String property_name,
Object property_value) throws DKUsageError
Adds a new property with a given name and value to this DDO. and returns the new property number (property-id).
Parameters:
property_name—property-name.
property_value—property value.
Returns:
the property number (property-id).
public short propertycount( ) throws DKUsageError
Gets the number of properties associated with this DDO.
Returns:
the number of properties.
public void setProperty(short property_id,
Object property_value) throws DKUsageError
Sets the value of a given property in this DDO.
Parameters:
property_id—property-id.
property_value—property value.
public Object getProperty(short property_id) throws DKUsageError
Gets the value of a given property in this DDO.
Parameters:
property_id—property-id.
Returns:
property value.
public void setPropertyName(short property_id,
String property_name) throws DKUsageError
Sets the name of a given property in this DDO.

Parameters:

property_id—property-id.

property_name—property name.

public String getPropertyName(short property_id) throws DKUsageError

Gets the name of a given property in this DDO.

Parameters:

property_id—property-id.

Returns:

the property name.

public shortpropertyId(String property_name) throws DKUsageError

Gets the property-id of a given property-name in this DDO.

Parameters:

property_name—property-name.

Returns:

the property-id.

public Object getPropertyByName(String property_name) throws DKUsageError

Gets the value of a given property-name in this DDO.

Parameters:

property_name—property-name.

Returns:

the property value.

public boolean isPropertySet(shortproperty_id) throws DKUsageError

Returns true if the given property in this DDO has been set to a value.

Parameters:

property_id—property-id.

Returns:

true if the property is set

DKDDO is the class to represents a Dynamic Data Object. It is a sub-class of DKDDOBase with additional methods to support persistency, such as add( ), retrieve( ), update( ), and del( ). An example class definition for DKDDO is set forth below.

```
DKDDO package com.ibm.mm.sdk.common.DKDDO
public class DKDDO
    extends DKDDOBase
    implements DKConstant, Serializable
{
public DKDDO( )
public DKDDO(short initialSize)
data-items.
public DKDDO(DKDDO ddo)
public DKDDO(String objectType)
public DKDDO(String objectType,
public DKDDO(dkDatastore ds,
    String objectType)
public DKDDO(dkDatastore ds,
    String objectType,
    short initialSize)
public DKDDO(DKPid pid)
public DKDDO(DKPid pid,
    short initialSize)
public DKDDO(dkDatastore ds,
    DKPid pid)
public DKDDO(dkDatastore ds,
    DKPid pid,
    short initialSize)
public void setDatastore(dkDatastore ds)
public dkDatastore getDatastore( )
public short protocol( )
public void add( ) throws DKException, Exception
public void retrieve( ) throws DKException, Exception
public void update( ) throws DKException, Exception
public void del( ) throws DKException, Exception
}
```

The following methods are part of the DKDDO class:

public DKDDOO( )

Constructs a DDO object.

public DKDDO(short initialSize)

Constructs a DDO object which has enough space for the given initial number of data-items.

Parameters:

initialSize—the initial number of data-items.

public DKDDO(DKDDO ddo)

Constructs a DDO object by copying another DDO object (copy constructor).

Parameters:

ddo—the other existing DDO object.

public DKDDO(String objectType)

Constructs a DDO object for a given object type.

Parameters:

objectType—an object-type.

public DKDDO(String objectType, short initialSize)

Constructs a DDO object for a given object type, with an initial number of data-items.

Parameters:

objectType—an object-type.

initialSize—the initial number of data items.

public DKDDO(dkDatastore ds, String objectType)

Constructs a DDO object

Parameters:

ds—a datastore object.

objectType—an object-type.

public DKDDO(dkDatastore ds,

String objectType, short initialSize)

Constructs a DDO object for a given object type, with an initial number of data-items and the datastore associated with it.

Parameters:

ds—a datastore object.

objectType—an object-type.

initialSize—the initial number of data-items.

public DKDDO(DKPid pid)

Constructs a DDO object with a given Pid.

Parameters:

pid—a Pid object.

public DKDDO(DKPid pid, short initialSize)

Constructs a DDO object with a given Pid and an initial number of data-items.

Parameters:

pid—a Pid object.

initialSize—the initial number of data-items.

public DKDDO(dkDatastore ds,

DKPid pid)

Constructs a DDO object with a given Pid and the datastore associated with it.

Parameters:

ds—a datastore object.

pid—a Pid object.

public DKDDO(dkDatastore ds,

DKPid pid, short initialSize)

Constructs a DDO object with a given Pid, the datastore associated with it, and an initial number of data-items.

Parameters:

ds—a datastore object.

pid—a Pid object.

initialSize—the initial number of data-items.

public void setDatastore(dkDatastore ds)

Sets this datastore as the one associated with this DDO; that is, the datastore to keep the persistent copy of this DDO.

Parameters:

ds—a datastore object.

public datastore getDatastore( )

Gets the associated datastore for this DDO.

Returns:

the datastore object.

public shortprotocol( )

Returns the protocol type supported by this data-object. In this case, it is DK_PDDO, which essentially means that this object knows the datastore which it is associated with. With the help of the datastore, this object can transfer itself in and out of the datastore, thus making itself persistent.

Returns:

the protocol

Overrides:

protocol in class DKDDOBase public void add( ) throws DKException, Exception

Adds this data-object to the persistent store. An initial entry of persistent copy of this data-object is created, according to the corresponding entity structure defined in the datastore. Onlypersistent data-items (or attributes) are saved.

public void retrieve( ) throws DKException, Exception

Retrieve this data-object from the persistent store. The in-memory values of this data-object is replaced with the persistent copy retrieved from the datastore. Only persistent data-items (or attributes) are retrieved.

public void update( ) throws DKException, Exception

Updates this object in the persistent store. The persistent copy of this data-object is updated with the current values in-memory. Only persistent data-items (or attributes) are updated.

public void del( ) throws DKException, Exception

Deletes this object from the persistent store. The persistent copy of this data-object is deleted from the datastore. The in-memory copy of this object is not affected. After this method is executed, a subsequent call to retrieve( ), update( ), or del( ), will cause an exception because the persistent copy of this data-object no longer exists.

7. Extended Data Objects

The dkXDO class is a common abstract class that can represent a complex LTDT(User Defined Type) or LOB(Large Object). An example class definition for dkXDO is set forth below.

dkXDO

```
package com.ibm.mm.sdk.common.dkXDO
public abstract class dkXDO
    extend dkXDOBase
    implements DKConstant, Serializable
{
public abstract void setPid(DKPidXDO aPidXDO) throws DKUsageError
public abstract DKPidXDO getPid( )
public abstract DKPidXDO getPidObject( )
public abstract void setPidObject(DKPidXDO aPidXDO) throws DKException
public abstract void add( ) throws DKException, Exception
public abstract void retrieve( ) throws DKException, Exception
public abstract void update( ) throws DKException, Exception
public abstract void del( ) throws DKException, Exception
public abstract boolean isContentChanged( )
public abstract boolean isSet( )
public abstract void copyData(dkXDO aXDO) throws DKException, Exception
public abstract boolean compareData(dkXDO aXDO) throws DKException, Exception
public short protocol( )
public dkDatastore datastore( )
public dkDatastore getDatastore( )
public void setDatastore(dkDatastore ds)
public abstract dkXDO cloneSkeleton( ) throws DKUsageError, Exception
public int getAffiliatedType( ) throws DKException, Exception
public void setAffiliatedType(int affiliatedType) throws DKException, Exception
public String getMimeType( ) throws DKException, Exception
public void setMimeType(String mimeType) throws DKException, Exception
public String getContentType( )
public void setContentType(String contentType) throws DKException, Exception
public void addExtension(String extensionName,
        dkExtension extentionObj) throws DKException, Exception
```

-continued

```
public void removeExtension(String extensionName) throws DKException
public dkExtension getExtension(String extensionName) throws DKException, Exception
public abstract byte[ ] getContent( ) throws DKException, Exception
public abstract void setContent(byte aByteArr[ ]) throws DKException
public abstract void setRank(int aRank)
public abstract int getRank( )
}
```

The following methods are part of the dkXDO class:
public abstract void setPid(DKPidXDO aPidXDO) throws DKUsageError Sets the pid information of this object with the new provided pid
    Parameters:
    aPidXDO—a DKPidXDO object
    Throws: DKUsageError
    if provided pid is null public abstract DKPidYDO getPid( )

Gets a copy of the persistent ID object of this object
    Returns:
    a copy of the persistent ID object of this object public abstract DKPidXDO getPidObject( )

Gets a copy of the persistent ID object of this object
    Returns:
    a copy of the persistent ID object of this object public abstract void setPidObject(DKPidYDO aPidXDO) throws DKException Sets the pid information of this object with the new provided pid
    Parameters:
    aPidXDO—a DKPidXDO object
    Throws: DKException
    if provided pid is null public abstract void add( ) throws DKException, Exception Adds the object content from memory to the Datastore
    Throws: DKException,
    Exception If error occurred public abstract void retrieves throws DKException, Exception Retrieves the object content from the datastore to the memory buffer
    Throws: DKException,
    Exception If error occurred public abstract void update( ) throws DKException, Exception Updates the object content in datastore with the content in memory
    Throws: DKException,
    Exception If error occurred public abstract void del( ) throws DKException Exception Deletes the object content from dataaore
    Throws: DKException,
    Exception If error occurred public abstract boolean isContentChanged( )

Checks if the part content changed (in memory).
    Returns:
    true if the object content is changed; false otherwise.

public abstract boolean isset( )

Checks if the part content is set (in memory).
    Returns:
    true if the object content is set; false otherwise.

public abstract void copyData(dkXDO aXDO) throws DKException, Exception

Replaces the content of this object with the content of the other XDO object
    Parameters:
    adkXDO—the other XDO object
    Throws: DKException,
    Exception If error occurred public abstract boolean compareData(dkXDO aXDO) throws DKException, Exception Compares the content of this object with the content of the other XDO object
    Parameters:
    adkXDO—the other XDO object
    Throws: DKException,
    Exception If object type is different public shortprotocol( )

Returns the protocol supported by this object.
    Returns:
    the protocol "DK_XDO"
    Overrides:
    protocol in class dkXDOBase public dkdatastore datastore( )

Gets the reference to the owner datastore object. Note: datastore( ) is deprecated. Replace by getdatastore.
    Returns:
    the dk Datastore object
    See Also:
    getDatastore public dkDatastore getDatastore( )

Gets the reference to the owner datastore object
    Returns:
    the dkDatastore object public void setDatastore(dkDatastore ds)

Sets the reference to the owner datastore object
    Parameters:
    ds—a dkDatastore public abstract dkDO cloneSkeleton( ) throws DKUsageError, Exception Clones this XDO with its persistent-id only, that is, with its data content set to empty.

public int getAffiliatedType( ) throws DKException, Exception

Gets the affiliated type of this object. An affiliated type could be ANNOTATION, NOTES, etc. The subclass need to override the behaviour of the default implementation of this method.
    Returns:
    the affiliated type for this object, for example: DK_CM_ANNOTATION, DK_CM_NOTE, etc.

public void setAffliatedType(int affliatedtype) throws DKException, Exception

Sets the affiliated type for this object. The subclass need to override the behaviour of the default implementation of this method.

Parameters:

affiliatedType—the affiliated type

See Also:

getAffiliatedtype public String getMimeType( ) throws DKException, Exception

Gets the MIME type of this object. The subclass need to override the behaviour of the default implementation of this method.

Returns:

the MIME type for this object, public void setMimeType(String mimeType) throws DKException, Exception Sets the MIME type for this object. The subclass need to override the behaviour of the default implementation of this method.

Parameters:

mimeType—the MIME type

See Also:

getMimetype public String getContentType( )

Gets the content type of this object. A content type could be ASCII, JPG, AVI, GIF, HTML, etc. The subclass need to override the behavior of the default implementation of this method.

Returns:

the content type for this object, public void setContentType(String contentType) throws DKException, Exception Sets the content type for this object. The subclass need to override the behaviour of the default implementation of this method.

Parameters:

contentType—the content type

See Also:

getContenttype public void addExtension(String extensionName, dkExtension extensionObj) throws DKException, Exception Adds the extension object.

Parameters:

extensioName—the extension name extensionObj—a source extension object

Throws: DKException,

Exception If error occurred public void removeExtension(String extensionName) throws DKException Removes the extension object.

Parameters:

extensionName—the extension name

Throws: DKException

If error occurred public dkextension getExtension(String extensionName) throws DKException, Exception Gets the extension object. Default always throws exception. Subclass must write this method.

Parameters:

extensionName—the extension name

Returns:

a dkextension object

Throws: DKException,

Exception If error occurred public abstract byte[ ] getContent( ) throws DKException, Exception Gets the content of this object Returns:

the object content as a byte array stream

Throws: DKException,

Exception If object type is different public abstract void setContent(byte aByteArr[ ]) throws DKException Sets the content of this object with a byte array stream argument Parameters:

aByteArr—a byte array public abstract void setRank(int aRank)

public abstract int getRank( )

8. Binary Large Objects

The dkBlob class is a common abstract class for basic BLOBs in each datastore. An example class definition for dkBlob is set forth below.

dkBlob

```
package com.ibm.mm.sdk.common.dkBlob
    public abstract class dkBlob
        extends dkXDO
        implements Serializable
{
public abstract void add(String aFullFileName) throws DKException, Exception
public abstract void retrieve(String aFullFileName) throws DKException, Exception
public abstract void update(String aFullFileName) throws DKException, Exception
public abstract void del(boolean flush) throws DKException, Exception
public abstract void getContentToClientFile(String afileName,
            int fileOption) throws DKException, Exception
public abstract void setContentFromClientFile(String afileName) throws DKException
public abstract dkBlob concatReplace(dkBlob adkBlob) throws DKException, Exception
public abstract dkBlob concatReplace(byte aByteArrg[ ]) throws DKException, Exception
public abstract int length( ) throws DKException, Exception
```

-continued

```
    public abstract int indexOf(String astring,
            int startpos) throws DKException, Exception
    public abstract int indexOf(dkBlob adkBlob,
            int startpos) throws DKException, Exception
    public abstract String subString(int startpos,
            int alength) throws DKException, Exception
    public abstract dkBlob remove(int startpos,
            int alength) throws DKException, Exception
    public abstract dkBlob insert(String astring,
            int startpos) throws DKException, Exception
    public abstract dkBlob insert(kdBlob adkBlob,
            int startpos) throws DKException, Exception
    public abstract void open(String afileName) throws DKException, Exception
    public abstract void setInstanceOpenHandler(String ahandler,
            boolean newSynchronousFlag)
    public abstract void setClassOpenHandler(String ahandler,
            boolean newSynchronousFlag)
    public abstract String getOpenHandler( )
    public abstract boolean isOpenSynchronous( )
}
```

The following methods are part of the dkBlob class:

public abstract void add(String aFullFileName) throws DKException, Exception

Adds the object content from existing file to the Datastore

Parameters:

aFullFileName—a fully qualified path and file name, default is current directory Throws: DKException, Exception If error occurred public abstract void retrieve(String aFullFileName) throws DKException, Exception Retrieves the object content from the datastore to a file name Parameters:

aFullFileName—a fully qualified path and file name, default is current directory Throws: DKException, Exception If error occurred public abstract void update(String aFullFileName) throws DKException, Exception Updates the object content in datastore with a file Parameters:

aFullFileName—a fully qualified path and file name, default is current directory Throws: DKException, Exception If error occurred public abstract void del(boolean flush) throws DKException, Exception Deletes the object content from Datastore Parameters:

flush—if true the memory content will be flush, if false and content is not set, the object will be retreived before delete it. The default is flush.

Throws: DKException,

Exception If error occurred public abstract void getContentToClientFile(String afileName, int fileOption) throws DKException, Exception Copies the lob data of this object to the given file Parameters:

afileName—a fully qualified path with file name, default is current directory(if no path)

fileOption—1 will create or overwrite an existing file; 2 will only create file, but will also throw an exception if the file already exists; 3 appends to an existing file Throws: DKException, Exception If error occurred public abstract void setContentFromClientFile(String afileName) throws DKException Replaces the lob data of this object with the contents of the file afilename Parameters:

afileName—a fully qualified path with file name, default is current directory(if no path)

Throws: DKException

If error occurred public abstract dkBlob concatReplace(dkBlob adkBlob) throws DKException, Exception Concatenates this object content with another object content the results of the concatenation replaces the existing contents of this object. Note: concatReplace( ) is deprecated.

Parameters:

adkBlob—another dkBlob object

Returns:

a dkBlob object public abstract dkBlob concatReplace(byte aByteArrg[ ]) throws DKException, Exception Concatenates this object content with another stream the results of the concatenation replaces the existing contents of this object. Note: concatReplace( ) is deprecated.

Parameters:
aByteArrg—a byte array stream
Returns:
a dkBlob object
public abstract int length( ) throws DKException, Exception
Gets the length of this object content in memory
Returns:
a byte length of this object content in memory
public abstract int indexOf(String astring,
int startpos) throws DKException, Exception
Returns the byte offset of the first occurrence of the search argument within this object, starting the search at offset startPos. If the search argument is not found, return 0. Note: indexOf( ) is deprecated.
Parameters:
astring—the search string argument
startpos—the offset position start to search
Returns:
the byte offset of the first occurrence of the search argument; return 0
if the search argument is not found
public abstract int indexOf(dkBlob adkglob,
int startpos) throws DKException, Exception
Returns the byte offset of the first occurrence of the search argument within this object, starting the search at offset startPos. If the search argument is not found, return 0. Note: indexOf( ) is deprecated.
Parameters:
adkBlob—the lobData of this dkBlob is the search argument
starpos—the offset position start to search
Returns:
the byte offset of the first occurrence of the search argument; return 0
if the search argument is not found
public abstract String subString(int startpos,
int alength) throws DKException, Exception
Returns a string object containing a substring of the lob data of this object. The substring will be taken starting at byte offset startpos, and extracting alength bytes. Note: subString( ) is deprecated.
Parameters:
startpos—the byte offset position start to extract
alength—the length to extract
Returns:
a string object
public abstract dkBlob remove (int startpos,
int alength) throws DKException, Exception
Deletes the portion of the lob data of this object starting at startpos for alength bytes. Note: remove( ) is deprecated.
Parameters:
startpos—the byte offset position start to delete
alength—the length to delete
Returns:
a dkBlob object
public abstract dkBlob insert(String astring,
int startpos) throws DKException, Exception
Inserts the argument data, following position startpos in the lob data of this object. Note: insert( ) is deprecated.

Parameters:
astring—the argument string data
startpos—the byte offset position start to insert
Returns:
a dkBlob object
public abstract dkBlob insert(dkBlob adkBlob,
int startpos) throws DKException, Exception
Inserts the argument data, following position startpos in the lob data of this object. Note: insert( ) is deprecated.
Parameters:
adkBlob—the lobData of this dkBlob is the argument data
startpos—the byte offset position start to insert
Returns:
a dkBlob object
public abstract void open(String afileName) throws DKException, Exception
Unloads the object content to a file afileName provided by the application and then synchronously invoking a default handler against the file.
Parameters:
afileName—a provided file name
Throws: DKException,
Exception If error occurred
public abstract void setInstanceOpenHandler(String ahandler,
boolean newSynchronousFlag)
Sets the executable handler program name and whether this handler should be invoked synchronously or asynchronously for this object instant
Parameters:
ahandler—the handler program name to view the content
newSynchronousFlag—true for synchronous process; false otherwise.
public abstract void setClassOpenHandler(String ahandler,
boolean newSynchronousFlag)
Sets the executable handler program name and whether this handler should be invoked synchronously or asynchronously for this object class
Parameters:
ahandler—the handler program name to view the content
newSynchronousFlag—true for synchronous process; false otherwise.
public abstract String getOpenHandler( )
Gets the current program name of the handler for this object instance
Returns:
the handler program name
public abstract boolean isOpenSynchronous( )
Gets the current synchronization property
Returns:
TRUE or FALSE for the handler
DKBlobDL is a specific version of DKBlob for a Digital Library/Visual Info. Note that for DKBlobDL, a blob (XDO) represents a part object of DL. An example class definition for DKBlobDL is set forth below.

DKBlobDL

```
package com.ibm.mm.sdk.common.dkBlobDL
public class DKBlobDL extends dkBlob
      implements DKConstant, DKConstantDL, DKMessageId, Serializable
      APPEND
      checkedMultistreamFlag
      isMultistreamBlob
      isMultistreamInOS
      mtocLobData
      NOOVERWRITE
      OVERWRITE
      streamLobData
      streamName
      streamReptype
{
public DKBlobDL(dkDatastore aDatastore) throws DKUsageError, Exception
public DKBlobDL(dkDatastore aDatastore,
      byte aByteArr[ ]) throws DKException, Exception
public DKBlobDL(DKBlobDL, aDKBlobDL) throws DKException
public String getObjectType( )
public void deletingValue( )
public boolean isContentChanged( )
public boolean isSet( )
public boolean isNull( )
public boolean setNull( )
public boolean equals(dkXDOBase adkXDOBase) throws DKException
public boolean notEqual(dkXDOBase adkXDOBase) throws DKException
public DKPidXDO getPid( )
public void setPid(DKPidXDO aDKPid) throws DKUsageError
public DKPidXDO getPidObject( )
public void setPidObject(DKPidXDO aPidXDO) throws DKException
public void add( ) throws DKException, Exception
public void add(String a FullFileName) throws DKException, Exception
public void retrieve( ) throws DKException, Exception
public void retrieve(String aFileName) throws DKException, Exception
public void update(String aFileName) throws DKException, Exception
public void update( ) throws DKException, Exception
public void del( ) throws DKException, Exception
public void del(boolean flush) throws DKException, Exception
public void copyData(dkXDO adkXDO) throws DKException, Exception
public boolean compareData(dkXDO adkXDO) throws DKException, Exception
public void setContent(byte aByteArray[ ])
public byte[ ] getContent( ) throws DKException, Exception
public void getContentToClientFile(String afileName,
      int fileOption) throws DKException, Exception
public void setContentFromClientFile(String afileName) throws DKException
public dkBlob concatReplace(dkBlob adkBlob) throws DKException, Exception
public dkBlob concatReplace(byte aByteArr[ ]) throws DKException, Exception
public int length( ) throws DKException, Exception
public int indexOf(String astring,
      int startpos) throws DKException, Exception
public int indexOf(dkBlob adkBlob,
      int startpos) throws DKException, Exception
public String subString(int startpos,
      int alength) throws DKException, Exception
public dkBlob remove(int startpos,
      int alength) throws DKException, Exception
public dkBlob insert(String astring,
      int startpos) throws DKException, Exception
public dkBlob insert(dkBlob adkBlob,
      int startpos) throws DKException, Exception
public void open( ) throws DKException, Exception
public void open(String afileName) throws DKException, Exception
public void setInstanceOpenHandler(String ahandler,
      boolean newSynchronousFlag)
public void setClassOpenHandler(String ahandler,
      boolean newSynchronousFlag)
public String getOpenHandler( )
public boolean isOpenSynchronous( )
public String getRepType( )
public void setRepType(String aRType)
public String getItemId( )
public void setItemId(String aItemId)
public int getContentClass( )
public void setContentClass(int aCClass)
public int getAffiliatedType( ) throws DKException, Exception
public void setAffiliatedType(int aAType) throws DKException, Exception
public DKAnnotation getAffiliatedData( )
```

-continued

```
    public void setAffiliatedType(DKAnnotation apAData)
    public String getSearchEngine( ) throws DKException, Exception
    public void setSearchEngine(String aSearchEngine) throws DKException, Exception
    public String getSearchIndex( ) throws DKException, Exception
    public void setSearchIndex(String aSearchIndex) throws DKException, Exception
    public String getSearchInfo( ) throws DKException, Exception
    public void getSearchInfo(String aSearchInfo) throws DKException, Exception
    public boolean getIndexFlag( )
    public void setIndexFlag(boolean aFlag)
    public DKBlobDL concatenate(DKBlobDL aDKBlobDL) throws DKException, Exception
    public DKBlobDL concatenate(byte aByteArr[ ]) throws DKException, Exception
    public DKBlobDL subLob(int startpos,
        int alength) throws DKException, Exception
    public void setRank(int aRank)
    public int getRank( )
    public String getMimeType( ) throws DKException, Exception
    public String mimeType( ) throws DKException, Exception
    public void setToBeIndexed( ) throws DKException, Exception
    public String getCreatedTimestamp( ) throws DKException, Exception
    public String getUpdatedTImestamp( ) throws DKException, Exception
    public int getRetrievalAction( ) throws DKException, Exception
    public void setRetrievalAction(int aRetriveAction) throws DKException, Exception
    public int getSize( ) throws DKException, Exception
    public Object getOption(int option) throws DKException, Exception
    public void setOption(int option,
        Object value) throws DKException, Exception
    public void setExtension(String extensionName,
        dkExtension extensionObj) throws DKException, Exception
    public void addExtension(String extensionName,
        dkExtension extensionObj) throws DKException, Exception
    public dkExtension getExtension(String extensionName) throws DKException, Exception
    public void removeExtension(String extensionName) throws DKException
    public boolean isCategoryOf(int categoryName) throws DKException, Exception
    public int retrieveObjectState(int object) throws DKException, Exception
    public void changeStorage( ) throws DKException, Exception
    public int getPartId( )
    public void setPartId(int partId)
    public String[ ] listStreamName( ) throws DKException, Exception
    public byte[ ]getStreamContent(String sName) throws DKException, Exception
    public void setStreamContent(String sName,
        byte aByteArray[ ]) throws DKException, Exception
        public long streamLength(String sName) throws DKException, Exception
        public boolean isMultiStreamBlob( )
        public boolean isMultiStreamFlagSet( )
        }
```

The following methods are part of the DKBlobDL class:

public DKBlobDL(dkDatastore aDatastore) throws DKUsageError, Exception

Constructs the blob and defers initialization until implementation methods are called.

Parameters:

aDatastore—a DKDatastoreDL representing the associated DL Datastore

Throws: DKUsageError,

Exception If invalid datastore type public DKBlobDL(dkDatastore aDatastore,
    byte aByteArr[ ]) throws DKException, Exception Constructs the blob and set the object's content.

Parameters:

aDatastore—a DKDatastoreDL representing the associated DL datastore aByteArr—a byte array to be set as this object's content Throws: DKException, Exception If error occurred public DKBlobDL(DKBlobDL aDKBlobDL) throws DKException Copy constructor.

Parameters:

aDKBlobDL—an instance of DKBlobDL

Throws: DKException

If error occurred public String getObjectType( )

Gets the object type.

Returns:

the object type "DKBlobDL"

Overrides:

getObjectType in class dkXDOBase public void deletingvalue( )

Deletes value, this function performs as setNull in this class. Note: deletingvalue( ) is deprecated.

Overrides:

deletingValue in class dkXDOBase public boolean isContentChanged( )

Checks if the part content changed (in memory).

Returns:

true if the object content is changed; false otherwise.

Overrides:

isContentChanged in class dkXDO public boolean isset( )

Checks if the part content is set (in memory).

Returns:

true if the object content is set; false otherwise.

Overrides:
isSet in class dkXDO
public boolean isNull( )
Checks if the part content is null (in memory).
Returns:
true if the object content is null; false otherwise.
Overrides:
isNull in class dkXDOBase
public void setNull( )
Sets the part content to null (in memory).
Overrides:
setNull in class dkXDOBase
public boolean equals(dkXDOBase adkXDOBase) throws DKException
Checks if the xdo objects have same type, pid, content and indexed by same search engine. Note: equals( ) is deprecated.
Parameters:
adkXDOBase—an instance of dkXDOBase
Returns:
true if the objects have same type, pid, content and search index false otherwise.
Throws: DKException
If objects are not the same class
Overrides:
equals in class dkXDOBase
public boolean notEqual(dkXDOBase adkXDOBase) throws DKException
Checks if the xdo objects is not equal. Note: notEqual( ) is deprecated.
Parameters:
adkXDOBase—an instance of dkXDOBase
Returns:
true if the objects do not have same type, pid, content and search index
false otherwise.
Throws: DKException
If objects are not the same class
Overrides:
notEqual in class dkXDOBase
public DKPidXDO getPid( )
Gets a copy of the persistent ID object of this DKBlobDL object. Note: getPid( ) is deprecated. Replace by getPidObject( ).
Returns:
a copy of the persistent ID object of this DKBlobDL object
Overrides:
getPid in class dkXDO
See Also:
getPidobject
public void setPid(DKPidXDO aDKPid) throws DKUsageError
Sets the pid information of this object with the new provided pid. Note: setPid( ) is deprecated. Replace by setPidObject(DKPidXDO aPidXDO).
Parameters:
aDKPid—a DKPidXDO object
Throws: DKUsageError
If provided pid is null Overrides:
setPid in class dkXDO
See Also:
setPidobject
public DKPidXDO getPidObject( )
Gets a copy of the persistent ID object of this object
Returns:
a copy of the persistent ID object of this object
Overrides:
getPidObject in class dkXDO
public void setPidObject(DKPidXDO aPidYDO) throws DKException
Sets the pid information of this object with the new provided pid
Parameters:
aPidXDO—a DKPidXDO object
Throws: DKException
If provided pid is null
Overrides:
setPidObject in class dkXDO
public void add( ) throws DKException, Exception
Adds the object content from memory to the Datastore
Throws: DKException,
Exception If error occurred
Overrides:
add in class dkXDO
public void add(String aFullFileName) throws DKException, Exception
Adds the object content from existing file to the Datastore
Parameters:
aFullFileName—a fully qualified path and file name, default is current
directory
Throws: DKException,
Exception If error occurred
Overrides:
add in class dkBlob
public void retrieve( ) throws DKException, Exception
Retrieves the object content from the datastore to the memory buffer
Throws: DKException,
Exception If error occurred
Overrides:
retrieve in class dkXDO
public void retrieve(String aFileName) throws DKException, Exception
Retrieves the object content from the datastore to a file name
Parameters:
aFileName—a fully qualified path and file name, default is current
directory
Throws: DKException,
Exception If error occurred
Overrides:
retrieve in class dkBlob
public void update(String aFileName) throws DKException, Exception
Updates the object content in datastore with a file Parameters:
aFileName—a fully qualified path and file name, default is current
directory
Throws: DKException,
Exception If error occurred
Overrides:
update in class dkBlob
public void update( ) throws DKException, Exception
Updates the object content in datastore with the content in memory
Throws: DKException,
Exception If error occurred
Overrides:
update in class dkXDO
public void del( ) throws DKException, Exception
Deletes the object content from Datastore
Throws: DKException,
Exception If error occurred
Overrides:
del in class dkXDO
public void del(boolean flush) throws DKException, Exception
Deletes the object content from Datastore
Parameters:
flush—if true the memory content will be flush, if false and content
is not set, the object will be retreived before delete it. The default
is flush.
Throws: DKException,
Exception If error occurred
Overrides:
del in class dkBlob
public void copyData(dXDO adkXDO) throws DKException, Exception
Replaces the content of this object with the content of the other XDO object
Parameters:
adkXDO—the other XDO object
Throws: DKException,
Exception If error occurred
Overrides:
copyData in class dkXDO
public boolean compareData(dkXDO adkXDO) throws DKException, Exception
Compares the content of this object with the content of the other XDO object
Parameters:
adkXDO—the other XDO object
Throws: DKException,
Exception If object type is different
Overrides:
compareData in class dkXDO
public void setContent(byte aByteArray[ ])
Sets the content of this object with a byte array stream argument
Parameters:
aByteArray—a byte array Overrides:
setContent in class dkXDO
public byte[ ] getContent( ) throws DKException, Exception
Gets the content of this object
Returns:
the object content as a byte array stream
Throws: DKException,
Exception If object type is different
Overrides:
getContent in class dkXDO
public void getContentToClientFile(String afileName, int fileOption) throws DKException, Exception
Copies the lob data of this object to the given file
Parameters:
afileName—a fully qualified path with file name, default is current
directory(if no path)
fileOption—1 will create or overwrite an existing file; 2 will only create file, but will also throw an exception if the file already exists; 3 appends to an existing file
Throws: DKException,
Exception If error occurred
Overrides:
getContentToClientFile in class dkBlob
public void setContentFromClientFile(String afileName) throws DKException
Replaces the lob data of this object with the contents of the file afilename
Parameters:
afileName—a fully qualified path with file name, default is current
directory(if no path)
Throws: DKException
If error occurred
Overrides:
setContentFromClientFile in class dkBlob
public dkBlob concatReplace(dkBlob adkBlob) throws DKException, Exception
Concatenates this object content with another object content the results of the concatenation replaces the existing contents of this object. Note: concatReplace( ) is deprecated.
Parameters:
adkBlob—another dkBlob object
Returns:
a dkBlob object
Overrides:
concatReplace in class dkBlob
public dkBlob concatReplace(byte aByteArr[ ]) throws DKException, Exception
Concatenates this object content with another stream the results of the concatenation replaces the existing contents of this object. Note: concatReplace( ) is deprecated.
Parameters:
aByteArr—a byte array stream
Returns:
a dlkBlob object
Overrides:
concatReplace in class dkBlob

```
public int length( ) throws DKException, Exception
    Gets the length of this object content in memory
    Returns:
    a byte length of this object content in memory
    Overrides:
    length in class dkBlob
public int indexOf(String astring,
    int startpos) throws DKException, Exception
    Returns the byte offset of the first occurrence of the search
        argument within this object, starting the search at offset
        startPos. If the search argument is not found, return 0.
        Note: indexOf( ) is deprecated.
    Parameters:
    astring—the search string argument
    starpos—the offset position start to search
    Returns:
    the byte offset of the first occurrence of the search
        argument; return 0
    if the search argument is not found
    Overrides:
    indexOf in class dkBlob
public int indexOf(dkBlob adkBlob,
    int startpos) throws DKException, Exception
    Returns the byte offset of the first occurrence of the search
        argument within this object, starting the search at offset
        startPos. If the search argument is not found, return 0.
        Note: indexOf( ) is deprecated.
    Parameters:
    adkBlob—the lobData of this dkBlob is the search argument
    startpos—the offset position start to search
    Returns:
    the byte offset of the first occurrence of the search
        argument; return 0
    if the search argument is not found
    Overrides:
    indexOf in class dkBlob
public String subString(int startpos,
    int alength) throws DKException, Exception
    Returns a string object containing a substring of the lob
        data of this object. The substring will be taken starting
        at byte offset startpos, and extracting alength bytes.
        Note: subString( ) is deprecated.
    Parameters:
    startpos—the byte offset position start to extract
    alength—the length to extract
    Returns:
    a string object
    Overrides:
    subString in class dkBlob
public dkBlob remove(int startpos,
    int alength) throws DKException, Exception
    Deletes the portion of the lob data of this object starting
        at startpos for alength bytes. Note: remove( ) is deprecated.
    Parameters:
    startpos—the byte offset position start to delete
    alength—the length to delete
    Returns:
    a dkBlob object
    Overrides:
    remove in class dkBlob
public dkBlob insert(String astring,
    int startpos) throws DKException, Exception
    Inserts the argument data, following position startpos in
        the lob data of this object. Note: insert( ) is deprecated.
    Parameters:
    astring—the argument string data
    startpos—the byte offset position start to insert
    Returns:
    a dkBlob object
    Overrides:
    insert in class dkBlob
public dkBlob insert(dkBlob adkBlob,
    int startpos) throws DKException, Exception
    Inserts the argument data, following position startpos in
        the lob data of this object. Note: insert( ) is deprecated.
    Parameters:
    adkBlob—the lobData of this dkBlob is the argument data
    startpos—the byte offset position start to insert
    Returns:
    a dkBlob object
    Overrides:
    insert in class dkBlob
public void open( ) throws DKException, Exception
    Unloads the object content to a client file with a system
        generated name and then synchronously invoking a
        default handler against the file.
    Throws: DKException,
    Exception If error occurred
    Overrides:
    open in class dkXDOBase
public void open(String afileName)throws DKException,
Exception
    Unloads the object content to a file afileName provided by
        the application and then synchronously invoking a
        default handler against the file.
    Parameters:
    afileName—a provided file name
    Throws: DKException,
    Exception If error occurred
    Overrides:
    open in class dkBlob
public void setInstanceOpenHandler(String ahandler,
    boolean newSynchronousFlag)
    Sets the executable handler program name and whether
        this handler should be invoked synchronously or asynchronously for this object instant
    Parameters:
    ahandler—the handler program name to view the content
    newSynchronousFlag—true for synchronous process;
        false otherwise.
    Overrides:
    set InstanceOpenHandler in class dkBlob
public void setClassOpenHandler(String ahandler,
    boolean newSynchronousFlag)
    Sets the executable handler program name and whether
        this handler should be invoked synchronously or asynchronously for this object class
```

Parameters:

ahandler—the handler program name to view the content newSynchronousFlag—true for synchronous process; false otherwise.

Overrides:

setClassOpenHandler in class dkBlob public String getOpenHandler( )

Gets the current program name of the handler for this object instance

Returns:

the handler program name

Overrides:

getOpenHandler in class dkBlob public boolean isOpengynchronous( )

Gets the current synchronization property

Returns:

TRUE or FALSE for the handler

Overrides:

isOpenSynchronous in class dkBlob public String getRepType( )

Gets the DL representation type of the object content

Returns:

the DL representation type of the object content public void setRepType(String aRType)

Sets the DL representation type of the object content

Parameters:

aRType—the DL representation type of the object content public String getItemId( )

Gets the DL item id of the object content

Returns:

the DL item id of the object content public void setItemId(String aItemId)

Sets the DL item id of the object content

Parameters:

aRType—the DL item id of the object content public int getContentClass( )

Gets the content class of the object

Returns:

the content class of the object public void setContentClass(int aCClass)

Sets the content class of the object

Parameters:

aCClass—the content class of the object public int getAffiliatedType( ) throws DKException, Exception Gets the affiliated type of the object if DK_ANNOTATION, the getExtension ("DKAnnotationDL") should point to DKAnnotationDL Returns:

the affiliated type of the object

Overrides:

getAffiliatedType in class dkXDO public void setAffiliatedType(int aAType) throws DKException, Exception Sets the affiliated type of the object Parameters:

aAType—the affiliated type of the object

Overrides:

setAffiliatedType in class dkXDO getAffiliatedData public DKAnnotation getAffliatedData( )

Gets the affiliated data of this object, if the affiliatedType is DK_ANNOTATION, this should get the DKAnnotation object. Note: getAffiliatedData( ) is deprecated. Replace by getExtension(String extensionName).

Returns:

a DKAnnotation object contains the annotation data informations

See Also:

getExtension public void setAffiliatedData(DKAnnotation apAData)

Sets the affiliated data of this object, if the affiliatedType is DK_ANNOTATION, this should be provided. Note: setAffiliatedData( ) is deprecated. Replace by setExtension(..).

Parameters:

apAData—a DKAnnotation object contains the annotation data informations

See Also:

setExtension public String getSearchEngine( ) throws DKException, Exception

Gets search engine name. Note: getSearchEngine( ) is deprecated. Replace by DKSearchEngineInfoDL.getSearchEngine( ).

Returns:

the search engine name; SM for text search, QBIC for image search

Throws: DKException,

Exception If error occurred

See Also:

getExtension public void setSearchEngine(String aSearchEngine) throws DKException, Exception Sets the search engine name. Note: setSearchEngine( ) is deprecated. Replace by DKSearchEngineInfoDL.setSearchEngine(..)

Parameters:

aSearchEngine—the search engine name; SM for text search, QBIC for image search

Throws: DKException,

Exception If error occurred

See Also:

setExtension public String getSearchIndex( ) throws DKException, Exception

Gets the search index; ie."SearchService-IndexName" name. Note: getSearchIndex( ) is deprecated. Replace by DKSearchEngineInfoDL.getSearchIndex( ).

Returns:

the search index name

Throws: DKException,

Exception If error occurred

See Also:

getExtension public void setSearchIndex(String aSearchIndex) throws DKException Exception Sets the search index; ie."SearchService-IndexName" name. Note: setSearchIndex( ) is deprecated. Replace by DKSearchEngineInfoDL.setSearchIndex(..).

Parameters:

aSearchIndex—the search index name like "SearchService-IndexName"

Throws: DKException,

Exception If error occurred

See Also:

setExtension public String getSearchInfo( ) throws DKException, Exception

Gets the search information value; a three chars code, valid in the NLS language table that identifies the language. (ie. ENU is US English, JAP is Japanese..). Note: getSearchInfo( ) is deprecated. Replace by DKSearchiEngineInfoDL.getSearchInfo( ).

Returns:

the search infomation value

Throws: DKException,

Exception If error occurred

See Also:

getExtension public void setSearchInfo(String aSearchInfo) throws DKException, Exception Sets the search infomation value; a three chars code, valid in the NLS language table that identifies the language. (ie. ENU is US English, JAP is Japanese..). Note: setSearchInfo( ) is deprecated. Replace by DKSearchEngineInfoDL.setSearchInfo(..).

Parameters:

aSearchInfo—the three chars code, valid in the NLS language table

Throws: DKException,

Exception If error occurred

See Also:

setExtension public boolean getIndex.Flag( )

Gets the flag that indicates a part object is indexed by a search engine. Note:

getIndexFlag( ) is deprecated. Replace by isCategoryOf (..) method of this class.

Returns:

true if a part object is indexed by a search engine false otherwise.

See Also:

isCategoryOf public void setIndexFlag(boolean aFlag)

Sets the flag that indicates a part object is indexed by a search engine. Note: setIndexFlag( ) is deprecated.

Parameters:

aflag—a flag to indicate the part object is indexed by a search engine public DKBlobDL concatenate(DKBlobDL aDKBlobDL) throws DKException, Exception Concatenates this object content with another object content and returns a new DKBlobDL object containing the result. Note: concatenate( ) is deprecated.

Parameters:

aDKBlobDL—another DKBlobDL object

Returns:

a new DKBlobDL object containing the result

Throws: DKException,

Exception If error occurred public DKBlobDL concatenate(byte aByteArr[ ]) throws DKException, Exception Concatenates this object content with another stream and returns a new DKBlobDL object containing the result. Note: concatenate( ) is deprecated.

Parameters:

aByteArr—a byte array stream

Returns:

a new DKBlobDL object containing the result

Throws: DKException,

Exception If error occurred public DKBlobDL subLob(int startpos, int alength) throws DKException, Exception Similar to subString, but returns the subString data in form of a new DKBlobDL object. Note: subLob( ) is deprecated.

Parameters:

startpos—the byte offset position to start alength—the length of bytes to obtain Returns:

a new DKBlobDL object containing the result

Throws: DKException,

Exception If error occurred public void setRank(int aRank)

Sets the ranking value of a query

Parameters:

aRank—a ranking value

Overrides:

setRank in class dkXDO public int getRank( )

Gets the ranking value of a query

Returns:

a ranking value

Overrides:

getRank in class dkXDO public String getMimeType( ) throws DKException, Exception Gets the MIME type represents this object's contentClass Returns:

the MIME type

Throws: DKException,

Exception If error occurred

Overrides:

getMimeType in class dkXDO public String mimeType( ) throws DKException, Exception Gets the MIME type represents this object's contentClass Returns:

the MIME type

Throws: DKException,

Exception If error occurred public void setToBeIndexed( ) throws DKException, Exception Indexes an existing part object by search engine Throws: DKException, Exception If error occurred public String getCreatedTimestamp( ) throws DKException, Exception Gets the data & time that the object was created
Returns:
the data & time that the object was created
Throws: DKException,
Exception If error occurred
public String getUpdatedTimestamp( ) throws DKException, Exception
Gets the data & time that the object was updated
Returns:
the data & time that the object was updated
Throws: DKException,
Exception If error occurred
public int getRetrievalAction( ) throws DKException, Exception
Gets the retrieval option to perform the retrieve action. Note: getRetrievalAction( ) is deprecated. Replace by getOption(int option).
Returns:
the retrieval option
Throws: DKException,
Exception If error occurred
See Also:
getOption
public void setRetrievalAction(int aRetriveAction) throws DKException, Exception
Note: setRetrievalAction( ) is deprecated Replace by setOption(int option, Object value)
Sets the retrieval option to perform the retrieve action.
Parameters:
the—retrieval option
Throws: DKException,
Exception If error occurred
See Also:
setOption
public int getSize( ) throws DKException, Exception
Gets the size of this object without retrieve object content.
Returns:
the object size
Throws: DKException,
Exception If error occurred
public Object getOption(int option) throws DKException, Exception
Gets the delete or retrieval option to perform the delete or retrieve action.
Returns:
a retrieval or delete option
Throws: DKException,
Exception If error occurred
public void setOption(int option
Object value) throws DKException, Exception
Sets the delete or retrieval option to perform the delete or retrieve action.
Parameters:
option—an option
The valid options are:
DK_OPT_DL_DELETE_OPTION: for delete
DK_OPT_DL_RETRIEVAL_ACTION: for retrieve
value—the option value
For DK_OPT_DL_DELETE_OPTION, the valid values are:

For Non-media objects only:
DK_DELETE_ITEM
Delete item if no more part left in the item.
DK_DELETE_OBJECT_ONLY(default if not set)
Don't delete the item, even if there is no more part left in the item.
For Media objects only:
DK_DELETE NO_DROPITEM_MEDIA_AVAIL
Don't delete the item if there is no part left in the item. Cannot delete media parts (media objects) when they are in
use.
DK_DELETE NO_DROPITEM_MEDIA_INUSE
Don't delete the item, even if there is no part left in the item. User can delete media parts (media objects), even if they are in use.
DK_DELETE_DROPITEM_MEDIA_AVAIL
Delete the item if there is no part left in the item. Cannot delete media parts (media objects) when they are in use.
DK_DELETE_DROPITEM_MEDIA_INUSE
Delete the item if there is no part left in the item. Can delete media parts (media objects), even if they are in use.
For DK_OPT_DL_RETRIEVAL_ACTION, the valid values are:
DK_RETRIEVAL_GET_IT
DK_RETRIEVAL_GET_IT_PREFETCH
DK_RETRIEVAL_NO_MOUNT
DK_RETRIEVAL_NO_MOUNT_PREFETCH
DK_RETRIEVAL_STAGE_IT
DK_RETRIEVAL_STAGE_IT_PREFETCH
Throws: DKException,
Exception If error occurred
public void setExtension(String extensionName,
dkExtension extensionObj) throws DKException, Exception
Sets the extension object.
Parameters:
extensionName—the extension name
The valid extension names are:
DKSearchEngineInfoDL
For an annotation object, user needs to set this extension object
to hold the affiliated informations.
DKAnnotationDL
For a search indexed object, user needs to set this extension
object to hold the search indexed informations.
DKMediaStreamInfoDL
For a media object, user needs to set this extension object to
hold the media user data.
DKStorageManageInfoDL
If user wants to associate this part with different storage collection name, user needs to set this extension object to hold
the storage collection information.
extensionObj—a source extension object
Throws: DKException, Exception If error occurred
public void addExtension(String extensionName,
  dkExtension extensionObj) throws DKException, Exception
  Adds the extension object.
  Parameters:
  extensionName—the extension name
  extensionObj—a source extension object
  Throws: DKException,
  Exception If error occurred
  Overrides:
  addExtension in class dkXDO
public dkExtension getExtension(String extensionName) throws DKException, Exception
  Gets the extension object.
  Parameters:
  extensionName—the extension name
  The valid extension names are:
  DKSearchEngineInfoDL
  DKAnnotationDL
  DKMediaStreamInfoDL
  DKStorageManageInfoDL
  Returns:
  a dkExtension object
  Throws: DKException,
  Exception If error occurred
  Overrides:
  getExtension in class dkXDO
public void removeExtension(String extensionName) throws DKException
  Removes the extension object.
  Parameters:
  extensionName—the extension name
  The valid extension names are:
  DKSearchEngineInfoDL
  DKAnnotationDL
  DKMediaStreamInfoDL
  DKStorageManageInfoDL
  Throws: DKException
  If error occurred
  Overrides:
  removeExtension in class dkXDO
public boolean isCategoryOf(int categoryName) throws DKException, Exception
  Checks the object category.
  Parameters:
  categoryName—the category name
  The valid category names are:
  DK_MEDIA_OBJECT
  DK_INDEXED_object
  Returns:
  true if the object is the specified category; false otherwise.
  Throws: DKException,
  Exception If error occurred
public int retrieveObjectState(int object) throws DKException, Exception
  Retrieves the state of search indexed object or media object.
  Parameters:
  object—the type of object
  The valid input are:
  DK_MEDIA_OBJECT
  DK_INDEXED_object
  Returns:
  the object state
  For media object, the valid states are:
  1: Pending, load in progress
  2: Load completed successfully
  3: Load failed
  For search indexed object, the valid states are:
  256: to be updated
  512: to be deleted
  769: queued update
  770: queued delete
  1024: indexed
  Throws: DKException,
  Exception If error occurred
public void changeStorage( ) throws DKException, Exception
  Changes the system-managed storage (SMS) criteria for an object. The collection name, management class name and storage class name will be all converted to upper case by the system. These names must be valid on the object server where user stores the object. If user changes the collection name and specify a null string as the class name, the function places the object in the default class for the specified collection. User cannot move the object from one server to another using this function, therefore user cannot change the StoreSite. If the change causes any physical movement of the object, it might be deferred until the storage management cycle runs on the server.
  Throws: DKException,
  Exception If error occurred
public int getPartId( )
  Gets the part id of this XDO
  Returns:
  the part id
public void setPartId(intpartId)
  Gets the part id of this XDO
  Returns:
  the part id
public String[ ] listStreamName( ) throws DKException, Exception
  Returns a string array which contains a listing of all stream names in the current content. returns null if (multi)stream content not set (available). Note: if the content is not set, will attempt to retrieve the content from the object server.
  Returns:
  string array containing current stream names, else null.
  Throws: DKException
  (Exception) if error occurs.
public byte[ ] getStreamContent(String sName) throws DKException, Exception
  Returns the content of the stream specified by sName. If the stream does not exist throws DKException. If this is not a (multi)stream object then returns content of primary stream (lobData).

Parameters:

sName—name of string to retrieve content.

Returns:

byte array stream content corresponding to sName, else content of primary stream.

Throws: DKException is thrown if this is a (multi)stream object and stream does not exists with name sname.

public void setStreamContent(String sName, byte aByteArray[ ]) throws DKException, Exception Sets the content of the stream specified by sName to aByteArray. If the stream does not exist a new stream is added with streamName=sName and content=aByteArray. If this is not a (multi)stream object, the primary stream content is set to aByteArray instead.

Parameters:

sName—name of stream to set content.

aByteArray—content to set.

Throws: DKException (Exception) if error occurs.

public long streamLength(String sName) throws DKException, Exception

Returns the length of the content of the stream specified by sName. If the stream does not exist throws DKException. If this is not a (multi)stream object then returns content of primary stream (lobData). Note: calls getStreamContent(String) for content.

Parameters:

sName—name of string to retrieve content's length.

Returns:

length of byte array stream content corresponding to sName, else length of content of primary stream.

Throws: DKException is thrown if this is a (multi)stream object and stream does not exists with name sname.

public boolean isMultiStreamBlob( )

Returns true if current content is multistream, false otherwise.

public boolean isMultiStreamFlagSet( )

Returns true if the object server content is checked for Multistream, false otherwise.

9. Federated Collection

A federated collection allows an application program to process data objects resulting from a query as a group or collection and at the same time preserves the sub-grouping relationships that exists between them. It provides the user with a mechanism:

to aggregate several collection of data objects while preserving each individual collection information to treat these collections as one whole unit of collection, ignoring collection boundaries A federated collection is a collection containing DKResults objects, it is created to hold the results of DKFederatedQuery, which may come from several heterogenous datastores. Each DKResults contains the results of subquery of the federated query submitted to a specific native datastore associated with the federated datastore. To iterate over federated collection members (which are DKResults objects), a user should create and use dkIterator or DKSequentialIterator to pull each DKResults object. Then he could create another dkIterator on this DKResults to iterate over it and to process the result according to its datastore origin. Alternatively, the user can create a federated iterator, dkFederatedIterator, and use it to iterate over all element members across collection boundaries, regardless of which datastore the result came from. In theory, a federated collection can contains other nested collections up to any arbitrary depth. In the current implementation, a federated collection is not queryable. See Also: dkFederatedIterator, dkIterator, DKSequentialIterator.

An example class definition for DKFederatedCollection is set forth below.

---

DKFederatedCollection

```
Class com.ibm.mm.sk.common.DKFederatedCollection
public class DKFederatedCollection
     extends DKSequentialCollection
{
public DKFederatedCollection( )
public int cardinality( )
public int memberCardinality( )
```

-continued

```
public dkIterator createIterator( )
public dkIterator createMemberIterator( )
public Object retrieveElementAt(dkIterator where) throws DKUsageError
public void addElement(Object element) throws DKUsageError
public void addAllElements(dkCollection elements) throws DKUsageError
public void insert ElementAt(Object element,
            dkIterator where) throws DKUsageError
public void replaceElementAt(Object element,
            dkIterator where) throws DKUsageError
public void removeElementAt(dkIterator where) throws DKUsageError
public void removeAllElements( )
public void sort( ) throws DKUsageError
public void sort(boolean order) throws DKUsageError
public void sort(dkSort sortFunction,
        boolean sortOrder) throws DKUsageError
}
```

The following methods are part of the DKFederatedCollection class:

public DKFederatedCollection( )

Default constructor public int cardinality( )

Returns the number of all individual (leaf) elements (non-collection) across the collection boundaries. This is the total of all elements in each sub-collections.

Overrides:

cardinality in class DKSequentialCollection public int memberCardinality( )

Returns the number of elements in the collection. The element could be a collection object, i.e. DKResults object, not necessarily a leaf element (non-collection).

public dkIterator createIterator( )

Creates a new dkFederatedIterator for this federated collection. This iterator can be used to iterate over the federated collection, across collection boundaries, returning a (non-collection) member one at a time.

Returns:

an iterator

Overrides:

createiterator in class DKSequentialCollection public dkIterator createMemberIterator( )

Creates a new iterator for this federated collection. The new iterator would be supporting DKSequentialIterator interface. That is, the method "next" of this iterator would return a collection, such as DKResults object. User can then, create an iterator on this DKResults to iterate over its member.

Returns:

an iterator public Object retrieveElementAt(dkIterator where) throws DKUsageError Gets the element that the iterator is pointing at Parameters:

where—location in collection to retrieve an object

Returns:

an element

Overrides:

retrieveElementAt in class DKSequentialCollection public void addElement(Object element) throws DKUsageError Adds an element to the end of the collection, and invalidates all of the current iterators.

Parameters:

element—element to be added

Overrides:

addElement in class DKSequentialCollection public void addAllElements(dkCollection elements) throws DKUsageError Adds all elements in the collection, and invalidates all of the current iterators.

Parameters:

elements—collection of elements to be added

Overrides:

addAllElements in class DKSequentialCollection public void insertElementAt(Object element, dkIterator where) throws DKUsageError Adds a new element, after the element the iterator is currently pointing at. The iterator is advanced to the new element, invalidating all other iterators.

Parameters:

element—element to be added where—location in collection

Overrides:

insertElementAt in class DKSequentialCollection public void replaceElementAt(Object element, dkIterator where) throws DKUsageError Replaces the element the iterator is currently pointing at.

Parameters:

element—element to be added iter—location in collection

Overrides:

replaceElementAt in class DKSequentialCollection public void removeElementAt(dkIterator where) throws DKUsageError Removes the element the iterator is currently pointing at. The iterator is advanced to the next element after this operation, invalidating all other iterators.

Parameters:

iter—location in collection

Overrides:

removeElementAt in class DKSequentialCollection public void removeAllElements( )

Removes all elements in the collection Invalidates all other iterators.

Overrides:

removeAllElements in class DKSequentialCollection

```
public void sort( ) throws DKUsageError
   Sort is not supported in the FederatedCollection. Excep-
      tion will be thrown if this function is called.
   Overrides:
   sort in class DKSequentialCollection
public void sort(boolean order) throws DKUsageError
   Sort is not supported in the FederatedCollection. Excep-
      tion will be thrown if this function is called.
   Overrides:
   sort in class DKSequentialCollection
public void sort(dksort sortFunction,
      boolean sortOrder) throws DKUsageError
   Sort is not supported in the FederatedCollection. Excep-
      tion will be thrown if this function is called.
   Overrides:
   sort in class DKSequentialCollection
   A federated iterator is used to iterate over the collective
      members of DKFederatedCollection across collection
      boundaries. The next( ) method returns DDO objects
      until all collections are iterated over. This iterator is
      created by invoking the method createIterator( ) in the
      DKFederatedCollection object. See Also: dkIterator,
      DKSequentialIterator
   An example class definition for dkFederatedIterator is set
      forth below.
```

---

```
dkFederatedIterator package com.ibm.mm.sdk.common.dkFederatedIterator
   public interface dkFederatedIterator
         extends DKSequentialIterator
   {
   public abstract Object next( ) throws DKUsageError
   public abstract void reset( )
   public abstract boolean more( )
   public abstract Object previous( ) throws DKUsageError
   public abstract Object at( ) throws DKUsageError
   public abstract boolean setToFirst( )
   public abstract boolean setToLast( )
   public abstract boolean setToNext( )
   public abstract boolean setToPrevious( )
   public abstract boolean setToFirstCollection( )
   public abstract boolean setToLastCollection( )
   public abstract boolean setToNextCollection( )
   public abstract boolean setToPreviousCollection( )
   }
```

---

The following methods are part of the dkFederatedIterator class:

public abstract Object next( ) throws DKUsageError
   Returns the current element in the collection and advances
      the iterator to the next position. In case the element is
      a collection, it goes inside that collection and retrieves
      the first element recursively, until it finds an element
      which is not a collection. When the current collection
      is exhausted, this iterator will find the next collection
      and extract the first element (non-collection) from it.
   Throws: DKUsageError
   if already at the last item in collection
public abstract void reset( )
   Resets the iterator to the beginning of DKFederatedCol-
      lection.
public abstract boolean more( )
   Returns true if there are more elements in the DKFeder-
      atedCollection. In this case, an element implicitly
      means a collection member which is not a collection (a
      leaf).
public abstract Object previous( ) throws DKUsageError
   Returns the current element in the collection and moves
      the iterator backward one position. In case the element
      is a collection, it goes inside that collection and
      retrieves the last element, until it finds an element
      which is not a collection. When the current collection
      is exhausted, this iterator will find the previous collec-
      tion and extract the last element (non-collection) from
      it.
   Throws: DKUsageError
   if already at the first item in collection
public abstract Object at( ) throws DKUsageError
   Returns the current element in the collection without
      moving the iterator position. The returned element is
      not a collection. Throws: DKUsage if collection is
      empty, or current position is invalid.
public abstract boolean setToFirst( )
   Sets the iterator to the first element in this federated
      collection. The first element is not a collection. Returns
      true if the operation is successful, otherwise it returns
      false.
public abstract boolean setToLast( )
   Sets the iterator to the last element in this federated
      collection. The last element is not a collection. Returns
      true if the operation is successful, otherwise it returns
      false.
public abstract boolean setToNext( )
   Sets the iterator to the next element in this federated
      collection. The next element is not a collection. Returns
      true if the operation is successful, otherwise it returns
      false.
public abstract boolean setToPrevious( )
   Set the iterator to the previous element in this federated
      collection. The previous element is not a collection.
      Returns true if the operation is successful, otherwise it
      returns false.
public abstract boolean setToFirstCollection( )
   Sets the iterator to the first element in the first collection
      in this federated collection. The first element is not a
      collection. Returns true if the operation is successful,
      otherwise it returns false.
public abstract boolean setToLastCollection( )
   Sets the iterator to the last element in the last collection in
      this federated collection. The last element is not a
      collection. Returns true if the operation is successful,
      otherwise it returns false.
public abstract boolean setToNextCollection( )
   Sets the iterator to the first element in the next collection
      in this federated collection. The first element is not a
      collection. Returns true if the operation is successful, oth-
      erwise it returns false.
public abstract boolean setToPreviousCollection( )
   Sets the iterator to the last element in the previous
      collection in this federated collection. The first last is
      not a collection. Returns true if the operation is
      successful, otherwise it returns false.

10. Sequential Collection

DKSequentialCollection is a subclass of dkCollection
      which supports sorting and sequential access in a
      bi-directional manner, i.e. forward and backward. A
      sequential collection is not queryable. DKSequential-
      Collection can create and support
      DKSequentialIterator, which is also bi-directional.
   An example class definition for DKSequentialCollection
      is set forth below.

DKSequentialCollection

```
package com.ibm.mm.sdk.common.DKSequentialCollection
public class DKSequentialCollection
    extends Object
    implements dkCollection, DKMessageId, Serializable
{
public DKSequentialCollection( )
public DKSequentialCollection(dkSort sortFunction)
public int cardinality( )
public dkIterator createIterator( )
public Object retrieveElementAt(dkIterator iter) throws DKUsageError
public void addElement(Object element) throws DKUsageError
public void insertElementAt(Object element,
            dkIterator iter) throws DKUsageError
public void replaceElementAt(Object element,
            dkIterator iter) throws DKUsageError
public void removeElementAt(dkIterator iter) throws DKUsageError
public void removeAllElements( ) throws DKUsageError
public void setName(String name)
public String getName( )
public void setSortFunction(dkSort sortFunction)
public dkSort getSortFunction( )
public void sort( ) throws DKUsageError
public void sort(boolean order) throws DKUsageError
public void sort(dkSort sortFunction,
        boolean sortOrder) throws DKUsageError
}
```

The following methods are part of the DKSequentialCollection class:
public DKSequentialCollection( )
  Constructs a DKSequentialCollection.
public DKSequentialCollection(dkSort sortFunction)
Constructs a DKSequentialCollection with the given sort function.
  Parameters:
  sortFounction—sort function.
public int cardinality( )
  Gets the number of elements in the collection.
  Returns:
  the number of elements.
public dkIterator createIterator( )
  Creates a new iterator for this collection. The default is DKSequentialIterator object.
  Returns:
  an iterator
public Object retrieveElementAt(dkIterator iter) throws DKUsageError
  Gets the element that the iterator is pointing at.
  Parameters:
  iter—location in collection to retrieve an object.
  Returns:
  an element
public void addElement(Object element) throws DKUsageError
  Adds an element to the end of the collection, and invalidates all of the current iterators.
  Parameters:
  element—element to be added.
public void insertElementAt(Object element,
  dkIterator iter) throws DKUsageError
  Adds a new element, after the element the iterator is currently pointing at. The iterator is advanced to the new element, invalidating all other iterators.
  Parameters:
  element—element to be added.
  iter—location in collection.
public void replaceElementAt(Object element,
  dkIterator iter) throws DKUsageError
  Replaces the element the iterator is currently pointing at.
  Parameters:
  element—element to be added.
  iter—location in collection.
public void removeElementAt(dkIterator iter) throws DKUsageError
  Removes the element the iterator is currently pointing at. The iterator is advanced to the next element after this operation, invalidating all other iterators.
  Parameters:
  iter—location in collection
public void removeAllElements( ) throws DKUsageError
  Removes all elements in the collection and invalidates all other iterators.
public void setName(String name)
  Sets the name of the collection.
  Parameters:
  name—collection name.
public String getName( )
  Gets the name of the collection.
  Returns:
  collection name
public void setSortFunction(dkSort sortFunction)
  Sets the sort function for sorting this collection.
  Parameters:
  sortFunction—the sort function.
public dkSort getSortFunction( )
  Gets the sort function.
  Returns:
  a sort function object.
public void sort( ) throws DKUsageError Sorts the elements in this collection using the sort function. The default order is ascending. The sort function must be set before.

See Also:

sort public void sort(boolean order) throws DKUsageError

Sorts the elements in this collection in the given order using the sort function. The sort function must be set before.

Parameters:

order—a boolean value indicating the sort order. If true sort in ascending order, otherwise sort in descending order.

See Also:

sort public void sort(dkSort sortFunction, boolean sortOrder) throws DKUsageError Sorts the elements in this collection using the given sort function and sort order. sortFunction is a function object which defines the method to get the object key and perform comparison on them.

Parameters:

sortFunction—the sort function.

sortOrder—a boolean value indicating the sort order. If true sort in ascending order, otherwise sort in descending order.

11. Folders, Parts, and Persistent Identifiers

DKFolder is a subclass of sequential collection. Its purpose is to hold a collection of document DDO and folder DDO, members of a folder DDO. The DDO representing a folder has an attribute with reserved name of DKFolder, its value is a reference to the DKFolder collection. DKFolder inherits the public interface of sequential collection, but internally it keeps track of member addition and deletion (to be reflected when the DDO is saved to the back-end datastore). In addition to the inherited methods, DKFolder has two additional methods: addMember( ) and removeMember( ).

An example class definition for DKFolder is set forth below.

---

DKFolder

```
package com.ibm.mm.sdk.common.DKFolder
public class DKFolder
    extends DKSequentialCollection
    implements DKConstant, DKMessageId, Serializable
{
```

---

```
public void addMember(DKDDO folder,
        DKDDO member) throws DKException
public void removeMember(DKDDO folder,
        DKDDO member) throws DKException
}
```

---

The following methods are part of the DKFolder class:

public void addMember(DKDDOfolder,

DKDDO member) throws DKException

Adds a new member to this folder and reflects the results immediately in the datastore, i.e. make it persistent. At the end of the operation, the new member will be in this DKFolder collection in-memory, as well as in the persistent folder representation in the datastore. In Digital Library, the member must exists (has been created) in the datastore before it can be added to a folder.

Parameters:

folder—a folder object member—the member to be added to the folder public void removeMember(DKDDOfolder, DKDDO member) throws DKException Removes a member from this folder and reflects the results immediately in the datastore, i.e. make it persistent. At the end of the operation, the member object will not be in this DKFolder collection in-memory, and it will also be removed from the persistent folder representation in the datastore.

Parameters:

folder—a folder object member—the member to be removed from the folder

DKParts is a subclass of a sequential collection. Its purpose is to hold part XDO members of a document object. The DDO representing a document has an attribute with reserved name of DKParts, its value is a reference to the DKParts collection. DKParts inherits the public interface of sequential collection, but internally it keeps track of member addition and deletion (to be reflected when the DDO is saved to the back-end datastore). In addition to the inherited methods, DKParts has two additional methods: addMember( ) and removeMember( ).

An example class definition for DKParts is set forth below.

---

DKParts

```
package com.ibm.mm.sdk.common.DKParts
public class DKParts
    extends DKSequentialCollection
    implements DKConstant, Serializable
{
public DKParts( )
public dkCollection getAffiliatedTypes(int affiliatedType) throws DKException, Exception
public void addMember(DKDDO item,
        dkXDO member) throws DKException, Exception
}
```

The following methods are part of the DKParts class:
public DKParts( )

Constructs a DKParts object.

public dkcollection getAffiliatedTypes(int affiliatedType) throws DKException, Exception Gets the specified affiliated type objects from this part collection. Examples of affiliated types are DK_CM_ANNOTATION, DK_CM_NOTE, etc.

Parameters:

affiliatedType—the desired affiliated type to extract.

Returns:

a collection of xdo objects having the specified affiliated types public void addMember(DKDDO item,
   dkXDO member) throws DKException, Exception Adds a new member into this parts collection and reflects the results immediately in the datastore, i.e. make it persistent. The new member must not exists in the persistent store. At the end of the operation, the new member will be in this DKParts collection in-memory, as well as in the persistent item representation in the datastore. This operation has the same effect as the sequencing of member.add( ) and this.addElement (member), where member is the part XDO and this is the collection of parts (DKParts) in this item.

Parameters:

item—the data object that contains this parts collection member—the member to be added to this parts collection public void removeMember(DKDDO item,
   dkXDO member) throws DKException, Exception Removes a member from this parts collection and reflects the results immediately in the datastore, i.e. make it persistent. At the end of the operation, the member object will not be in this DKParts collection in-memory, and it will also be removed from the persistent item representation in the datastore. This operation has the same effect as the sequencing of this.removeElement(member) and member.del( ), where member is the part XDO and this is the collection of parts (DKParts) in this item.

Parameters:

item—the data object that contains this parts collection member—the member to be removed from this parts collection The DKpid class represents a Pid (Persistent identifier) object. An example class definition for DKPid is set forth below.

DKPid

```
package com.ibm.mm.sdk.common.DKPid
public class DKPid
    extends Object
    implements DKMessageId, Serializable
{
    public DKPid( )
    public DKPid(int idStringCount)
    public DKPid(String sourcePidString) throws DKException
    public DKPid(DKPid pid)
    public String getDatastoreType( )
    public void setDatastoreType(String sourceDatastoreType)
    public String getDatastoreName( )
    public void setDatastoreName(String sourceDatastoreName)
    public String getId( )
    public void setId(String sourceId)
    public String getIdString( )
    public void setIdString(String sourceId)
    public String getPrimaryId( )
    public void setPrimaryId(String primaryId)
    public String pidString( )
    public String getObjectType( )
    public void setObjectType(String sourceObjectType)
    public boolean isSet( )
    public int getIdStringCount( )
    public void setIdStringCount(int idStringCount)
    public String getIdString(int index) throws DKException
    public void setIdString(int index,
            String idStringItem) throws DKException
    public boolean equals(Object otherObject)
    public Object clone( )
    public String pidType( )
}
```

The following methods are part of the DKPid class:
public DKPid( )

Constructs a Pid object.

public DKPid(int idStringCount)

Constructs a Pid object

Parameters:

idStringCount—string id count public DKPid(String sourcePidString) throws DKException Constructs a Pid object from a Pid string representation.

Parameters:

sourcePidString—the Pid string, a string obtained by calling the pidstring( ) method in Pid.

public DKPid(DKPidpid)

Constucts a Pid from another Pid.

Parameters:

pid—the other Pid public String getDatastoreType( )

Gets the datastore type from this Pid.

Returns:

the datastore type.

public void setDatastoreType(String sourceDatastoreType)

Sets the datastore type of this Pid.

Parameters:

sourceDatastoreType—datastore type.

public String getDatastoreName( )

Gets the datastore name from this Pid.

Returns:

the datastore name public void setDatastoreName(String sourceDatastoreName)

Sets the datastore name of this Pid.

Parameters:

sourceDatastoreName—datastore name public String getId( )

Gets the datastore specific persistent-id of the owner data-object. This id contains information to locate the persistent data, of the owner data-object, in the datastore. Note: getId( ) is deprecated. Replace by getPrimaryId.

Returns:

the datastore persistent-id

See Also:

getPrimaryId public void setId(String sourceId)
   Sets the datastore specific persistent-id for the owner data-object. Note: setid( ) is deprecated. Replace by setprimaryId.
   Parameters:
   sourceId—datastore persistent-id
   See Also:
   setPrimaryId public String getIdString( )
   Gets the datastore specific persistent-id of the owner data-object This id contains information to locate the persistent data, of the owner data-object, in the datastore.
   Returns:
   the datastore persistent-id.

public void setIdString(String sourceId)
   Sets the datastore specific persistent-id for the owner data-object. The user should also set the item id whenever the id string is set.
   Parameters:
   sourceId—datastore persistent-id public String getPrimaryId( )
   Gets the datastore specific primary persistent-id
   Returns:
   the datastore primary persistent-id public void setPrimaryId(String primaryId)
   Sets the datastore specific primary persistent-id
   Parameters:
   primaryId—datastore primary persistent-id public String pidString( )
   Gets the string representation of the Pid. This string is of internal format and not to be parsed by users. This string can be used as an input parameter to re-construct the Pid using the proper constructor.
   Returns:
   string representation of the Pid.
   See Also:
   DKPid public String getObjectType( )
   Gets the type of the data-object owning this Pid.
   Returns:
   the object type public void setObjectType(String sourceObjectType)
   Sets the type of the data-object owning this Pid.
   Parameters:
   toObjectType—the object type public boolean isSet( )
   Returns true if all components of this Pid are set to their intended values.
   Returns:
   true or false.

public int getIdStringCount( )
   Gets id string count
   Returns:
   the id string count public void setIdStringCount(int idStringCount)
   Sets id string count
   Parameters:
   idStringCount—the id string count public String getIdString(int index) throws DKException
   Gets id string by index (0 to n−1)
   Parameters:
   index—the index of a part of the id string
   Returns:
   a part of the id string by index public void setIdString(int index, String idStringItem) throws DKException
   Sets id string by index (0 to n−1)
   Parameters:
   index—the index of a part of the id string
   idStringItem—a part of the id string public boolean equals(Object otherObject)
   Compares this Pid if it is equal to another Pid. All data-members are compared for equality.
   Parameters:
   otherObject—the other Pid.
   Returns:
   s true if this Pid equals to otherobject.
   Overrides:
   equals in class object public Object clone( )
   Clones.
   Returns:
   the a copy of Pid
   Overrides:
   clone in class object public String pidType( )
   Gets Pid type.
   Returns:
   the pid type.

The DKPidXDODL class represents a Pid (Persistent identifier) object for an extended data object in a Digital Library. An example class definition for DKPidXDODL is set forth below.

```
DKPidXDODL package com.ibm.mm.sdk.common.DKPidXDODL
public class DKPidXDODL
    extends DKPidXDO
    implements DKConstant, DKMessageId, Serializable
{
public DKPidXDODL( )
public DKPidXDODL(String aPidString) throws DKException
public DKPidXDODL(DKPidXDODL aDKPidXDODL)
public String getId( )
public void setId(String sourceId)
public String getPrimaryId( )
public void setPrimaryId(String primaryId)
public int getPartId( )
public void setPartId(int aPartId)
public String getItemId( )
public void setItemId(String aItemId)
public boolean isSet( )
public Object clone( )
public boolean equals(Object otherObject)
public String getRepType( )
public void setRepType(String aRType)
public String pidType( )
}
```

The following methods are part of the DKPidXDODL class:
public DKPidXDODL( )
   Constructs a Pid public DKPidXDODL(String aPidString) throws DKException
   Constructs a Pid
   Parameters:
      aPidString—pid string
public DKPidXDODL(DKPidXDODL aDKPidXDODL)
   Constructs a Pid
   Parameters:
      aDKPidXDODL—XDO pid for DL
public String getId( )
   Gets the datastore specific persistent-id of the owner data-object. This id contains information to locate the persistent data, of the owner data-object, in the datastore. Note: getId( ) is deprecated. Replace by getPrimaryId.
   Returns:
      the datastore persistent-id.
   Overrides:
      getId in class DKPid
   See Also:
      getPrimaryId
public void setId(String sourceId)
   Sets the datastore specific persistent-id for the owner data-object Note: setId( ) is deprecated. Replace by setPrimaryId.
   Parameters:
      sourceId—datastore persistent-id
   Overrides:
      setId in class DKPid
   See Also:
      setPrimaryId
public String getPrimaryId( )
   Gets the datastore specific Primary persistent-id
   Returns:
      the datastore Primary persistent-id
   Overrides:
      getPrimaryId in class DKPid
public void setPrimaryId(String primaryId)
   Sets the datastore specific Primary persistent-id
   Parameters:
      primaryId—datastore primary persistent-id
   Overrides:
      setPrimaryId in class DKPid
public int getPartId( )
   Gets the Part id
   Returns:
      the part id
public void setPartId(int aPartId)
   Sets the Part id
   Parameters:
      aPartId—the part id
public String getItemdI( )
   Gets the Item id
   Returns:
      the item id
public void setItemId(String aItemId)
   Sets the Item id
   Parameters:
      aItemId—the item id public boolean isSet( )
   Pid values set indicator
   Returns:
      true is all components of this Pid are set to their intended values.
   Overrides:
      isSet in class DKPidXDO
public Object clone( )
   Clones
   Returns:
      the a copy of Pid
   Overrides:
      clone in class DKPidXDO
public boolean equals(Object otherObject)
   Compares Pids
   Returns:
      true if to pids are equal
   Overrides:
      equals in class DKPid
public String getRepType( )
   Gets the representation type of the part
   Returns:
      the representation type
public void setRepType(String aRType)
   Sets the representation type of the part
   Parameters:
      aRType—a representation type
public String pidType( )
   Gets Pid type.
   Returns:
      the pid type.
   Overrides:
      pidType in class DKPidXDO 12. Result Sets DKResults is a sub-class of dkQueryableCollection, therefore it supports sorting and bi-directional iterator, and it is queryable. Element members of DKResults are always DKDDO objects, which represent hits from a query. The iterator created by this class is DKSequentialIterator. An example class definition for DKResults is set forth below.

---

DKResults

```
package com.ibm.mm.sdk.common.DKResults
public class DKResults
    extends dkQueryableCollection
        implements DKMessageId, DKConstant, Serializable
{
public DKResults(dkDatastore ds)
public Object evaluate(String query,
}
```

---

The following methods are part of the DKResults class:
public DKResults(dkDatastore ds)
   Constructs a DKResults with a given datastore object.
   Parameters:
      ds—the associated datastore object where the results come from.

public Object evaluate(String query, short QLType,

DKNVPair params[ ]) throws DKUsageError, DKException, Exception

Evaluates the given query using the current element members of this collection as the scope of the query. The new results is an intersection between the results of the new query with the current element members of this collection. This method implements the queryable behavior of dkQueryableCollection.

Side-effects:

this collection members will be sorted by itemid.

all iterators will be invalidated.

Parameters:

query—the new query string to be evaluated.

QLType—the query language type of the new query.

params—the parameter array required to evaluate the query.

Returns:

a new DKResults object containing the intersection.

Overrides:

evaluate in class dkQueryableCollection

13. Result Set Cursor dkResultSetCursor is used for a result of a set of cursors pointing to data in one or more datastores. An example class definition for dkResultSetCursor is set forth below.

--- dkResultSetCursor

```
package com.ibm.mm.sdk.common.ResultSetCursor
public interface dkResultSetCursor
{
public abstract boolean isscrollable() throws DKException, Exception
public abstract boolean isUpdatable() throws DKException, Exception
public abstract boolean isValid() throws DKException, Exception
public abstract boolean isOpen() throws DKException, Exception
public abstract boolean isBegin() throws DKException, Exception
public abstract boolean isEnd() throws DKException, Exception
public abstract boolean isInBetween() throws DKException, Exception
public abstract int getPosition() throws DKException, Exception
public abstract void setPosition(int position,
        Object value) throws DKException, Exception
public abstract void setToNext() throws DKException, Exception
public abstract DKDDO fetchObject() throws DKException, Exception
public abstract DKDDO fetchNext() throws DKException, Exception
public abstract boolean fetchNextN(int how_many,
        dkCollection collection) throws DKException, Exception
public abstract Object fetchObjectByName(String dataItemName) throws DKException,
    Exception
public abstract Object fetchNextByName(String dataItemName) throws DKException,
Exception
public abstract boolean fetchNextNByName(String dataItemName,
        int how_many,
        Object array[]) throws DKException, Exception
public abstract DKDDO findObject(int position,
        String predicate) throws DKException, Exception
public abstract void deleteObject() throws DKException, Exception
public abstract void updateObject(DKDDO ddo) throws DKException, Exception
public abstract DKDDO newObject() throws DKException, Exception
public abstract void addObject(DKDDO ddo) throws DKException, Exception
public abstract void open() throws DKException, Exception
public abstract void close() throws DKException, Exception
public abstract void destroy() throws DKException, Exception
public abstract void open(DKNVPair parms[]) throws DKException, Exception
public abstract String datastoreName() throws Exception
public abstract String datastoreType() throws Exception
public abstract DKHandle handle(int type) throws Exception
public abstract DKHandle handle(String type) throws Exception
public abstract int cardinality() throws DKException, Exception
public abstract String objectType() throws Exception
}
```

---

The following methods are part of the dkResultSetCursor class:

public abstract boolean isScrollable( ) throws DKException, Exception

Scrollable indicator

Returns:

true if cursor can be scrolled forward and backward.

public abstract boolean isUpdatable( ) throws DKException, Exception

Updatable indicator

Returns:

true if cursor is updatable.

public abstract boolean isValid( ) throws DKException, Exception

Valid indicator

Returns:

true if cursor is valid.

public abstract boolean isOpen( ) throws DKException, Exception

Open indicator

Returns:

true is cursor is in an opened state.

public abstract boolean isBegin( ) throws DKException, Exception

Begin indicator

Returns:

true if cursor is positioned at the beginning.

public abstract boolean isEnd( ) throws DKException, Exception

End indicator

Returns:

true if cursor is positioned at the end.

public abstract boolean isInBetween( ) throws DKException, Exception

Between data objects in cursor indicator

Returns:

true if cursor is in between data objects in the cursor.

public abstract int getPosition( ) throws DKException, Exception

Gets the current cursor position

Returns:

cursor position public abstract void setPosition(int position,

Object value) throws DKException, Exception

Sets the cursor position

Parameters:

position—cursor position option value—cursor position value public abstract void setToNext( ) throws DKException, Exception Sets cursor to point to the position of the next data object in the cursor.

public abstract DKDDO fetchObject( ) throws DKException, Exception

Fetches the element in the cursor at the current position

Returns:

DDO public abstract DKDDO fetchNext( ) throws DKException, Exception

Sets cursor to point to the position of the next data object and fetches the element in the cursor at that position.

Returns:

DDO public abstract boolean fetchNextN(int how_many, dkCollection collection) throws DKException, Exception Fetches the next N elements of the cursor and inserts them into the given collection.

Parameters:

how_many—how many elements the user wants to be returned in the collection.

collection—the collection where elements that are fetched are stored.

Returns:

true if there is at least one data object returned.

public abstract Object fetchObjectByName(String dataItemName) throws DKException, Exception Fetches the data item value in the cursor at the current position by data item name.

Parameters:

dataItemName—data item name

Returns:

object public abstract Object fetchNextByName(String dataItemName) throws DKException, Exception Sets cursor to point to the position of the next data object and fetches the data item value in the cursor at that position by data item name.

Parameters:

dataItemName—data item name

Returns:

object public abstract boolean fetchNextNByName(String dataItemName, int how_many, Object array[ ]) throws DKException, Exception Fetches the next N data item values of the cursor and inserts them into the given array Parameters:

dataItemName—data item name how_many—how many data item values the user wants to be returned in the collection.

array—the array where the data item values that are fetched are stored.

Returns:

true if there is at least one data item value returned.

public abstract DKDDO findObject(int position,

String predicate) throws DKException, Exception

Find the data object which satisfies the given predicate, move the cursor to that position, fetch.

Returns:

DDO public abstract void deleteObject( ) throws DKException, Exception

Deletes element at the current cursor position from the Datastore public abstract void updateObject(DKDDO ddo) throws DKException, Exception Updates element at the current cursor position from the Datastore public abstract DKDDO newObject( ) throws DKException, Exception Constructs a new DDO of the same type as the items in the result Returns:

DDO public abstract void addObject(DKDDO ddo) throws DKException, Exception

Adds an element to the Datastore public abstract void open( ) throws DKException, Exception Opens the cursor. This reexcutes the query and repositions the cursor to the beginning.

public abstract void close( ) throws DKException, Exception

Close the cursor and invalidates the result set.

public abstract void destroy( ) throws DKException, Exception

Destroys the cursor. This method allows for cleanup, before garbage-collection is done on this class.

public abstract void open(DKNVPair parms[ ]) throws DKException, Exception

Opens the cursor. This reexcutes the query and repositions the cursor to the beginning.

Parameters:

parms—allows for parameters to be passed in for the reexecution of the query.

public abstract String datastoreName( ) throws Exception

Gets the datastore name

Returns:

datastore name public abstract String datastoreType( ) throws Exception

Gets the datastore type

Returns:

datastore type public abstract DKHandle handle(int type) throws Exception

Gets a cursor handle. Note: handle( ) is deprecated. Replace by handle(String type).

Parameters:

type—type of cursor handle wanted

Returns:

a cursor handle

See Also:

handle public abstract DKHandle handle(String type) throws Exception

Gets a cursor handle

Parameters:

type—type of cursor handle wanted

Returns:

a cursor handle public abstract int cardinality( ) throws DKException, Exception Gets the number of query results Returns:

number of query results public abstract String objectType( ) throws Exception

Gets the cursor object type

Returns:

cursor object type

14. Federated Result Set Cursor

DKResultSetCursorFed is a result set cursor for a federated datastore. An example class definition for DKResultSetCursorFed is set forth below.

```
DKResultSetCursorFed com.ibm.mm.sdk.server.DKResultSetCursorFed
    public class DKResultSetCursorFed
        extends dkAbstractResultSetCursor
        implements DKConstantFed, DKMessageIdFed
{
    public DKResultSetCursorFed(DKDatastoreFed ds,
            DKNVPair parms[]) throws DKException, Exception
    public boolean isScrollable() throws DKException, Exception
    public boolean isUpdatable() throws DKException, Exception
    public boolean isvalid() throws DKException, Exception
    public boolean isOpen() throws DKException, Exception
    public boolean isBegin() throws DKException, Exception
    public boolean isEnd() throws DKException, Exception
    public boolean isInBetween() throws DKException, Exception
    public int getPosition() throws DKException, Exception
    public void setPosition(int position,
            Object value) throws DKException, Exception
    public void setToNext() throws DKException, Exception
    public DKDDO fetchObject() throws DKException, Exception
    public DKDDO fetchNext() throws DKException, Exception
    public boolean fetchNextN(int how__many,
            dkCollection collection) throws DKException, Exception
    public Object fetchObjectByName(String dataItemName) throws DKException, Exception
    public Object fetchNextByName(String dataItemName) throws DKException, Exception
    public boolean fetchNextNByName(String dataItemName,
            int how__many,
            Object array[]) throws DKException, Exception
    public DKDDO findObject(int position,
            String predicate) throws DKException, Exception
    public void deleteObject() throws DKException, Exception
    public void updateObject(DKDDO ddo) throws DKException, Exception
    public DKDDO newObject() throws DKException, Exception
    public void addObject(DKDDO ddo) throws DKException, Exception
    public void open() throws DKException, Exception
    public void close() throws DKException, Exception
    public void destroy() throws DKException, Exception
    public void open(DKNVPair parms[]) throws DKException, Exception
    public String datastoreName() throws Exception
    public String datastoreType() throws Exception
    public DKHandle handle(int type) throws Exception
    public DKHandle handle(String type) throws Exception
    public int cardinality() throws Exception
    public void done()
    public synchronized void addRSCursor(ResultSetCursor rsCursor)
```

*-continued*

```
public synchronized dkResultSetCursor fetchNextCursor() throws DKException,
  Exception
}
```

The following methods are part of the DKResultSetCursorFed class:
public DKResultSetCursorFed(DKDatastoreFed ds,
  DKNVPair parms[ ]) throws DKException, Exception
public boolean isScrollable( ) throws DKException, Exception
  Overrides:
    isScrollable in class dkAbstractResultSetCursor
public boolean isUpdatable( ) throws DKException, Exception
  Overrides:
    isUpdatable in class dkAbstractResultSetCursor
public boolean isValid( ) throws DKException, Exception
  Overrides:
    isValid in class dkAbstractResultSetCursor
public boolean isOpen( ) throws DKException, Exception
  Overrides:
    isOpen in class dkAbstractResultSetCursor
public boolean isBegin( ) throws DKException, Exception
  Overrides:
    isBegin in class dkAbstractResultSetCursor
public boolean isEnd( ) throws DKException, Exception
  Overrides:
    isEnd in class dkAbstractResultSetCursor
public boolean isInBetween( ) throws DKException, Exception
  Overrides:
    isInBetween in class dkAbstractResultSetCursor
public int getPosition( ) throws DKException, Exception
  Overrides:
    getPosition in class dkAbstractResultSetCursor
public void setPosition(int position,
  Object value) throws DKException, Exception
  Overrides:
    setPosition in class dkAbstractResultSetCursor
public void setToNext( ) throws DKException, Exception
  Overrides:
    setToNext in class dkAbstractResultSetCursor
public DKDDO fetchObject( ) throws DKException, Exception
  Overrides:
    fetchObject in class dkAbstractResultSetCursor
public DKDDO fetchNext( ) throws DKException, Exception
  Overrides:
    fetchNext in class dkAbstractResultSetCursor
public boolean fetchNextN(int how_many,
  dkCollection collection) throws DKException, Exception
  Overrides:
    fetchNextN in class dkAbstractResultSetCursor
public Object fetchObjectByName(String dataItemName) throws DKException, Exception
  Overrides:
    fetchObjectByName in class dkAbstractResultSetCursor
public Object fetchNextByName(String dataItemName) throws DKException, Exception
  Overrides:
    fetchNextByName in class dkAbstractResultSetCursor
public boolean fetchNextNByName(String dataItemName,
  int how_many,
  Object array[ ]) throws DKException, Exception
  Overrides:
    fetchNextNByName in class dkAbstractResultSetCursor
public DKDDO findObject(int position,
  String predicate) throws DKException, Exception
  Overrides:
    findObject in class dkAbstractResultSetCursor
public void deleteObject( ) throws DKException, Exception
  Overrides:
    deleteObject in class dkAbstractResultSetCursor
public void updateObject(DKDDO ddo) throws DKException, Exception
  Overrides:
    updateObject in class dkAbstractResultSetCursor
public DKDDO newObject( ) throws DKException, Exception
  Overrides:
    newObject in class dkAbstractResultSetCursor
public void aadObject(DKDDO ddo) throws DKException, Exception
  Overrides:
    addObject in class dkAbstractResultSetCursor
public void open( ) throws DKException, Exception
  Overrides:
    open in class dkAbstractResultSetCursor
public void close( ) throws DKException, Exception
  Overrides:
    close in class dkAbstractResultSetCursor
public void destroy( ) throws DKException, Exception
  Overrides:
    destroy in class dkAbstracesultSetCursor
public void open(DKNVPair parms[ ]) throws DKException, Exception
  Overrides:
    open in class dkAbstractResultSetCursor
public String datastoreName( ) throws Exception
  Overrides:
    datastoreName in class dkAbstractResultSetCursor
public String datastoreType( ) throws Exception
  Overrides:
    datastoreType in class dkAbstractResultSetCursor
public DKHandle handle(int type) throws Exception
  Overrides:
    handle in class dkAbstractResultSetCursor
public DKHandle handle(String type) throws Exception
  Overrides:
    handle in class dkAbstractResultSetCursor

```
public int cardinality( ) throws Exception
    Overrides:
    cardinality in class dkAbstractResultSetCursor
public void done( )
public synchronized void addRSCursor(dkResultSetCursor rsCursor)
public synchronized dkResultSetCursor fetchNextRSCursor( ) throws DKException, Exception
```
15. Queries dkQuery is a base class for other query classes. An example class definition for dkQuery is set forth below.

```
dkQuery package com.ibm.mm.sdk.common.dkQuery
        public interface dkQuery
        extends dkQueryBase
    {
        public abstract short qlType()
    public abstract String queryString()
    public abstract dkDatastore datastore()
    public abstract dkDatastore getDatastore()
    public abstract void setDatastore(dkDatastore ds) throws DKException, Exception
    public abstract String getName()
    public abstract void setName(String name)
    }
```

The following methods are part of the dkQuery class:
```
public abstract short qlType( )
```
Gets the query type.
Returns:
    the query type
```
public abstract String queryString( )
```
Gets the query string.
Returns:
    the query string
```
public abstract dkDatastore datastore( )
```
Gets the reference to the owner datastore object. Note: datastore( ) is deprecated. Replace by getdatastore.
Returns:
    the dkDatastore object
See Also:
    getDatastore
```
public abstract dkdatastore getDatastore( )
```
Gets the reference to the owner datastore object.
Returns:
    the dkDatastore object
```
public abstract void setDatastore(dkDatastore ds) throws DKException, Exception
```
Sets the reference to the owner datastore object.
```
public abstract String getName( )
```
Gets query name.
Returns:
    name of this server
```
public abstract void setName(String name)
```
Sets query name.
Parameters:
    name—new name to be set to this server object The DKCQExpr class represents a compound or combined query expression. It may contain a DKQExpr query expressions tree, which may contain a combination of one parametric, one text, and one image query. An example class definition for DKCQExpr is set forth below.

```
DKCQExpr package com.ibm.mm.sdk.common.DKCQExpr
    public class DKCQExpr extends Object
        implements Serializable
    {
```

-continued

```
    public DKCQExpr()
    public DKCQExpr(DKQExpr queryExpr)
    public short getQLType()
    public void setQLType(short qlType)
    public String getDatastoreType()
    public void setDatastoreType(String dsType)
    public String getDatastoreName()
    public void setDatastoreName(String dsName)
    public String getSearchTemplateName()
    public void setSearchTemplateName(String stName)
    public String[] getMappingNames()
    public int[] getMappingTypes()
    public String[] getEntityNames()
    public boolean isTranslation()
    public DKQExpr getQueryExpr()
    public void setQueryExpr(DKQExpr queryExpr)
    }
```

The following methods are part of the DKCQExpr class:
```
public DKCQExpr( )
```
Default constructor without a parameter.
```
public DKCQExpr(DKQExpr queryExpr)
```
Constructor with one query expression.
```
public short getQLType( )
```
Gets the query language type, which could be a parametric, text, image query, combined query, etc.
Returns:
    the query language type
```
public void setQLType(short qlType)
```
Sets the query language type.
Parameters:
    qlType—the query language type
See Also:
    getQLtype
```
public String getDatastoreType( )
```
Gets the target datastore type for executing this query.
Returns:
    target datastore type

```
public void setDatastoreType(String dsType)
    Sets the target datastore type for executing this query.
    Parameters:
    dsName—target datastore type
public String getDatastoreName( )
    Gets the target datastore name for executing this query.
    Returns:
    target datastore name
public void setDatastoreName(String dsName)
    Sets the target datastore name for executing this query.
    Parameters:
    dsName—target datastore name
public String getSearchTemplateName( )
    Gets the search template name origin of this query expression. This data member is only applicable for query expressions originated from search templates.
    Returns:
    search template name
public void setSearchTemplateName(String stName)
    Sets the search template name origin of this query expression. This data member is only applicable for query expressions originated from search templates.
``` true if schema translation is required.

```
public DKQExpr getQueryExpr( )
```

Gets the query expression. It could be a tree of DKQExpr query expressions connected by logical operator AND or OR.

Returns:

a query expression tree

```
public void setQueryExpr(DKQExpr queryExpr)
```

Sets the query expression tree.

Parameters:

queryExpr—a query expression tree

See Also:

getQueryExpr

DKCombinedQueryDL is a class for a combined query (e.g., text and/or parametric and/or image) in a Digital Library/Visual Info datastore. An example class definition for DKCombinedQueryDL is set forth below.

DKCombinedQueryDL

```
package com.ibm.mm.sdk.common.DKCombinedQueryDL
public class DKCombinedQueryDL extends Object
        implements dkQueryBase, DKMessageId, DKConstant
{
public DKCombinedQueryDL()
public DKCombinedQueryDL(dkDatastore ds)
public DKCombinedQueryDL(DKCombinedQueryDL fromQuery)
public void prepare(DKNVPair params[]) throws DKException
public void execute(DKNVPair params[]) throws DKException
public int status()
public Object result()
public dkResultSetCursor resultSetCurson) throws DKException, Exception
public int numberOfResults()
public dkDatastore datastore()
}
```

Parameters:

stName—the search template name

```
public String[ ] getMappingNames( )
```

Gets the optional schema mapping names for executing this query. The default value is null, which means mapping is not required.

Returns:

an array of mapping names.

```
public int[ ] getMappingTypes( )
```

Gets the optional schema mapping types for executing this query. The default value is 0, which means mapping is not required. Valid types are:

DK_FED_MAPPED_ENTITY, DK_FED_MAPPED_TEXT_ENTITY, etc

Returns:

an array of mapping types.

```
public String[ ] getEntityNames( )
```

Gets the mapped entity names in this query expression.

Returns:

the array of mapped entity names.

```
public boolean isTranslation( )
```

Check if this query requires schema translation using schema mapping.

Returns:

The following methods are part of the DKCombinedQueryDL class:

```
public DKCombinedQueryDL( )
public DKCombinedQueryDL(dkDatastore ds)
public DKCombinedQueryDL(DKCombinedQueryDL from Query)
public void prepare(DKNVPair params[ ] throws DKException
public void execute(DKNVPair params[ ]) throws DKException
```

Execute takes as many PQs+SCOPE_DLs and TQs+SCOPE_TSs PQs run in parallel TQs run sequentially, one after the other using previous TQ results as scope for the current TQ The default operation is INTERSECTs the results.

```
public int status( )
public Object result( )
public dkResultSetCursor resultSetCursor( ) throws DKException, Exception
public int numberOfResults( )
```

Gets the number of query results

Returns:

number of query results

```
public dkDatastore datastore( )
```

DKTextQuery is used for a text query. An example class definition for DKTextQuery is set forth below.

DKTextQuery

```
package com.ibm.mm.sdk.common.DKTextQuery
public class DKTextQuery
    extends Object
    implements dkQuery, DKConstant, DKMessageId, Serializable
{
public DKTextQuery(dkDatastore creator,
        String queryString)
public DKTextQuery(dkDatastore creator,
        DKCQExpr queryExpr)
public DKTextQuery(DKTextQuery fromQuery)
public void prepare(DKNVPair params[]) throws DKException, Exception
public void execute(DKNVPair params[]) throws DKException, Exception
public int status()
public Object result() throws DKException, Exception
public dkResultSetCursor resultSetcursor() throws DKException, Exception
public short qlType()
public String queryString()
public dkDatastore datastore()
public dkDatastore getDatastore()
public void setDatastore(dkDatastore ds) throws DKException, Exception
public String getName()
public void setName(String name)
public int numberOfResults()
}
```

The following methods are part of the DKTextQuery class:

public DKTextQuery(dkDatastore creator,
  String querystring)
  Constructs a text query
  Parameters:
  creator—datastore
  queryString—a query string
public DKTextQuery(dkDatastore creator,
  DKCQExpr queryExpr)
  Constructs a text query
  Parameters:
  creator—datastore
  queryExpr—a query expression
public DKTextQuery(DKTextQuery from Query)
  Constructs a text query from a text query object
  Parameters:
  fromQuery—text query
public void prepare(DKNVPair params[ ]) throws DKException, Exception
  Prepares the query.
  Parameters:
  params—additional prepare query option in name/value pair
public void execute(DKNVPair params[ ]) throws DKException, Exception
  Executes the query.
  Parameters:
  params—additional query option in name/value pair
public int status( )
  Gets query status.
  Returns:
  query status
public Object result( ) throws DKException, Exception
  Gets query result.
  Returns:
  query result in a DKResults object public dkResultSetCursor resultSetCursor( ) throws DKException, Exception
  Gets query result.
  Returns:
  query result in a dkResultSetCursor object
public short qlType( )
  Gets query type.
  Returns:
  query type
public String queryString( )
  Gets query string
  Returns:
  query string
public dkDatastore datastore( )
  Gets the reference to the owner datastore object. Note: datastore( ) is deprecated. Replace by getdatastore.
  Returns:
  the dkDatastore object
  See Also:
  getDatastore
public dkDatastore getDatastore( )
  Gets the reference to the owner datastore object
  Returns:
  the dkDatastore object
public void setDatastore(dkDatastore ds) throws DKException, Exception
  Sets the reference to the owner datastore object
  Parameters:
  ds—a Datastore
public String getName( )
  Gets query name
  Returns:
  name of this query
public void setName(String name)
  Sets query name
  Parameters:
  name—new name to be set to this query object public int numberOfResults( )

Gets the number of query results

Returns:

number of query results

DKParametricQuery is used for a parametric query. An example class definition for DKParametricQuery is set forth below.

---

DKParametricQuery

```
package com.ibm.mm.sdk.common.DKParametricQuery
public class DKParametricQuery
    extends Object
    implements dkQuery, DKConstant, DKMessageId, Serializable
{
public DKParametricQuery(dkDatastore creator,
        String queryString)
public DKParametricQuery(dkDatastore creator,
        DKCQExpr queryExpr)
public DKParametricQuery(DKParametricQuery fromQuery)
public void prepare(DKNVPair params[]) throws DKException,
Exception
public void execute(DKNVPair params[]) throws DKException,
Exception
public int status()
public Object result() throws DKException, Exception
public dkResultSetCursor resultSetCursor() throws DKException,
Exception
public short qlType()
public String queryString()
public dkDatastore datastore()
public dkDatastore getDatastore()
public void setDatastore(dkDatastore ds) throws DKException,
Exception
public String getName()
public void setName(String name)
public int numberOfResults()
}
```

---

The following methods are part of the DKParametricQuery class:

public DKParametricQuery(dkDatastore creator,

String queryString)

Constructs a parametric query

Parameters:

creator—datastore queryString—a query string public DKParametricQuery(dkDatastore creator, DKCQExpr queryExpr)

Constructs a parametric query

Parameters:

creator—datastore queryExpr—a query expression public DKParametricQuery(DKParametricQuery fromQuery)

Constructs a parametric query from a parametric query object

Parameters:

fromQuery—parametric query public void prepare(DKNVPair params[ ]) throws DKException, Exception Prepares the query.

Parameters:

params—additional prepare query option in name/value pair public void execute(DKNVPair params[ ]) throws DKException, Exception Executes the query.

Parameters:

params—additional query option in name/value pair public int status( )

Gets query status.

Returns:

query status public Object result( ) throws DKException, Exception

Gets query result.

Returns:

query result in a DKResults object public dkResultSetCursor resultSetCursor( ) throws DKException, Exception Gets query result.

Returns:

query result in a dkResultSetCursor object public short qlType( )

Gets query type.

Returns:

query type public String queryString( )

Gets query string

Returns:

query string public dkDatastore datastore( )

Gets the reference to the owner datastore object. Note: datastore( ) is deprecated. Replace by getdatastore.

Returns:

the dkDatastore object

See Also:

getDatastore public dkDatastore getDatastore( )

Gets the reference to the owner datastore object

Returns:

the dkDatastore object public void setDatastore(dkDatastore ds) throws DKException, Exception Sets the reference to the owner datastore object Parameters:

ds—a Datastore public String getName( )

Gets query name

Returns:

name of this query public void setName(String name)

Sets query name

Parameters:

name—new name to be set to this query object public int numberOfResults( )

Gets the number of query results

Returns:

number of query results

DKImageQuery is used for an image query. An example class definition for DKImageQuery is set forth below.

DKImageQuery

```
package com.ibm.mm.sdk.common.DKImageQuery
public class DKImageQuery
    extends Object
    implements dkQuery, DKConstant, DKMessageId, Serializable
{
public DKImageQuery(dkDatastore creator,
        String queryString)
public DKImageQuery(dkDatastore creator,
        DKCQEXpr queryExpr)
public DKImageQuery(DKImageQuery fromQuery)
public void prepare(DKNVPair params[]) throws DKException,
    Exception
public void execute(DKNVPair params[]) throws DKException,
    Exception
public int status()
public Object result() throws DKException, Exception
public dkResultSetCursor resultSetCursor() throws DKException,
    Exception
public short qlType()
public String queryString()
public dkDatastore datastore()
public dkDatastore getDatastore()
public void setDatastore(dkDatastore ds) throws DKException,
    Exception
public String getName()
public void setName(String name)
public int numberOfResults()
}
```

The following methods are part of the DKImageQuery class:
public DKImageQuery(dkDatastore creator,
 String queryString)
 Constructs a image query
 Parameters:
 creator—datastore
 queryString—a query string
public DKImageQuery(dkDatastore creator,
 DKCQExpr queryExpr)
 Constructs a image query
 Parameters:
 creator—datastore
 queryExpr—a query expression
public DKImageQuery(DKImageQuery fromQuery)
 Constructs a image query from a image query object
 Parameters:
 fromQuery—image query
public void prepare(DKNVPair params[ ]) throws DKException, Exception
 Prepares the query.
 Parameters:
 params—additional prepare query option in name/value pair
public void execute(DKNVPair params[ ]) throws DKException, Exception
 Executes the query.
 Parameters:
 params—additional query option in name/value pair
public int status( )
 Gets query status.
 Returns:
 query status
public Object result( ) throws DKException, Exception
 Gets query result.
 Returns:
 query result in a DKResults object
public dkResultSetCursor resultSetCursor( ) throws DKException, Exception
 Gets query result.
 Returns:
 query result in a dkResultSetCursor object
public short qlType( )
 Gets query type.
 Returns:
 query type
public String queryString( )
 Gets query string
 Returns:
 query string
public dkDatastore datastore( )
 Gets the reference to the owner datastore object. Note: datastore( ) is deprecated. Replace by getdatastore.
 Returns:
 the dkDatastore object
 See Also:
 getDatastore
public dkDatastore getDatastore( )
 Gets the reference to the owner datastore object
 Returns:
 the dkdatastore object
public void setDatastore(dkDatastore ds) throws DKException, Exception
 Sets the reference to the owner datastore object
public String getName( )
 Gets query name
 Returns:
 name of this query
public void setName(String name)
 Sets query name
 Parameters:
 name—new name to be set to this query object
public int numberOfResults( )
 Gets the number of query results
 Returns:
 number of query results
 DKSQLQuery is used for a SQL query. An example class definition for DKSQLQuery is set forth below.

DKSQLQuery

```
package com.ibm.mm.sdk.common.DKSQLQuery
public class DKSQLQuery
    extends Object
    implements dkQuery, DKConstant, DKMessageId, Serializable
{
public DKSQLQuery(dkDatastore creator,
        String queryString)
public DKSQLQuery(dkDatastore creator,
        DKCQExpr queryExpr)
public DKSQLQuery(DKSQLQuery fromQuery)
public void prepare(DKNVPair params[]) throws DKException,
    Exception
public void execute(DKNVPair params[]) throws DKException,
    Exception
public int status()
public Object result() throws DKException, Exception
```

```
public dkResultSetCursor resultSetCursor() throws DKException,
    Exception
public short qlType()
public String queryString()
public dkDatastore datastore()
public dkDatastore getDatastore()
public void setDatastore(dkDatastore ds) throws DKException,
    Exception
public String getName()
public void setName(String name)
public int numberOfResults()
}
```

The following methods are part of the DKSQLQuery class:

public DKSQLQuery(dkDatastore creator,
    String queryString)
  Constructs a sql query
  Parameters:
  creator—datastore
  queryString—a query string
public DKSQLQuery(dkDatastore creator,
    DKCQExpr queryExpr)
  Constructs a sql query
  Parameters:
  creator—datastore
  queryExpr—a query expression
public DKSQLQuery(DKSQLQuery fromQuery)
  Constructs a sql query from a sql query object
  Parameters:
  fromQuery—sql query
public void prepare(DKNVPair params[ ]) throws
    DKException, Exception
  Prepares the query.
  Parameters:
  params—additional prepare query option in name/value pair
public void execute(DKNVPair params[ ]) throws
    DKException, Exception
  Executes the query.
  Parameters:
  params—additional query option in name/value pair
public int status( )
  Gets query status.
  Returns:
  query status
public Object result( ) throws DKException, Exception
  Gets query result.
  Returns:
  query result in a DKResults object
public dkResultSetCursor resultSetCursor( ) throws
    DKException, Exception
  Gets query result.
  Returns:
  query result in a dkResultSetCursor object
public short qlType( )
  Gets query type.
  Returns:
  query type
public String queryString( )
  Gets query string
  Returns:
  query string
public dkDatastore datastore( )
  Gets the reference to the owner datastore object. Note: datastore( ) is deprecated. Replace by getdatastore.
  Returns:
  the dkDatastore object
  See Also:
  getDatastore
public dkDatastore getDatastore( )
  Gets the reference to the owner datastore object
  Returns:
  the dkDatastore object
public void setDatastore(dkDatastore ds) throws DKException, Exception
  Sets the reference to the owner datastore object
public String getName( )
  Gets query name
  Returns:
  name of this query
public void setName(String name)
  Sets query name
  Parameters:
  name—new name to be set to this query object
public int numberOfResults( )
  Gets the number of query results
  Returns:
  number of query results 16. Query Expressions A query expression is used to specify a simple query. It is an alternate form of a query string. It may have one or more sub-query expressions (DKQSubExpr). Each sub-query expression has a query term (DKQTerm), an option list, and a parameter list. The query term specifies the query conditions The option list specifies options relevant to the query. An example of an option in DL could be the maximum result limit of this query. The parameter list specifies parameters to be used by or bound to the query. The query language type indicates if it is parametric, text or image query. User can combine two query expressions with logical operator AND to form a query expression tree. Logical operator OR is not supported yet. A DKQExpr can represents either a query expression or expression tree. An expression tree has positive opcode( ), and non-null left( ) and right( ) subtree. A DKQExpr is singular if opcode( ) is negative, and left( ) and right( ) are null. Currently, the expression tree can only contains a maximum of one parametric, one text, and one image query.

An example class definition for DKQExpr is set forth below.

DKQExpr

```
package com.ibm.mm.sdk.common.DKQExpr
public class DKQExpr
    extends Object
    implements Serializable
{
public DKQExpr()
public DKQExpr(DKQExpr lhs,
    short logOpCode,
```

```
        DKQExpr rhs)
public short getQLType()
public void setQLType(short qlType)
public String getDatastoreType()
public void setDatastoreType(String dsType)
public String getDatastoreName()
public void setDatastoreName(String dsName)
public boolean isTranslation()
public String[] getMappingNames()
public int[] getMappingTypes()
public String getAssociatedMapping()
public void setAssociatedMapping(String associatedMapping)
public String[] getEntityNames()
public int subQueryCount()
public int addSubQuery(DKQSubExpr subQE)
public int removeSubQuery(DKQSubExpr subQE)
public void removeSubQuery(int position)
public DKQSubExpr getSubQuery(int position)
public int optionCount()
public DKNVPair[] getOptionList()
public void setOptionList(DKNVPair optionList[])
public DKNVPair getOption(int position)
public DKNVPair getOption(String name)
public void setOption(int position,
        DKNVPair optionPair)
public int setOption(String name,
        Object value)
public void removeOption(int position)
public int removeOption(String name)
public int parameterCount()
public DKNVPair[] getParameterList()
public void setParameterList(DKNVPair parameterList[])
public DKNVPair getParameter(int position)
public DKNVPair getParameter(String name)
public void setParameter(int position,
        DKNVPair parmPair)
public int setParameter(String name,
        Object value)
public void removeParameter(int position)
public int removeParameter(String name)
public short opCode()
public DKQEXpr left()
public DKQEXpr right()
public boolean isLeaf()
public DKQExpr and(DKQExpr rhs)
public DKQExpr or(DKQExpr rhs)
}
```

The following methods are part of the DKQExpr class:
public DKQExpr( )

Default constructor without a parameter.
public DKQExpr(DKQExpr lhs,
    short logOpCode,
    DKQExpr rhs)

Creates a query expression tree by applying a logical operator to a pair of query expressions.
Parameters:
lhs—left query
logOpCode—logical operator code
rhs—right query
public short getQLType( )

Gets the query language type, which could be a parametric, text image query, etc.
Returns:
the query language type
public void setQLType(short qlType)

Sets the query language type, which could be a parametric, text, image query, etc.
Parameters:
qlType—the query language type
public String getDatastoreType( )

Gets the target datastore type for executing this query.
Returns:
target datastore type
public void setDatastore Type(String dsType)

Sets the target datastore type for executing this query.
Parameters:
dsName—target datastore type
public String getDatastoreName( )

Gets the target datastore name for executing this query.
Returns:
target datastore name
public void setDatastoreName(String dsName)

Sets the target datastore name for executing this query.
Parameters:
dsName—target datastore name
public boolean isTranslation( )

Check if this query requires a translation using schema mapping.
Returns:
true if schema translation is required.
public String[ ] getMappingNames( )

Gets the optional schema mapping names for executing this query. The default value is null, which means mapping is not required.
Returns:
the array of mapping names.
public int[ ] getMappingTypes( )

Gets the optional schema mapping types for executing this query. The default value is 0, which means mapping is not required. Valid types are: DK_FED_MAPPED_ENTITY, DK_FED_MAPPED_TEX_ENTITY, etc
Returns:
the array of mapping types.
public String getAssociatedMapping( )

Gets the associated mapping for this query expression. Only applicable for text query.
Returns:
the associated mapping
public void setAssociatedMapping(String associatedMapping)

Sets the associated mapping for this query expression Only applicable for text query.
Parameters:
the—associated mapping
public String[ ] getEntityNames( )

Gets the mapped entity names in this query expression.
Returns:
the array of mapped entity names.
public int subQueryCount( )

Gets the number of sub-queries in this expression.
Returns:
the number of sub-queries.
public int addSubQuery(DKQSubExpr subQE)

Adds a sub-query to this expression.
Returns:
number of sub-queries in this expression.
public int removeSubQuery(DKQSubExpr subQE)

Removes a given sub-query form this expression.

Returns:

the position of removed sub-query.

public void removeSubQuery(int position)

Removes a sub-query at the given position form this expression.

public DKQSubExpr getSubQuery(int position)

Gets the sub-query at the given position.

Returns:

the sub-query object public int optioncount( )

Gets the number of defined options.

Returns:

integer number of options public DKNVPair[ ] getOptionList( )

Gets the option list.

Returns:

an NVPair array of options.

public void setOptionList(DKNVPair optionList[ ])

Sets the option list.

Parameters:

an—NVPair array of options.

public DKNVPair getOption(int position)

Gets an option at the given position.

Throws: IndexOutOfBoundsException if position is invalid.

public DKNVPair getOption(String name)

Gets an option with a given name.

Returns:

the option with the given name; or null if it is not found.

public void setOption(int position,

DKNVPair optionPair)

Sets the option at the given position.

Parameters:

optionPair—the new option

Throws: IndexOutOfBoundsException if position is invalid.

public int setOption(String name,

Object value)

Sets the option with the given name. The option will be added, if it does not exist yet.

Returns:

the position of the option public void removeOption(int position)

Removes the option at the given position.

Parameters:

the—position.

Throws: IndexOutOfBoundsException if position is invalid.

public int removeOption(String name)

Removes the option with the given name.

Parameters:

name—the option name.

Returns:

the position; −1 if not found.

Throws: IndexOutOfBoundsException if position is invalid.

public int parameterCount( )

Gets the number of defined parameters.

Returns:

integer number of parameters public DKNYPair[ ] getParameterList( )

Gets the parameter list.

Returns:

an NVPair array of parameters.

public void setParameterList(DKNVPair parameterList[ ])

Sets the parameter list.

Parameters:

an—NVPair array of parameters.

public DKNVPair getParameter(int position)

Gets a parameter at a given position.

Throws: IndexOutOfBoundsException if position is invalid.

public DKNVPair getParameter(String name)

Gets a parameter with a given name.

Returns:

the option with the given name; or null if it is not found.

public void setParameter(int position,

DKNVPair parmPair)

Sets the parameter at the given position.

Parameters:

parmPair—the new parameter

Throws: IndexOutOfBoundsException if position is invalid.

public int setParameter(String name,

Object value)

Sets a parameter with a given name. The parameter will be added, if it does not exist yet.

Returns:

the position of the parameter public void removeParameter(int position)

Removes the parameter at the given position.

Parameters:

the—position.

Throws: IndexOutOfBoundsException if position is invalid.

public int removeParameter(String name)

Removes the parameter with the given name.

Parameters:

name—the parameter name.

Returns:

the position; −1 if not found.

Throws: IndexOutOfBoundsException if position is invalid.

public short opCode( )

Gets the operator code in tHis expression tree.

Returns:

the operator code public DKQExpr left( )

Gets the query in left hand side.

Returns:

left query public DKQExpr right( )

Gets the query in right hand side.

Returns:

right query public boolean isLeaf( )

Check if this expression is a leaf.

Returns:

true if this is a leaf.

public DKQExpr and(DKQExpr rhs)

Applies logical AND operator between this query expression and another one.

Parameters:

rhs—the query to be AND-ed at the right hand side

Returns:

a new resulting query public DKQExpr or(DKQExpr rhs)

Applies logical OR operator between this query and another one.

Parameters:

rhs—the query to be OR-ed at the right hand side

Returns:

a new resulting query

A sub-query DKQSubExpr expression consists of entity-names, a display-list, a query term, an option list, and an optional parameter list. A query expression DKQExpr may contains one or more sub-expressions, each sub-expression essentially defines a sub-query. When the query is executed, each sub-query will be executed and the results will be OR-ed together to form a result for the whole query. Digital Library datastore supports sub-queries as described above, but not all datastores support sub-queries. In such a case, there will bw only one sub-query.

An example class definition for DKQSubExpr is set forth below.

```
DKQSubExpr package com.ibm.mm.sdk.common.DKQSubExpr
    public class DKQSubExpr
        extends Object
        implements Serializable
    {
    public DKQSubExpr()
    public String getEntityName()
    public void setEntityName(String name)
    public String[] getEntityNames()
    public void setEntityNames(String names[])
    public String getMappingName()
    public void setMappingName(String mappingName)
    public int getMappingType()
    public void setMappingType(int mappingType)
    public boolean isTranslation()
    public void setTranslation(boolean translation)
    public String[] getDisplayList()
    public void setDisplayList(String names[])
    public DKQTerm getQueryTerm()
    public void setQueryTerm(DKQTerm qTerm)
    public int optionCount()
    public DKNVPair[] getOptionList()
    public void setOptionList(DKNVPair optionList[])
    public DKNVPair getOption(int position)
    public DKNVPair getOption(String name)
    public void setOption(int position,
            DKNVPair optionPair)
    public int setOption(String name,
            Object value)
    public void removeOption(int position)
    public int removeOption(String name)
    public int parameterCount()
    public DKNVPair[] getParameterList()
    public void setParameterList(DKNVPair parameterList[])
    public DKNVPair getParameter(int position)
    public DKNVPair getParameter(String name)
    public void setParameter(int position,
            DKNVPair parmPair)
    public int setParameter(String name,
```

-continued

```
            Object value)
    public void removeParameter(int position)
    public int removeParameter(String name)
    }
```

The following methods are part of the DKQSubExpr class:

public DKQSubExpr( )

Default constructor without a parameter.

public String getEntityName( )

Gets the entity-name specified in this query. Assumes that there is only one entity involved.

Returns:

the entity name, or null if the entity-name is not initialized.

public void setEntityName(String name)

Sets the entity-name in this query. Assumes that there is only one entity involved in this query.

Parameters:

the—entity name.

public String[ ] getEntityNames( )

Gets the entity-names in this query; there are more than one entity-names. For example, a text query may have more than one entity or search-indices specified.

Returns:

a string array of entity names, or null if the entity-name is not initialized.

public void setEntityNames(String names[ ])

Sets the entity-names in this query; there are more than one entity-names.

Parameters:

values—a string array of entity names.

public String getMappingName( )

Gets the optional schema mapping name for executing this query. The default value is null, which means mapping is not required.

Returns:

the mapping name.

public void setMappingName(String mappingName)

Sets the optional schema mapping name for executing this query.

Parameters:

mappingName—the mapping name public int getMappingType( )

Gets the optional schema mapping type for executing this query. The default value is 0, which means mapping is not required. Valid values are: DK_FED_MAPPED_ENTITY, DK_FED_MAPPED_TEX_ENTITY, etc Returns:

the mapping type.

public void setMappingType(int mappingType)

Sets the optional schema mapping type for executing this query.

Parameters:

mappingName—the mapping name

See Also:

getMappingtype public boolean isTranslation( )

Check if this query requires schema translation using schema mapping.

Returns:

true if schema translation is required.

public void setTranslation(boolean translation)

Sets the requirement for schema translation for this query. Schema mapping name must by provided via setMappingName( ) method.

Parameters:

translation—true or false.

See Also:

isTranslation, setMappingname public String[ ] getDisplayList( )

Gets the display-list in this query. The display-list is a list of search attribute-names to be displayed in the results of this query. If it is not specified, all attributes will be selected.

Returns:

a string array of attribute-names, or null if display-list is not initialized.

public void setDisplayList(String names[ ])

Sets the display-list in this query.

Parameters:

names—a string array of attribute-names.

See Also:

getDisplaylist public DKQTerm getQueryTerm( )

Gets the query term or condition part of this query.

Returns:

a DKQTerm object public void setQueryTerm(DKQTerm qTerm)

Sets the query term or condition part in this query.

Parameters:

a—DKQTerm object public int optionCount( )

Gets the number of defined options.

Returns:

integer number of options public DKNYPair[ ] getOptionList( )

public void setOptionList(DKNVPair optionList[ ])

public DKNVPair getOption(int position)

Gets an option at the given position.

Throws: IndexOutOfBoundsException if position is invalid.

public DKNVPair getOption(String name)

Gets an option with a given name.

Returns:

the option with the given name; or null if it is not found.

public void setOption(int position,

DKNVPair optionPair)

Sets the option at the given position.

Parameters:

optionPair—the new option

Throws: IndexOutOfBoundsException if position is invalid.

public int setOption(String name,

Object value)

Sets the option with the given name. The option will be added, if it does not exist yet.

Returns:

the position of the option public void removeOption(int position)

Removes the option at the given position.

Parameters:

the—position.

Throws: IndexOutOfBoundsException if position is invalid.

public int removeOption(String name)

Removes the option with the given name.

Parameters:

name—the option name.

Returns:

the position; −1 if not found.

Throws: IndexOutOfBoundsException if position is invalid.

public int parameterCount( )

Gets the number of defined parameters.

Returns:

integer number of parameters public DKNVPair[ ] getParameterList( )

public void setParameterList(DKNVPair parameterList[ ])

public DKNVPair getParameter(int position)

Gets a parameter at a given position.

Throws: IndexOutOffBoundsException if position is invalid.

public DKNVPair getParameter(String name)

Gets a parameter with a given name.

Returns:

the option with the given name; or null if it is not found.

public void setParameter(int position,

DKNVPair parmPair)

Sets the parameter at the given position.

Parameters:

parmPair—the new parameter

Throws: IndexOutOfBoundsException if position is invalid.

public int setParameter(String name,

Object value)

Sets a parameter with a given name. The parameter will be added, if it does not exist yet.

Returns:

the position of the parameter public void removeParameter(int position)

Removes the parameter at the given position.

Parameters:

the—position.

Throws: IndexOutOfBoundsException if position is invalid.

public int removeParameter(String name)

Removes the parameter with the given name.

Parameters:

name—the parameter name.

Returns:

the position; −1 if not found.

Throws: IndexOutOfBoundsException if position is invalid.

Query terms are used to represent a predicate logic expression in a query. A basic query term can be as simple as a text string (as part of a text query) or a pair of attribute name and value separated by a comparison operator: =, >, >=, <, <=, <>, BETWEEN, LIKE, IN. Query terms can be combined together with logical operators : AND, OR, NOT. This class does not support operators: NOTIN, NOTLIKE, NOTBETWEEN, however, user can create an equivalent expression using NOT logical operator.

An example class definition for DKQTerm is set forth below.

```
DKQTerm package com.ibm.mm.sdk.common.DKQTerm
    public class DKQTerm
        extends Object
        implements Serializable, Cloneable
    {
    public DKQTerm()
    public DKQTerm(String stringTerm)
    public DKQTerm(String stringTerm,
            DKNVPair options[])
    public DKQTerm(String attrName,
            short cmpOpCode,
            String attrValue)
    public DKQTerm(String attrName,
            short cmpOpCode,
            String attrValues[])
    public DKQTerm(DKQTerm leftTerm,
            short logOpCode,
            DKQTerm rightTerm)
    public short getOpCode()
    public void setOpCode(short opCode)
    public DKQTerm getLeft()
    public void setLeft(DKQTerm left)
    public DKQTerm getRight()
    public void setRight(DKQTerm right)
    public DKQTerm and(DKQTerm rhs)
    public DKQTerm or(DKQTerm rhs)
    public DKQTerm not()
    public boolean isNotTerm()
    public boolean isLeaf()
    public String getStringTerm()
    public void setStringTerm(String stringTerm)
    public String getName()
    public void setName(String attrName)
    public String getValue()
    public void setValue(String value)
    public String[] getValues()
    public void setValues(String values[])
    public boolean hasMultiValues()
    public DKNVPair[] getOptions()
    public void setOptions(DKNVpair options[])
    public String toString()
    public Object clone()
    }
```

The following methods are part of the DKQTerm class:
public DKQTerm( )
  Default constructor.
public DKQTerm(String stringTerm)
  Creates a query term based on the string input.
  Parameters:
  stringTerm—a text query string term.
public DKQTerm(String stringTerm,
  DKNVPair options[ ])
  Parameters:
  stringTerm—a text query string term.
  options—options applicable to this term, for example in the test
  string the options could be CCSID, wildcard char, etc.
public DKQTerm(String attrName,
  short cmpOpCode,
  String attrValue)
  Creates a term specifying a query condition to be met.
  Parameters:
  attrName—attribute name in this conditional expression
  cmpOpCode—comparison operator code, that is, >, <,=, etc.
  attrValue—attribute value
public DKQTerm(String attrName,
  short cmpOpCode,
  String attrValues[ ])
  Creates a term specifying a query condition to be met. It takes an array of values as input for handling operators requiring more than one value, like BETWEEN, IN, etc.
  Parameters:
  attrName—attribute name in this conditional expression
  cmpOpCode—comparison operator code which takes more than one values.
  attrValues—attribute value array
public DKQTerm(DKQTerm leftTerm,
  short logOpCode,
  DKQTerm rightTerm)
  Creates a term specifying a query condition to be met. It takes two terms, left and right term with a logical operator. Old terms will be absorbed by the new term.
  Parameters:
  leftTerm—left term
  logOpCode—logical operator code
  rightTerm—right term
public short getOpCode( )
  Gets the operator code in this term.
  Returns:
  the operator code in this term
public void setOpCode(short opCode)
  Sets the operator code in this term. The caller is responsible to make sure that the operator is appropriate for this term.
  Parameters:
  opCode—the operator code for this term
public DKQTerm getLeft( )
  Gets the left hand side part of this term.
  Returns:
  left term.
public void setLeft(DKQTerm left)
  Sets the left hand side part of this term. The caller is responsible to make sure that the lhs term is appropriate for this term.
  Parameters:
  left—the left term.
public DKQTerm getRight( )
  Gets the right hand side part of this term.
  Returns:
  right term.
public void setRight(DKQTerm right)
  Sets the right hand side part of this term. The caller is responsible to make sure that the rhs term is appropriate for this term.
  Returns:
  right term.
public DKQTerm and(DKQTerm rhs)
  Applies logical AND operator between this term and another given term.

Parameters:

rhs—the term to be AND-ed at the right hand side

Returns:

a new resulting term public DKQTerm or(DKQTerm rhs)

Applies logical OR operator between this term and another given term.

Parameters:

rhs—the term to be OR-ed at the right hand side

Returns:

a new resulting term public DKQTerm not( )

Apply logical NOT operator to this term, that is, negate this term. This term will be the rhs of the resulting term.

Returns:

a new resulting term public boolean isNotTerm( )

Check if this term is negated.

Returns:

true if this term is negated.

public boolean isLeaf( )

Check if this term is a leaf.

Returns:

true if this term is a leaf.

public String getStringTerm( )

Gets the string part of this term.

Returns:

the string part public void setStringTerm(String stringTerm)

Sets the string part of this term.

Parameters:

stringTerm—the string part public String getName( )

Example, 'Anonymous',\"John Smith \",\"Mary's Lamb\".

Returns:

the value part of this term; or null if the value is not initialized.

public void setValue(String value)

Sets the value part of this term. Assumes that the new value is one value.

Parameters:

the—new value of this term

See Also:

getvalue public String[ ] getValues( )

Gets the value part of this term; there are more than one values.

Returns:

a string array of values; or null if the attribute value is not initialized.

public void setValues(String values[ ])

Sets the value part of this term; there are more than one values.

Parameters:

values—a string array of values.

public boolean hasMultiValues( )

Check if this term has multi-values.

Returns:

true if term has multi values public DKNVPair[ ] getOptions( )

Gets options defined in this term. Options only applicable to text query term.

Returns:

an array of DKNVPair object each indicating option name and value.

public void setOptions(DKNVPair options[ ])

Sets options for this term.

Parameters:

options—an array of DKNVPair object each indicating option name and value.

See Also:

getOptions public String toString( )

Re-constructs the string form of this query expression with the correct levels of required parentheses. String attribute values are assumed to have the correct pair of quotes, for example, 'Anonymous', \"John Smith\", \"Mary's Lamb\".

Returns:

the string form of this query expression

Overrides:

toString in class object public Object clone( )

Overrides:

clone in class object

17. Iterators dkIterator is the base interface for iterators. It is used to iterate over collection members. dkIterator is sub-classed to provide suitable implementation for each collection type. An example class definition for dkIterator is set forth below.

--- dkIterator

```
package com.ibm.mm.sdk.common.dkIterator
public interface dkIterator
{
public abstract Object next() throws DKUsageError
public abstract void reset()
public abstract boolean more()
}
```

---

The following methods are part of the dkIterator class:

public abstract Object next( ) throws DKUsageError

Gets the current element in the collection and advances the iterator to the next element Returns:

current element.

public abstract void reset( )

Resets the iterator to the beginning of the collection.

public abstract boolean more( )

Returns true if there are more elements in the collection.

Returns:

true or false.

A sequential iterator is bi-directional; it can go forward and backward over members of a collection that supports it. An example class definition for DKSequentialIterator is set forth below.

```
DKSequentialIterator package com.ibm.mm.sdk.common.DKSequentialIterator
    public interface DKSequentialIterator
        extends dkIterator
    {
    public abstract Object previous() throws DKUsageError
    public abstract boolean setToFirst()
    public abstract boolean setToLast()
    public abstract boolean setToNext()
    public abstract boolean setToPrevious()
    public abstract Object at() throws DKUsageError
    }
```

The following methods are part of the DKSequentialIterator class:
public abstract Object previous( ) throws DKUsageError
    Gets the current element in the collection and repositions the iterator to the previous element.
    Returns:
    current element.
public abstract boolean setToFirst( )
    Sets to the first element in the collection.
    Returns:
    true if position is valid.
public abstract boolean setToLast( )
    Sets to the last element in the collection.
    Returns:
    true if position is valid.
public abstract boolean setToNext( )
    Sets to the next element in the collection.
    Returns:
    true if position is valid.
public abstract boolean setToPrevious( )
    Sets to the previous element in the collection.
    Returns:
    true if position is valid.
public abstract Object at( ) throws DKUsageError
    Gets the current element in the collection.
    Returns:
    current element.

18. Schema Mapping

A schema mapping represents a mapping between the schema in a datastore with the structure of the data-object that the user wants to process in memory. Schema mapping has been generally described in U.S. patent application Ser. Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving mapping of entities and attributes, a federated datastore 100 must also have access to the following information:

User-id and password mapping. To support single sign-on features, each user-id in the federated datastore 100 needs to be mapped to its corresponding user-ids in the native datastores.

Datastore registration. Each native datastore needs to be registered so it can be located and logged-on to by the federated datastore 100 processes on behalf of its users. dkSchemaMapping is the an interface to define an associative mapping between a mapped or federated entity and a map-to or native entity in back-end datastores. An example class definition for dkSchemaMapping is set forth below.

```
dkSchemaMapping package com.ibm.mm.sdk.common.dkSchemaMapping
    public interface dkSchemaMapping
    {
    public abstract String getName()
    public abstract void setName(String name)
    public abstract String getServerName()
    public abstract void setServerName(String serverName)
    public abstract String getServerType()
    public abstract void setServerType(String serverType)
    public abstract String getEntityName()
    public abstract void setEntityName(String nativeEntityName)
    public abstract String getMappedEntityName()
    public abstract void setMappedEntityName(String
    mappedEntityName)
    public abstract short getMappedEntityType()
    public abstract void setMappedEntityType(short mappedEntityType)
    public abstract String getAssocMappedEntityName()
    public abstract void setAssocMappedEntityName(String
    assocMappedEntityName)
    public abstract String getAssocEntityName()
    public abstract void setAssocEntityName(String
    assocNativeEntityName)
    public abstract String getAssocServerName()
    public abstract void setAssocServerName(String assocServerName)
    public abstract dkAttrMapping getAttrMapping(String
    attrMappingName) throws DKException
    public abstract dkCollection listAttrMappings() throws DKException
    public abstract String[] listAttrMappingNames() throws
    DKException
    public abstract void retrieve() throws DKException
    public abstract dkAttrMapping getAttrMappingByMappedName
    (String mappedAttrName)
        throws DKException
    public abstract dkAttrMapping getAttrMappingByMapToName(String
    mapToAttrName)
        throws DKException
    }
```

The following methods are part of the dkSchemaMapping class:
public abstract String getName( )
    Gets the name of this SchemaMapping object
    Returns:
    name of this object
public abstract void setName(String name)
    Sets the name of this SchemaMapping object
    Parameters:
    extName—name of this SchemaMapping object
public abstract String getServerName( )
    Gets the name of the server where native attributes are defined.
    Returns:
    server name
public abstract void setServerName(String serverName)
    Sets the name of the server where native attributes are defined.

Parameters:

serverName—back-end server name public abstract String getServerType( )

Gets the type of the server where native attributes are defined. It could be one of DK_DL_DSTYPE, DK_OD_DSTYPE, etc Returns:

server type public abstract void setServerType(String serverType)

Sets the type of the server where native attributes are defined.

Parameters:

serverType—server type public abstract String getEntityName( )

Gets the name of the native entity.

Returns:

native entity name, for example this could be the index class name if the server type is DL/VI, or it could be the application group name if the server type if OnDemand.

public abstract void setEntityName(String nativeEntityName)

Sets thename of the native entity.

Parameters:

nativeEntityName—name of the native entity (index class name for example)

public abstract String getMappedEntityName( )

Gets the name of the mapped or federated entity.

Returns:

federated entity name public abstract void setMappedEntityName(String mappedEntityName)

Sets the name of the mapped or federated entity.

Parameters:

mappedEntityName—federated entity name public abstract short getMappedEntityType( )

Gets the name of the mapped or federated entity type.

Returns:

federated entity type public abstract void setMappedEntityType(short mappedEntityType)

Sets the name of the mapped or federated entity type.

Parameters:

mappedEntityName—federated entity type public abstract String getAssocMappedEntityName( )

Gets the name of the associated mapped or federated entity.

Returns:

associated federated entity name public abstract void setAssocMappedEntityName(String assocMappedEntityName)

Sets the name of the associated mapped or federated entity.

Parameters:

mappedEntityName—associated federated entity name public abstract String getAssocEntityName( )

Gets the name of the associated native entity.

Returns:

associated native entity name, for example this could be the index class name if the server type is DL/VI, or it could be the application group name if the server type if OnDemand.

public abstract void setAssocEntityName(String assocNativeEntityName)

Sets the name of the associated native entity.

Parameters:

nativeEntityName—name of the associated native entity (index class name for example)

public abstract String getAssocServerName( )

Gets the name of the associated server where native attributes are defined.

Returns:

associated server name public abstract void setAssocServerName(String assocServerName)

Sets the name of the associated server where native attributes are defined.

Parameters:

serverName—back-end associated server name public abstract dkAttrMapping getAttrMapping(String attrMappingName) throws DKException Gets an existring attribute mapping given its name.

Parameters:

attrMappingName—federated entity mapping name to be retrieved

Throws: DKException an error occurs in the Datastore public abstract dkCollection listAttrMappings( ) throws DKException Lists all existing attribute mapping defined in this schema mapping.

Returns:

a collection of dkAttrMapping objects defining the mapping.

Throws: DKException an error occurs in the Datastore public abstract String[ ] listAttrMappingNames( ) throws DKException Lists all existring attribute mapping names defined in this schema mapping.

Returns:

an array of attribute mapping names.

Throws: DKException an error occurs in the Datastore public abstract void retrieve( ) throws DKException Retrieves this mapping from federated database Throws: DKException an error occurs in the Datastore public abstract dkAttrMapping getAttrMappingByMappedName(String mappedAttrName) throws DKException Gets attribute mapping object by the given the mapped attribute name Returns:

attribute mapping object public abstract dkAttrMapping getAttrMappingByMapToName(String mapToAttrName) throws DKException Gets attribute mapping object by the given the map-to attribute name.

Returns:

attribute mapping object

DKSchemaMappingFed is used for mapping in a federated composition. An example class definition for DKSchemaMappingFed is set forth below.

---

DKSchemaMappingFed

```
package com.ibm.mm.sdk.common.DKSchemaMappingFed
public class DKSchemaMappingFed
    extends Object
    implements dkSchemaMapping, DKConstantFed, DKMessageIdFed, Serializable
{
public DKSchemaMappingFed()
public DKSchemaMappingFed(String name)
public DKSchemaMappingFed(dkDatastore ds)
public String getName()
public void setName(String name)
public String getServerName()
public void setServerName(String serverName)
public String getServerType()
public void setServerType(String serverType)
public String getEntityName()
public void setEntityName(String nativeEntityName)
public String getMappedEntityName()
public void setMappedEntityName(String mappedEntityName)
public short getMappedEntityType()
public void setMappedEntityType(short mappedEntityType)
public String getAssocMappedEntityName()
public void setAssocMappedEntityName(String assocMappedEntityName)
public String getAssocEntityName()
public void setAssocEntityName(String assocNativeEntityName)
public String getAssocServerName()
public void setAssocServerName(String assocServerName)
public void addAttrMapping(dkAttrMapping attrMapping) throws DKException
public void removeAttrMapping(String attrMappingName) throws DKException
public dkAttrMapping getAttrMapping(String attrMappingName) throws DKException
public dkCollection listAttrMappings() throws DKException
public String[] listAttrMappingNames() throws DKException
public void retrieve() throws DKException
public void add() throws DKException
public void update() throws DKException
public void del() throws DKException
public dkAttrMapping getAttrMappingByMappedName(String mappedAttrName) throws
    DKException
public dkAttrMapping getAttrMappingByMapToName(String mapToAttrName) throws
    DKException
public void setDatastore(dkDatastore ds)
}
```

---

The following methods are part of the DKSchemaMappingFed class:

public DKSchemaMappingFed( )
public DKSchemaMappingFed(String name)
public DKSchemaMappingFed(dkDatastore ds)
public String getName( )
public void setName(String name)
public String getServerName( )
public void setServerName(String serverName)
public String getServerType( )
public void setServerType(String serverType)
public String getEntityName( )
public void setEntityName(String nativeEntityName)
public String getMappedEntityName( )
public void setMappedEntityNane(String mappedEntityName)
public short getMappedEntityType( )

Gets the name of the mapped or federated entity type.

Returns:

federated entity type public void setMappedEntityType(short mappedEntityType)

Sets the name of the mapped or federated entity type.

Parameters:

mappedEntityName—federated entity type publicString getAssocMappedEntityName( )

Gets the name of the associated mapped or federated entity.

Returns:

associated federated entity name public void setAssocMappedEntityName(String assocMappedEntityName)

Sets the name of the associated mapped or federated entity.

Parameters:

mappedEntityName—associated federated entity name public String getAssocEntityName( )

Gets the name of the associated native entity.

Returns:

associated native entity name, for example this could be the index class name if the server type is DL/VI, or it could be the application group name if the server type if OnDemand.

public void setAssocEntityName(String assocNativeEntityName)

Sets the name of the associated native entity.

Parameters:
nativeEntityName—name of the associated native entity (index class name for example)
public String getAssocServerName( )
   Gets the name of the associated server where native attributes are defined.
   Returns:
   associated server name
public void setAssocServerName(String assocServerName)
   Sets the name of the associated server where native attributes are defined.
   Parameters:
   serverName—back-end associated server name.
public void addAttrMapping(dkAttrMapping attrMapping) throws DKException
public void removeAttrMapping(String attrMappingName) throws DKException
public dkAttrMapping getAttrMapping(String attrMappingName) throws DKException
public dkCollection listAttrMappings( ) throws DKException
public String[ ]listAttrMappingNames( ) throws DKException
public void retrieve( ) throws DKException
public void add( ) throws DKException
public void update( ) throws DKException
public void del( ) throws DKException
public dkAttrMapping getAttrMappingByMappedName (String mappedAttrName) throws DKException
   Gets attribute mapping object by the given the mapped attribute name.
   Returns:
   attribute mapping object.
public dkAttrMapping getAttrMappingByMapToName (String mapToAttrName) throws DKException
   Gets attribute mapping object by the given the map-to attribute name.
   Returns:
   attribute mapping object.
public void setDatastore(dkDatastore ds)

CONCLUSION

This concludes the description of the preferred embodiment of the invention. The following describes some alternative embodiments for accomplishing the present invention. For example, any type of computer, such as a mainfame, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of manipulating data in one or more heterogeneous datastores at a computer, the method comprising the steps of:
   providing an object-oriented model for integrating one or more heterogeneous datastores with a federated datastore;
   generating objects representing the one or more heterogeneous datastores and the federated datastore based on the object-oriented model; and
   organizing the generated datastores into a federated composition.

2. The method of claim 1, wherein each datastore is a datastore object whose class is based on a base datastore class.

3. The method of claim 1, further comprising storing data within the datastores in the form of objects.

4. The method of claim 3, wherein the objects are dynamic data objects.

5. The method of claim 3, wherein objects are extended data objects.

6. The method of claim 5, wherein the extended data objects comprise binary large objects.

7. The method of claim 1, further comprising retrieving data from one or more of the heterogeneous datastores in response to a query to the federated datastore.

8. The method of claim 7, further comprising retrieving data using one or more search engines.

9. The method of claim 7, further comprising retrieving data by mapping between the federated datastore and one or more heterogeneous datastores.

10. The method of claim 1, further comprising returning a group of objects in response to a query for data.

11. The method of claim 10, further comprising iterating through the group of objects.

12. The method of claim 1, further comprising enabling querying of a combination of data.

13. The method of claim 1, farther comprising dynamically modifying the federated composition.

14. An apparatus for manipulating data in one or more heterogeneous datastores, comprising:
   a computer having one or more heterogeneous datastores; and
   one or more computer programs, performed by the computer, for providing an object-oriented model for integrating one or more heterogeneous datastores with a federated datastore, generating objects representing the one or more heterogeneous datastores and the federated datastore based on the object-oriented model, and organizing the generated datastores into a federated composition.

15. The apparatus of claim 14, wherein each datastore is a datastore object whose class is based on a base datastore class.

16. The apparatus of claim 14, further comprising storing data within the datastores in the form of objects.

17. The apparatus of claim 16, wherein the objects are dynamic data objects.

18. The apparatus of claim 16, wherein objects are extended data objects.

19. The apparatus of claim 18, wherein the extended data objects comprise binary large objects.

20. The apparatus of claim 14, further comprising retrieving data from one or more of the heterogeneous datastores in response to a query to the federated datastore.

21. The apparatus of claim 20, further comprising retrieving data using one or more search engines.

22. The apparatus of claim 20, further comprising retrieving data by mapping between the federated datastore and one or more heterogeneous datastores.

23. The apparatus of claim 14, further comprising returning a group of objects in response to a query for data.

24. The apparatus of claim 23, further comprising iterating through the group of objects.

25. The apparatus of claim 14, further comprising enabling querying of a combination of data.

26. The apparatus of claim 14, further comprising dynamically modifying the federated composition.

27. An article of manufacture comprising a program storage medium readable by a computer and embodying one or more instructions executable by the computer to perform method steps for manipulating data in one or more heterogeneous datastores at a computer, the method comprising the steps of:

providing an object-oriented model for integrating one or more heterogeneous datastores with a federated datastore;

generating objects representing the one or more heterogeneous datastores and the federated datastore based on the object-oriented model; and organizing the generated datastores into a federated composition.

28. The article of manufacture of claim 27, wherein each datastore is a datastore object whose class is based on a base datastore class.

29. The article of manufacture of claim 27, further comprising storing data within the datastores in the form of objects.

30. The article of manufacture of claim 29, wherein the objects are dynamic data objects.

31. The article of manufacture of claim 29, wherein objects are extended data objects.

32. The article of manufacture of claim 31, wherein the extended data objects comprise binary large objects.

33. The article of manufacture of claim 27, further comprising retrieving data from one or more of the heterogeneous datastores in response to a query to the federated datastore.

34. The article of manufacture of claim 33, further comprising retrieving data using one or more search engines.

35. The article of manufacture of claim 33, further comprising retrieving data by mapping between the federated datastore and one or more heterogeneous datastores.

36. The article of manufacture of claim 27, further comprising returning a group of objects in response to a query for data.

37. The article of manufacture of claim 36, further comprising iterating through the group of objects.

38. The article of manufacture of claim 27, further comprising enabling querying of a combination of data.

39. The article of manufacture of claim 27, further comprising dynamically modifying the federated composition.

* * * * *